(12) United States Patent
Ozaki et al.

(10) Patent No.: US 7,856,893 B2
(45) Date of Patent: Dec. 28, 2010

(54) BEARING FOR WHEEL WITH SENSOR

(75) Inventors: Takayoshi Ozaki, Iwata (JP); Tomomi Ishikawa, Iwata (JP); Kentarou Nishikawa, Iwata (JP); Toru Takahashi, Iwata (JP); Yujiro Ono, Iwata (JP); Takayuki Norimatsu, Iwata (JP)

(73) Assignee: NTN Corporation, Osaka (JP)

( * ) Notice: Subject to any disclaimer, the term of this patent is extended or adjusted under 35 U.S.C. 154(b) by 55 days.

(21) Appl. No.: 12/224,846

(22) PCT Filed: Mar. 7, 2007

(86) PCT No.: PCT/JP2007/000179

§ 371 (c)(1),
(2), (4) Date: Sep. 8, 2008

(87) PCT Pub. No.: WO2007/105365

PCT Pub. Date: Sep. 20, 2007

(65) Prior Publication Data

US 2009/0199660 A1 Aug. 13, 2009

(30) Foreign Application Priority Data

| Mar. 8, 2006 | (JP) | 2006-062252 |
| Apr. 7, 2006 | (JP) | 2006-106296 |
| Aug. 11, 2006 | (JP) | 2006-219551 |
| Aug. 24, 2006 | (JP) | 2006-227686 |
| Jan. 11, 2007 | (JP) | 2007-003246 |

(51) Int. Cl.
G01L 3/02 (2006.01)
(52) U.S. Cl. .................................. 73/862.321
(58) Field of Classification Search ............................... 73/862.08–862.322
See application file for complete search history.

(56) References Cited

U.S. PATENT DOCUMENTS 5,129,743 A * 7/1992 Faye et al. ................... 384/448

(Continued)

FOREIGN PATENT DOCUMENTS

CN 1455233 11/2003

(Continued)

OTHER PUBLICATIONS

International Search Report (Mailed May 15, 2007 for International Application No. PCT/JP2007/000179).

(Continued)

*Primary Examiner*—Max Noori

(57) ABSTRACT

To provide a sensor incorporated wheel support bearing assembly, in which a load sensor can be compactly installed in an automotive vehicle, the load acting on the vehicle wheel can be detected with high sensitivity and the manufacturing cost can be reduced, the bearing assembly having a plurality of rows of rolling elements interposed between an outer member and an inner member includes a sensor unit fitted to one of the outer member and the inner member, which serves as a stationary member. The sensor unit includes a sensor mounting member and a strain sensor fitted thereto. The sensor mounting member has two contact fixing portions fixed to the outer member and a first contact fixing portion is fixed to a flange surface of the outer member and a second contact fixing portion is fixed to a peripheral surface of the outer member.

13 Claims, 40 Drawing Sheets

U.S. PATENT DOCUMENTS

| | | | |
|---|---|---|---|
| 5,140,849 | A | 8/1992 | Fujita et al. |
| 5,143,458 | A | 9/1992 | Alff et al. |
| 5,385,411 | A | 1/1995 | Shirai et al. |
| 6,715,926 | B2 | 4/2004 | Tajima et al. |
| 6,802,208 | B2 | 10/2004 | Chinitz et al. |
| 7,108,427 | B2 | 9/2006 | Joki et al. |
| 7,197,944 | B2 | 4/2007 | Koyahi et al. |
| 7,212,927 | B2 | 5/2007 | Yanagisawa et al. |
| 7,320,257 | B2 | 1/2008 | Takizawa et al. |
| 7,452,133 | B2 | 11/2008 | Ohtsuki et al. |
| 2002/0097040 | A1 | 7/2002 | Takizawa et al. |
| 2003/0218548 | A1 | 11/2003 | Sato et al. |
| 2005/0016296 | A1 | 1/2005 | Inoue |
| 2005/0222740 | A1 | 10/2005 | Inoue et al. |
| 2007/0014500 | A1 | 1/2007 | Iwamoto et al. |
| 2008/0285901 | A1 | 11/2008 | Koike et al. |
| 2009/0038414 | A1* | 2/2009 | Ozaki et al. ............ 73/862.381 |
| 2009/0080822 | A1* | 3/2009 | Ozaki et al. ................. 384/448 |
| 2009/0097791 | A1* | 4/2009 | Ozaki et al. ................. 384/448 |
| 2009/0120184 | A1* | 5/2009 | Ozaki et al. ................... 73/494 |
| 2009/0129712 | A1 | 5/2009 | Ozaki et al. |
| 2009/0324152 | A1* | 12/2009 | Ozaki et al. ................. 384/448 |

FOREIGN PATENT DOCUMENTS

| | | | |
|---|---|---|---|
| JP | 2531492 | | 9/1992 |
| JP | 2002-340922 | | 11/2002 |
| JP | 2003-530565 | | 10/2003 |
| JP | 2003-336653 | | 11/2003 |
| JP | 2004-3601 | | 1/2004 |
| JP | 2004-155261 | | 6/2004 |
| JP | 2004-198247 | | 7/2004 |
| JP | 2004-360782 | | 12/2004 |
| JP | 2005-265175 | | 9/2005 |
| JP | 2006-3268 | | 1/2006 |
| JP | 2006-10477 | | 1/2006 |
| JP | 2006-77807 | | 3/2006 |
| JP | 2007-71280 | | 3/2007 |
| WO | 01/77634 | A2 | 10/2001 |
| WO | 2004/018273 | | 3/2004 |

OTHER PUBLICATIONS

International Preliminary Report on Patentability, mailed Sep. 18, 2008 and issued in corresponding International Patent Application No. PCT/JP2007/000179.

U.S. Appl. No. 12/086,089, filed Jun. 5, 2008, Takayoshi Ozaki, et al., NTN Corporation.

U.S. Appl. No. 12/224,802, filed Sep. 5, 2008, Takayoshi Ozaki et al., NTN Corporation.

U.S. Appl. No. 11/444,343, filed Jun. 1, 2006, Komori et al., NTN Corporation.

U.S. Appl. No. 11/991,480, filed Mar. 5, 2008, Ozaki et al., NTN Corporation.

U.S. Appl. No. 12/086,153, filed Jan. 1, 2008, Ozaki et al., NTN Corporation.

U.S. Appl. No. 12/086,089, filed Jun. 5, 2008, Ozaki et al., NTN Corporation.

U.S. Appl. No. 11/990,071, filed Feb. 6, 2008, Ozaki et al., NTN Corporation.

Notice of Allowance dated Apr. 5, 2010 issued in corresponding U.S. Appl. No. 12/086,089.

Office Action dated Mar. 5, 2010 issued in corresponding U.S. Appl. No. 11/991,480.

U.S. Notice of Allowance mailed Sep. 28, 2010 in related U.S. Appl. No. 12/086,089.

U.S. Appl. No. 12/310,444, filed Aug. 21, 2007, Ozaki et al., NTN Corporation.

* cited by examiner

BEARING FOR WHEEL WITH SENSOR

CROSS REFERENCE TO RELATED PATENT APPLICATIONS

This application claims the benefit under 35 U.S.C. Section 371 of International Application No. PCT/JP2007/000179, filed Mar. 7, 2007, which claimed priority to the following applications:

Japanese Application No. 2006-062252, filed Mar. 8, 2006;
Japanese Application No. 2006-106296, filed Apr. 7, 2006;
Japanese Application No. 2006-219551, filed Aug. 11, 2006;
Japanese Application No. 2006-227686, filed Aug. 24, 2008; &
Japanese Application No. 2007-003246, filed Jan. 11, 2007, in the Japanese Patent Office, the disclosures of which are hereby incorporated by reference.

BACKGROUND OF THE INVENTION

1. Field of the Invention

The present invention relates to a sensor incorporated wheel support bearing assembly having a load sensor built therein for detecting a load imposed on the bearing assembly for the support of a vehicle wheel.

2. Description of the Prior Art

For safety travel of an automotive vehicle, the wheel support bearing assembly has hitherto been well known in the art, which is equipped with a sensor for detecting the rotational speed of one of automotive wheels. While the automobile traveling safety precaution is generally taken by detecting the rotational speed of a vehicle wheel of various parts, but it is not sufficient with only the rotational speed of the wheel and, therefore, it is desired to achieve a control for safety purpose with the use of other sensor signals.

In view of the above, it may be contemplated to achieve the vehicle attitude control based on a load acting on each of the wheels during travel of an automotive vehicle. By way of example, a large load acts on the outside wheels during the cornering, on the wheels on one side during the run along left and right inclined road surfaces or on the front wheels during the braking, and, thus, a varying load acts on the vehicle wheels. Also, even in the case of the uneven live load, the loads acting on those wheels tend to become uneven. For this reason, if the loads acting on the wheels can be detected as needed, suspension systems for the vehicle wheels can be controlled beforehand based on results of detection of the loads so that the attitude control of the automotive vehicle during the traveling thereof (for example, prevention of a rolling motion during the cornering, prevention of diving of the front wheels during the braking, and prevention of diving of the vehicle wheels brought about by an uneven distribution of live loads) can be accomplished. However, no appropriate space for installation of the load sensor for detecting the load acting on the respective vehicle wheel is available and, therefore, the attitude control through the detection of the load can hardly be realized.

Also, in the event in the near future the steer-by-wire is introduced and the system, in which the wheel axle and the steering are not coupled mechanically with each other, is increasingly used, information on the road surface comes to be required to transmit to the steering wheel hold by a driver by detecting a wheel axis direction load.

In order to meet those needs hitherto recognized, a wheel support bearing assembly having a strain gauge attached to an outer ring member thereof for detecting a strain has been suggested. (See, for example, the Japanese Laid-open Patent Publication No. 2003-530565, published Oct. 14, 2003.)

An outer ring member of the wheel support bearing assembly is a bearing component part having a raceway surface defined therein and required to have a strength, and is manufactured through complicated process steps including, for example, a plastic forming, a turning process, a heat treatment and a grinding process. Accordingly, while strain gauge is attached to the outer ring such as disclosed in the patent document discussed above, there is a problem in that the productivity is low and the cost of manufacture thereof during a mass production tends to become high. Also, it is not easy to detect with high sensitivity, a strain occurring in the outer ring and, when a result of such detection is utilized in controlling the vehicle attitude of an automotive vehicle then travelling, a problem will arise in association with the accuracy of the control.

SUMMARY OF THE INVENTION

In view of the above, an object of the present invention is to provide a sensor incorporated wheel support bearing assembly, in which the sensor for detecting the load can be snugly and neatly installed in an automotive vehicle, the load acting on the vehicle wheel can be detected with high sensitivity and the cost of manufacture can be reduced during a mass production.

The sensor incorporated wheel support bearing assembly of the present invention is a wheel support bearing assembly for rotatably supporting a vehicle wheel relative to an automotive body structure and includes an outer member having an inner periphery formed with a plurality of raceway surfaces defined therein, an inner member formed with raceway surfaces in face-to-face relation with the raceway surfaces in the outer member, a plurality of rows of rolling elements interposed between the raceway surfaces of the outer member and the inner member, a sealing device for sealing ends delimited between the outer member and the inner member; and a sensor unit, in which the sensor unit includes a sensor mounting member and at least one or more strain sensors fitted to this sensor mounting member and is mounted on one of the outer member and the inner member, which serves as a stationary member; and in which the sensor mounting member has two contact fixing portions through which the sensor mounting member is fixed to the stationary member, and a first contact fixing portion, which is one of the contact fixing portions, is fixed to a flange surface provided in the stationary member and a second contact fixing portion, which is the other of the contact fixing portions, is fixed to a peripheral surface of the stationary member.

In the event that a load acts on the rotatable member as the automotive vehicle starts traveling, the stationary member undergoes deformation through the rolling elements and such deformation brings about a strain in the sensor unit. The strain sensor provided in the sensor unit detects the strain occurring in the sensor unit. If the relation between the strain and the load is determined beforehand by means of a series of experiments and/or simulations, the load imposed on the vehicle wheel can be detected from an output of the strain sensor. Also, the load so detected can be utilized the vehicle control of an automotive vehicle.

Since the wheel support bearing assembly of the present invention is of a design, in which the sensor unit including the sensor mounting member and the strain sensor fitted to the sensor mounting member is mounted on the stationary member, the sensor for the detection of the load can be snugly and neatly installed in the automotive vehicle. Since the sensor mounting member is a handy component part that is fitted to the stationary member, and when the strain sensor is fitted to that, it can be excellent in mass production and the cost can be reduced.

Also, since the sensor mounting member has the contact fixing portions at the two locations of the stationary member and the first contact fixing portion is the flange surface provided in the stationary member and the second contact fixing portion is the peripheral surface of the stationary member, respective radial positions of the first and second contact fixing portions are different from each other and the strain occurring in the stationary member can be transferred to the sensor mounting member and arise in the stationary member having been amplified. Since the strain sensor measures the strain so transferred and amplified, the strain occurring in the stationary member can be detected with high sensitivity and the measurement of the load will be accomplished with high accuracy.

It is preferable that the first contact fixing portion of the sensor mounting member is positioned in proximity to a vehicle body mounting hole in the flange surface, which is provided in the stationary member, and the second contact fixing portion is positioned circumferentially on a peripheral surface of the stationary member in the same phase as the first contact fixing portion.

Where the first contact fixing portion is so designed as to lie in proximity to the vehicle body mounting hole in the flange surface provided in the stationary member, separation between respective radial positions of the first and second contact fixing portions can be increased to a value as large as possible and, therefore, the strain in the stationary member can be transferred to the sensor mounting member and arise therein as amplified. Also, if the first and second contact fixing portions are held in the same phase with respect to the peripheral direction, the sensor mounting member can have a reduced length, facilitating installation of the sensor unit.

In the sensor incorporated wheel support bearing assembly of the construction described above, the sensor mounting member may have at least one cutout portion formed at a location between the first contact fixing portion and the second contact fixing portion, in which case the strain sensor is arranged in this cutout portion.

According to this construction, since the sensor mounting member has a cutout portion defined at least one location intermediate between the first and second contact fixing portions, which cutout portion has a rigidity reduced as compared with that at any other portions thereof, the strain concentrates on this cutout portion. Since the strain sensor measures the strain at that location where the strain concentration particularly occurs in the sensor mounting member in which the strain apt to appear, the strain in the stationary member can be detected with high sensitivity and the load measuring accuracy can increase.

Also, in the wheel support bearing assembly of the type discussed above, the first contact fixing portion of the sensor unit is preferably fixed to a portion of the flange in proximity to a vehicle body mounting hole defined in such flange, in which case the second contact fixing portion is fixed to a peripheral surface at a phase circumferentially different form that of the first contact fixing portion in a circumferential direction.

When the first and second contact fixing portions are held in different phases in the circumferential direction, the first contact fixing portion is fixed to the side face of the flange while the second contact fixing portion can be fixed to a portion where no flange exist in the outer periphery of the outer peripheral surface of the stationary member. Since the flange receives a considerable force from the suspension system, the degree of strain differs between the flange portion and a non-flange portion even though the both are in the same stationary member. In such case, if the first contact fixing portion is held in the vicinity of the vehicle body mounting hole in the flange, influence brought about by the force from the suspension system is high and, therefore, the strain tends to arise considerably. For this reason, positioning of the sensor mounting member between those members is effective to allow the strain to arise further considerably in the sensor mounting member, resulting in further increase of the load measuring accuracy.

The sensor incorporated wheel support bearing assembly of the present invention may be of a design in which a side surface of the flange, which is provided on one of the outer member and the inner member, which serves as the stationary member, is formed with a vehicle body mounting holes defined at three locations, and in which the first contact fixing portion is fixed to a portion of the side surface of the flange in proximity of one of the vehicle body mounting holes.

In the construction described above, the side surface of the flange to which the first contact fixing portion is fixed tends to be strained considerably since it receives a considerable force from the suspension system. In particular, the neighborhood of the vehicle body mounting hole in the side surface of the flange is susceptible to influences brought about by the force from the suspension system, resulting in indication of a considerable strain. In contrast thereto, the peripheral surface of the stationary member, to which the second contact fixing portion is fixed, is not strained so much as in the side surface of the flange. Positioning of the sensor mounting member between those two location at which the degrees of strain occurring there are different from each other facilitates a further considerable strain to arise in the sensor mounting member. Since the strain sensor measures such strain which has been transferred and amplified, the strain in the stationary member can be detected with high sensitivity and the load measuring accuracy can therefor be increased.

In the wheel support bearing assembly according to the present invention, a plurality of sensor units may be provided and the respective first contact fixing portions of those sensor units may be positioned in proximity of the different vehicle body mounting holes and are then fixed to respective portions of the stationary member.

At the point of contact between the vehicle wheel, which is mounted on the rotatable member of the wheel support bearing assembly, and the road surface, the load acts in three-axis directions including a up and down direction, a left and right direction and a forward and rearward direction, all of which are perpendicular to each other. While this load acts on the rotatable member with the strain consequently occurring in the stationary member, depending on the circumferential position of the vehicle body mounting hole that is formed in the flange of the stationary member, influences brought about by the load in the three-axis directions are different. For this reason, when the plural sensor units are fitted with the first contact fixing portion positioned in the vicinity of each of the vehicle body mounting holes that are different from each other, with respect to the relation between the load and the strain in the three-axis directions, the load can be determined by each of the sensor units from the relation of the strain and the load having a tendency different from that described above and, therefore, a highly accurate load detection can be achieved.

Where the vehicle body mounting holes in the flange are at three locations, for example, one of the vehicle body mounting holes will be arranged in an upper portion and the remaining two wheel mounting holes will be arranged at diagonally downwardly forward and rearward location, respectively. Because of this, depending on the position of each of the wheel mounting holes, the relations between the strain and the load in the three-axis directions differ considerably from each other and a highly accurate load detection can be achieved.

In the sensor incorporated wheel support bearing assembly of the construction described hereinabove, a fitting member may be interposed between the sensor mounting member and the stationary member.

According to the construction hereinabove described, interposition of the fitting members between the sensor mounting member and the stationary member allows the sensor mounting member to have a simplified shape. When the strain sensor is fitted to the sensor mounting member having such a simplified shape, the mass production can be made excellent and the cost can be reduced. Also, since the sensor mounting member has such a simplified shape, formation of the strain sensor in the form of a pressure film resistance element on the surface of the sensor mounting member can be facilitated. The use of the strain sensor in the form of the pressure film resistance element is effective to increase the reliability.

The stationary member referred to above may be the outer member. In such case, the sensor unit is fitted to the outer peripheral surface of the outer member.

An acting force estimation section may be employed for estimating an external force acting on the wheel support bearing assembly or an acting force between a vehicle tire and a road surface in reference to an output of the strain sensor.

When the external force acting on the wheel support bearing assembly or the acting force between the vehicle tire and the road surface, which is obtained from the acting force estimation section, is used in a vehicle control of the automotive vehicle, the meticulous vehicle control can be achieved.

A temperature sensor may be mounted on the sensor mounting member.

Since during the use of the wheel support bearing assembly, the temperature changes, such change in temperature affects the strain of the sensor mounting member and/or the operation of the strain sensor. Also, similar influence will be brought on the change in environmental temperature in the ambient. By correcting the temperature dependent characteristic of the strain sensor based on an output from the temperature sensor, it is possible to achieve a highly accurate load detection.

In the wheel support bearing assembly according to the present invention, the sensor mounting member may be provided with at least one of an acceleration sensor and a vibration sensor.

Where in addition to the strain sensor, an additional sensor such as, for example, an acceleration sensor and/or a vibration sensor is fitted to the sensor mounting member, the load and the status of the wheel support bearing assembly can be measured at one site and the wiring can therefore be simplified.

The strain sensor may be of a structure including an insulating layer formed on a surface of the sensor mounting member by means of printing and baking and an electrode and a strain measuring resistance element both formed on the insulating layer by means of printing and baking.

Where the strain sensor is so formed as hereinabove described, no reduction in bonding strength which would result from aging such as occurring where the strain sensor is fixed by bonding to the sensor mounting member will occur and, therefore, the reliability of the sensor unit can be increased. Also, the processing is easy to perform, the cost can be reduced.

A sensor signal processing circuit unit, which includes a sensor signal processing circuit for processing an output of the strain sensor, may be fitted to the stationary member in proximity of the sensor unit.

By providing the sensor signal processing circuit unit in the vicinity of the sensor unit, the labor incurred in wiring from the sensor unit to the sensor signal processing circuit unit can be simplified. Also, as compared with the case, in which the sensor signal processing circuit is arranged at a location outside the wheel support bearing assembly, the sensor signal processing circuit unit can be installed compactly.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
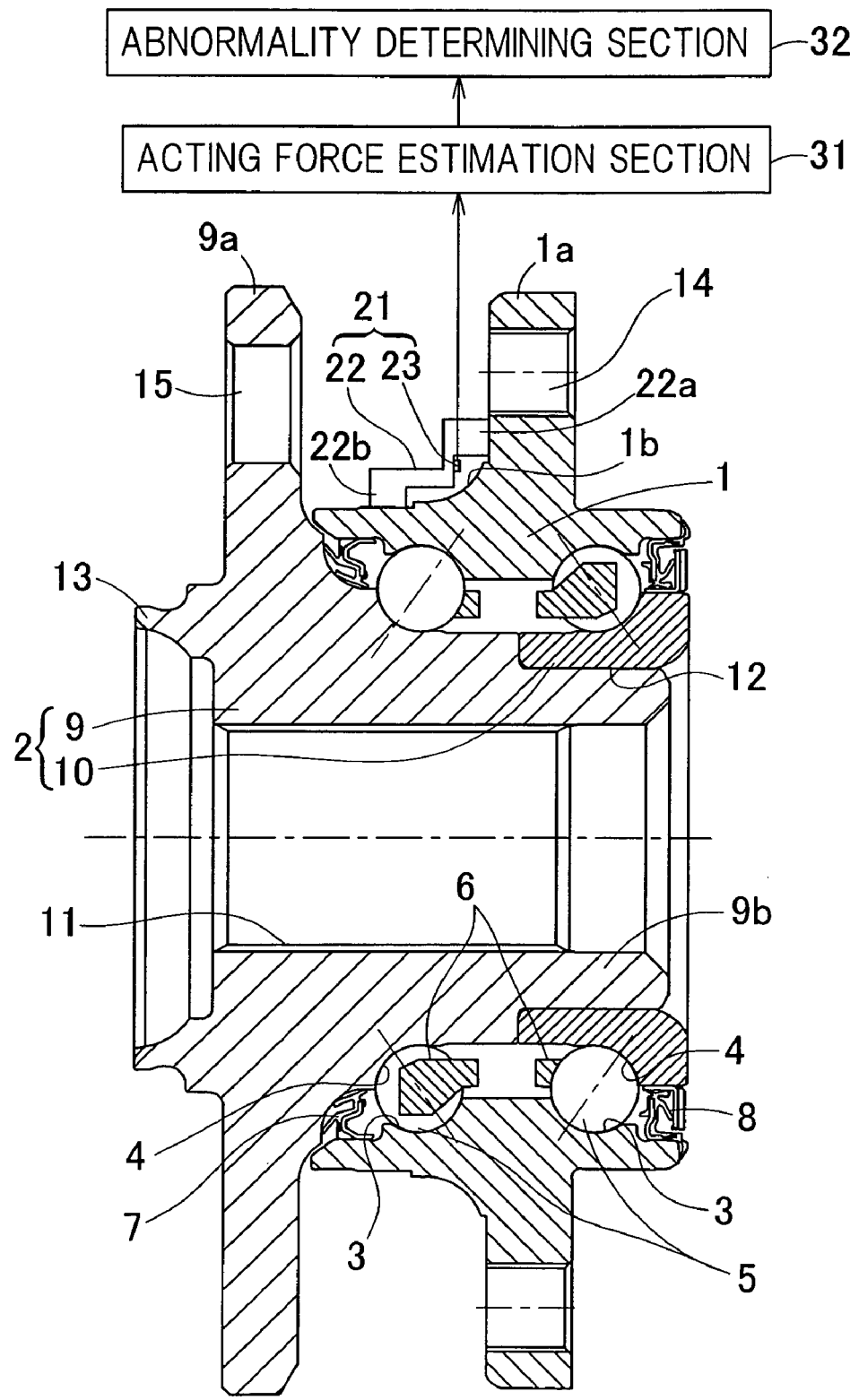
FIG. 1 is a diagram showing a sectional view of a sensor incorporated wheel support bearing assembly according to a first preferred embodiment of the present invention together with a block diagram showing a conceptual construction of a detecting system therefor.
Figure 2:
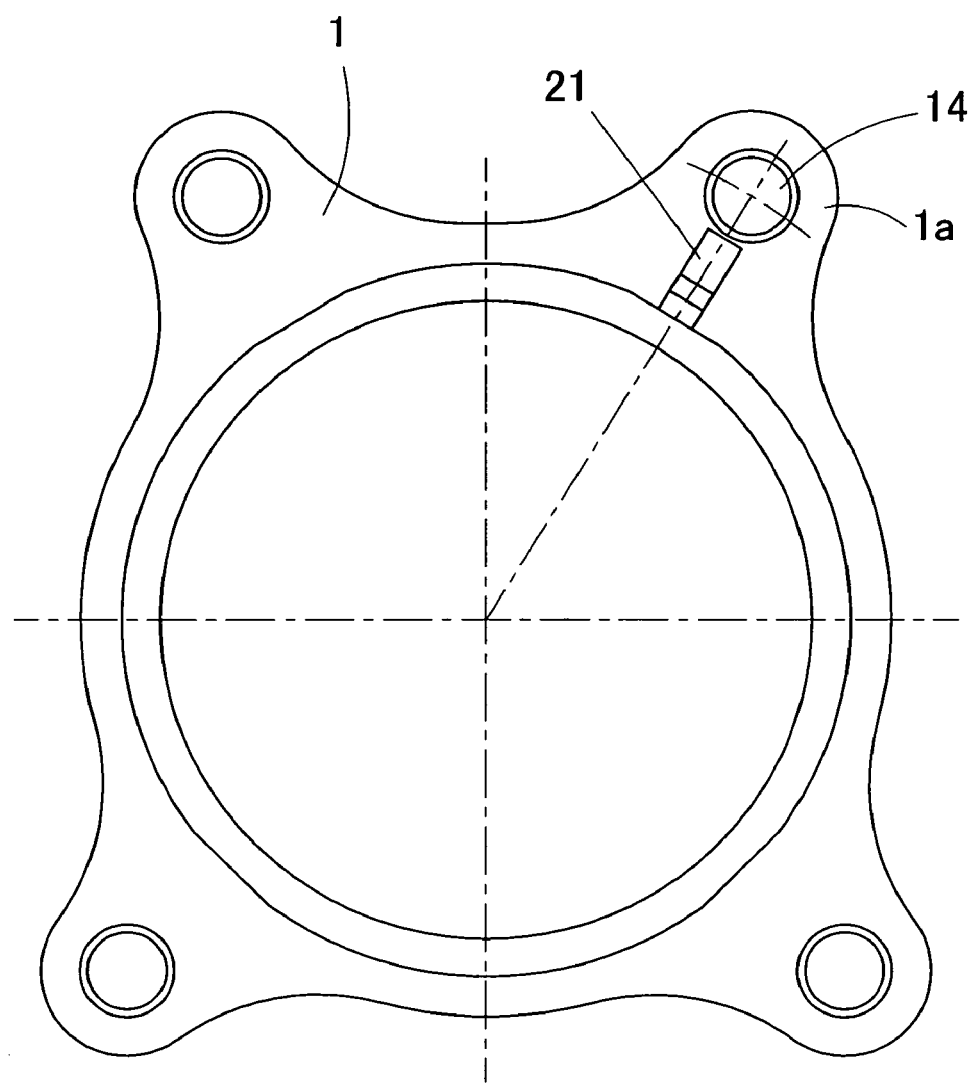
FIG. 2 is a front elevational view showing an outer member and a sensor unit both employed in the sensor incorporated wheel support bearing assembly shown in FIG. 1.

A first preferred embodiment of the present invention will be described in detail with particular reference to FIGS. 1 to 3A and 3B. This embodiment is directed to an inner race rotating model of a three generation type that is applied to a wheel support bearing assembly for the support of a vehicle drive wheel. It is to be noted that in the following description, one side of a vehicle body structure laterally away from the longitudinal center thereof in a condition, in which the bearing assembly is mounted on the vehicle body structure, is referred to as "outboard side" while the opposite side of the vehicle body structure laterally close towards the longitudinal center thereof in the same condition is referred to as "inboard side".

The sensor incorporated wheel support bearing assembly according to this embodiment includes an outer member 1 having its inner periphery formed with a plurality of raceway surfaces 3, an inner member 2 formed with raceway surfaces 4 opposed to the respective raceway surfaces 3, and a plurality of rows of rolling elements 5 interposed between the raceway surfaces 3 of the outer member 1 and the raceway surfaces 4 of the inner member 2. This wheel support bearing assembly is rendered to be a double row angular contact ball bearing type, in which the rolling elements 5 are employed in the form of balls that are rollingly retained by a retainer 6 employed for each row. The raceway surfaces 3 and 4 have an arcuately sectioned shape and the raceway surfaces 3 and 4 are so formed as to have a contact angle oriented outwardly. Opposite annular open ends of a bearing space delimited between the outer member 1 and the inner member 2 are sealed by respective sealing devices 7 and 8.

The outer member 1 serves as a stationary member and is of one-piece construction having its outer periphery formed with flanges 1a for securement to an automobile suspension system (not shown) mounted on the automotive vehicle. The flanges 1a have respective vehicle body mounting holes 14 defined at a corresponding number of circumferential locations thereof.

The inner member 2 serves as a rotatable member and is made up of a hub unit 9 having a hub flange 9a for the support of a vehicle wheel, and an inner ring 10 mounted on an inboard end of a hub axle 9b of the hub unit 9. The rows of the raceway surfaces 4 referred to previously are formed respectively in the hub unit 9 and the inner ring 10. The inboard end of the hub unit 9 has an outer periphery radially inwardly stepped to define an inner ring mounting area 12 of a reduced diameter, with the inner ring 10 fixedly mounted thereon. The hub unit 9 has a center bore 11 defined therein so as to extend completely through the length of the hub unit 9. The hub flange 9a has a plurality of press-fitting holes 15 defined in respective circumferential locations thereof for receiving corresponding hub bolts (not shown) press-fitted therein. The hub flange 9 has, in the proximity of a root portion of the hub flange 9a, a cylindrical pilot portion 13 so as to protrude in an outboard direction, which pilot portion 13 serves to guide the vehicle wheel and brake components.

Figure 3A:
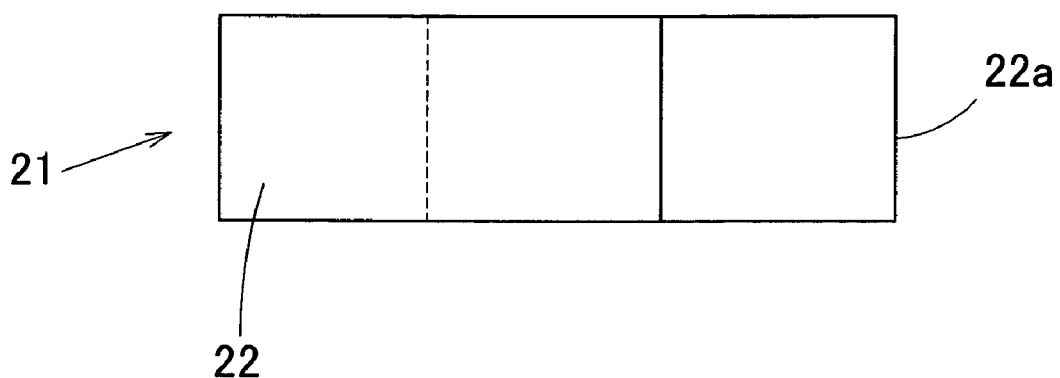
FIG. 3A a plan view of the sensor unit employed in the wheel support bearing assembly shown in FIG. 1.
Figure 3B:
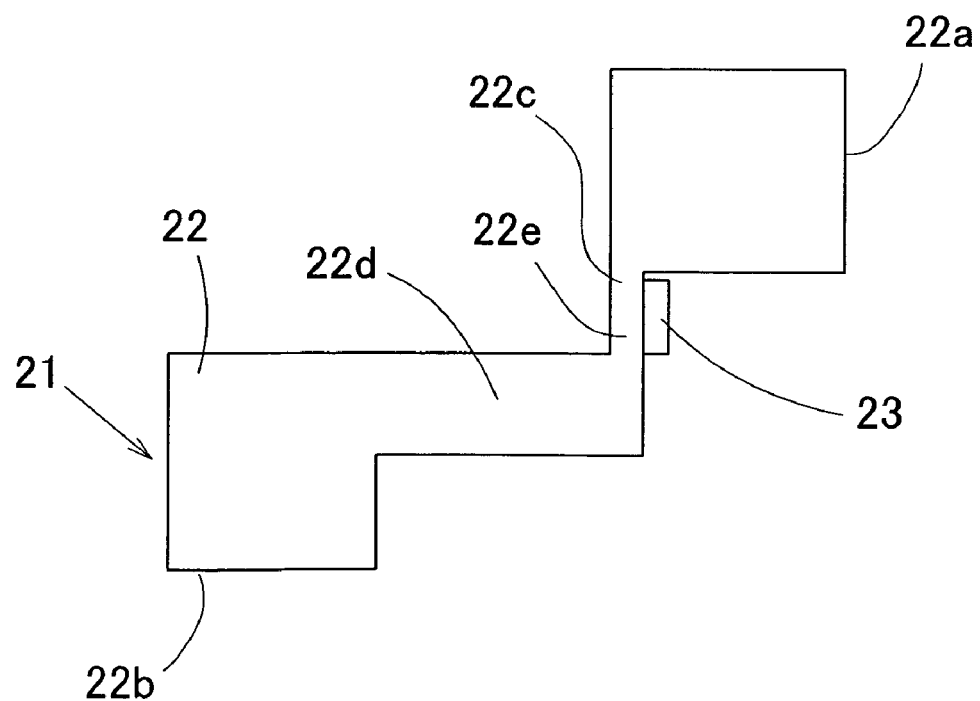
FIG. 3B is a side view of the sensor unit shown in FIG. 3A.

A sensor unit 21 shown in FIGS. 3A and 3B is mounted on an outer periphery of the outer member 1. This sensor unit 21 is of a type including a sensor mounting member 22 on which a strain sensor 23 for measuring a strain occurring in the sensor mounting member 22 is mounted. The sensor mounting member 22 has a first contact fixing portion 22a, which is held in contact with and fixed to a portion of the outer member 1 adjacent one of the mounting holes 14 in the outer member 1, and a second contact fixing portion 22b which is held in contact with and fixed to an outer peripheral surface of the outer member 1. Also, the sensor mounting member 22 is of a generally L-shaped configuration including a radial portion 22c extending in a radial direction and having the first contact fixing portion 22a defined therein, and an axial portion 22d extending in an axial direction and having the second contact fixing portion 22b defined therein. The radial portion 22c has a wall thickness smaller than that of the axial portion 22d and, hence, has a lower rigidity as compared with that of the axial portion 22d. The strain sensor 23 is fitted to the radial portion 22c which has a relatively low rigidity.

The sensor unit 21 of the structure described above is, as best shown in FIGS. 1 and 2, fixed to an outer periphery of the outer member 1 through the first and second contact fixing portions 22a and 22b thereof so that the first and second contact fixing portions 22a and 22b are held at respective positions that lie in the same phase with respect to a circumferential direction of the outer member 1. Where the first and second contact fixing portions 22a and 22b are held at the respective positions lying in the same phase with respect to the circumferential direction of the outer member 1 as described above, the sensor mounting member 22 can have a reduced length and can therefore be easily installed. In the case of this embodiment, the strain sensor 23 is fixed to the sensor mounting member 22 by the use of any suitable bonding agent.

The sensor mounting member 22 is of such a shape and is made of such a material that the sensor mounting member 22 will not undergo a plastic deformation when being fixed to the outer member 1. Also, the sensor mounting member 22 is required to have such a shape that it will not undergo any plastic deformation even when a maximum expected load acts on the wheel support bearing assembly. The maximum expected force referred to above is a maximum force that can be expected during the travel of the automotive vehicle that does not lead to damage in such automotive vehicle. Once the sensor mounting member 22 is plastically deformed, deformation occurring in the outer member 1 is not transmitted to the sensor mounting member 22 accurately, thus adversely affecting the measurement of the strain.

The sensor mounting member 22 of this sensor unit 21 may be manufactured by means of, for example, a press work. If the sensor mounting member 22 is a product prepared by the use of a press work, the cost can be reduced.

Also, the sensor carrier member 22 may be a product of a sintered metal that is formed by means of a powdery metal injection molding technique. The injection molding of a powdery metal is one of molding techniques used in molding a metal or an intermetallic compound and includes a step of kneading the powdery metal with a binder, a step of molding the kneaded mixture by means of an injection molding, a step of degreasing the resultant molded article and a step of sintering the molded article. With this injection molding of the powdery metal, some advantages can be appreciated where a sintered body of a high sintered density can be obtained as compared with the standard powdery metallurgy and a sintered metal product can also be prepared with a high dimensional accuracy and can have a high mechanical strength.

For the strain sensor 23, any of various sensors may be employed. For example, where the strain sensor 23 is in the form of a metallic foil strain gauge, in consideration of the durability of the metal foil strain gauge, the amount of strain occurring at a portion of the sensor carrier member 22 on which the strain sensor 23 is mounted is preferred to be smaller than 1500 microstrain even when the maximum expected load is applied on the wheel support bearing assembly. By a reason similar to that described above, where the strain sensor 23 is in the form of a semiconductor strain gauge, the amount of the strain is preferred to be smaller than 1000 microstrain. On the other hand, where the strain sensor 23 is in the form of a thick film type sensor, the amount of the strain is preferred to be smaller than 1500 microstrain.

As shown in FIG. 1, for processing an output of the strain sensor 23, an acting force estimation section 31 and an abnormality determining section 32 are employed. Those sections 31 and 32 may be those provided in an electronic circuit device (not shown) such as, for example, a circuit substrate fitted to the outer member 1 or the like of the wheel support bearing assembly or those provided in an electronic control unit (ECU) of an automotive vehicle.

Figure 15:
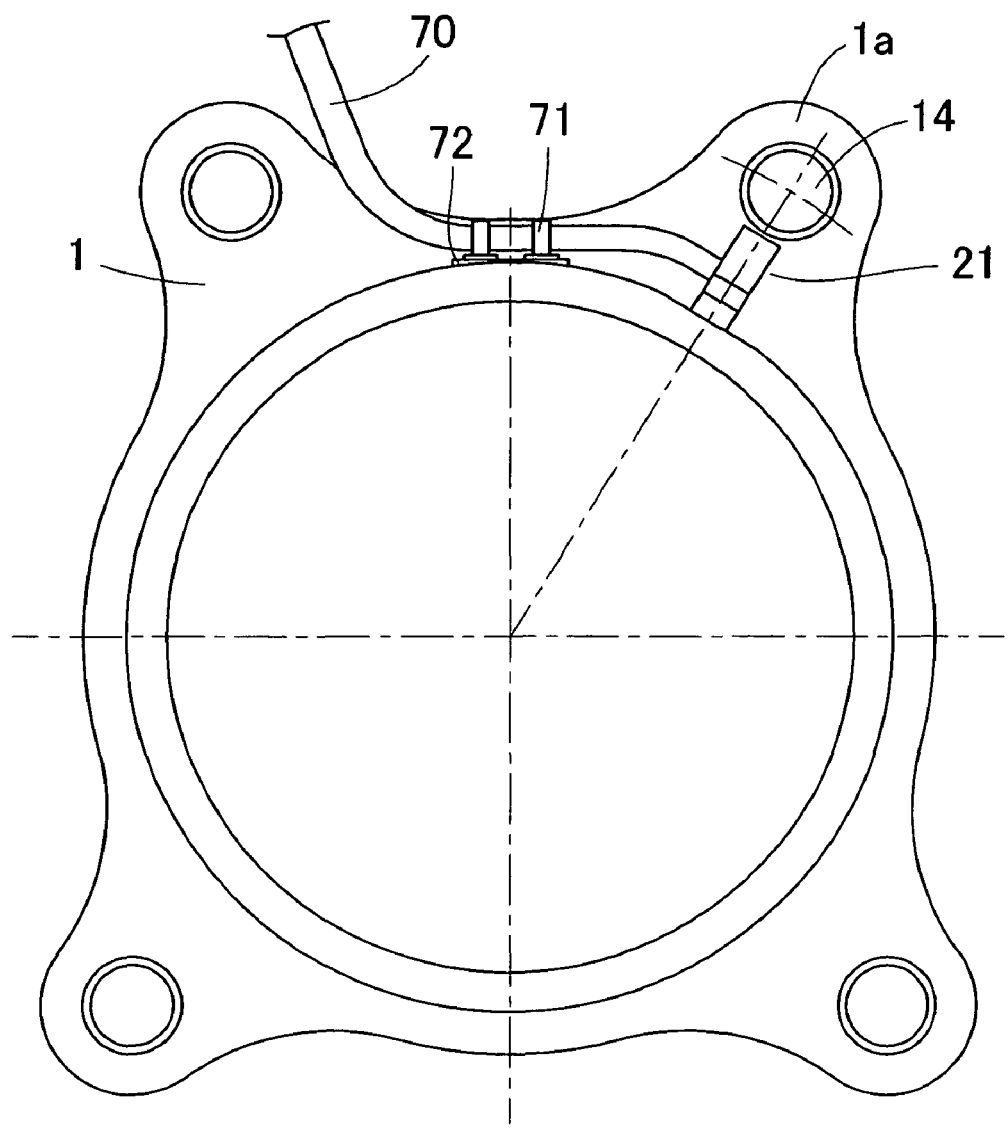
FIG. 15 is an explanatory diagram showing a manner of installation of a cable in the embodiment shown in FIGS. 1 to 3.

A cable 70 for transmitting an output signal of the strain sensor 23 to the electric control unit of the automotive vehicle is preferred to be installed as shown in FIG. 15. Specifically, the cable 70 has its intermediate portion fixed and retained in position by a clamp 71 mounted on an outer peripheral surface of the outer member 1. For the clamp 71, a type in which the cable 70 can be fixedly engaged by a hook, or a type in which a band is fixedly wound around the cable 70, for example, may be employed. The clamp 71 may be made of, for example, a resinous material. This clamp 71 is fitted to a fixing portion 72, defined in the outer peripheral surface of the outer member 1, by means of a lock mechanism utilizing, for example, a set screw or pawl.

When the cable 70 is fixed at its intermediate portion by the clamp 71 as hereinabove described, it is possible to avoid transmission of an external force such as, for example, a tension applied to the cable 70 during the travel of the automotive vehicle or vibration of the automotive vehicle directly to the sensor unit 21. Accordingly, any undesirable change in output signal of the strain sensor caused by the external force and/or vibrations and breakage of the juncture between the cable 70 and the sensor unit 21 can be avoided.

The clamp 71 is required to have a structure sufficient to withstand against the external force and the load of the cable 70 and, if fixing of the cable 70 at one location appears to be not sufficient, the clamp 71 may be employed at a plurality of locations of the outer peripheral surface of the outer member 1 so that the cable 70 can be firmly fixed in position.

The operation of the sensor incorporated wheel support bearing assembly of the construction described hereinabove will now be described. When the load is imposed on the hub unit 9, the outer member 1 is deformed through the rolling elements 5 and such deformation is transmitted to the sensor mounting member 22 that is fitted to the outer member 1, resulting in a corresponding deformation of the sensor mounting member 22. The strain then occurring in the sensor mounting member 22 is measured by the strain sensor 23. At this time, the radial portion 22c of the sensor mounting member 22 is deformed in accordance with deformation of the flange 1a of the outer member 1. In the case of this embodiment, since the rigidity of the radial portion 22c is low as compared with that of the outer member 1 and the sensor mounting member 22 represents a generally L-shaped configuration including the radial portion 22c having a relatively low rigidity and an axial portion 22d having a relatively high rigidity, a strain concentration occurs in the vicinity of a corner portion 22e of the sensor mounting member 22 situated generally intermediate between the radial portion 22c and the axial portion 22d and on one side adjacent the radial portion 22c, resulting in indication of a strain larger than that occurring in the outer member 1. In other words, the strain generated intermediate between the radial portion 22c and the axial portion 22d corresponds to the strain occurring at an R portion 1b at the base of the flange 1a which has been transferred to and then arouse having been amplified. Since this strain is measured by the strain sensor 23, the strain occurring in the outer member 1 can be detected with high sensitivity and, therefore, the measurement of the strain takes place highly accurately.

Considering that the manner of variation of the strain differs depending on the direction and/or the magnitude of the load, by determining beforehand the relation between the strain and the load by means of a series of experiment and/or simulations, an external force acting on the wheel support bearing assembly or an acting force between a vehicle tire and the road surface can be calculated. The acting force estimation section 31 referred to previously is operable to calculate the external force acting on the wheel support bearing assembly or the acting force between the vehicle tire and the road surface in reference to an output from the strain sensor 23, using the relation between the strain and the load that has been determined by means of the experiments and/or simulations. On the other hand, the abnormality determining section 32 referred to previously is operable to output an abnormality signal to the outside in the event that the external force acting on the wheel support bearing assembly and calculated by the acting force estimation section 31 and/or the acting force between the vehicle tire and the road surface having been calculated by the acting force estimation section 31 is determined exceeding a predetermined tolerance. This abnormality signal can be used in vehicle control of the automotive vehicle. Also, by outputting in real time the external force acting on the wheel support bearing assembly and/or the acting force between the vehicle tire and the road surface, a meticulous vehicle control can be achieved.

Although the sensor unit 21 according to this embodiment employs only one strain sensor 23 fitted to the sensor mounting member 22, a plurality of strain sensors 23 may be fitted to the sensor mounting member 22 at respective locations thereof. By fitting the strain sensor 23 to the sensor mounting member 22 at the plural locations thereof, the load can be detected with a further high accuracy.

Figure 4:
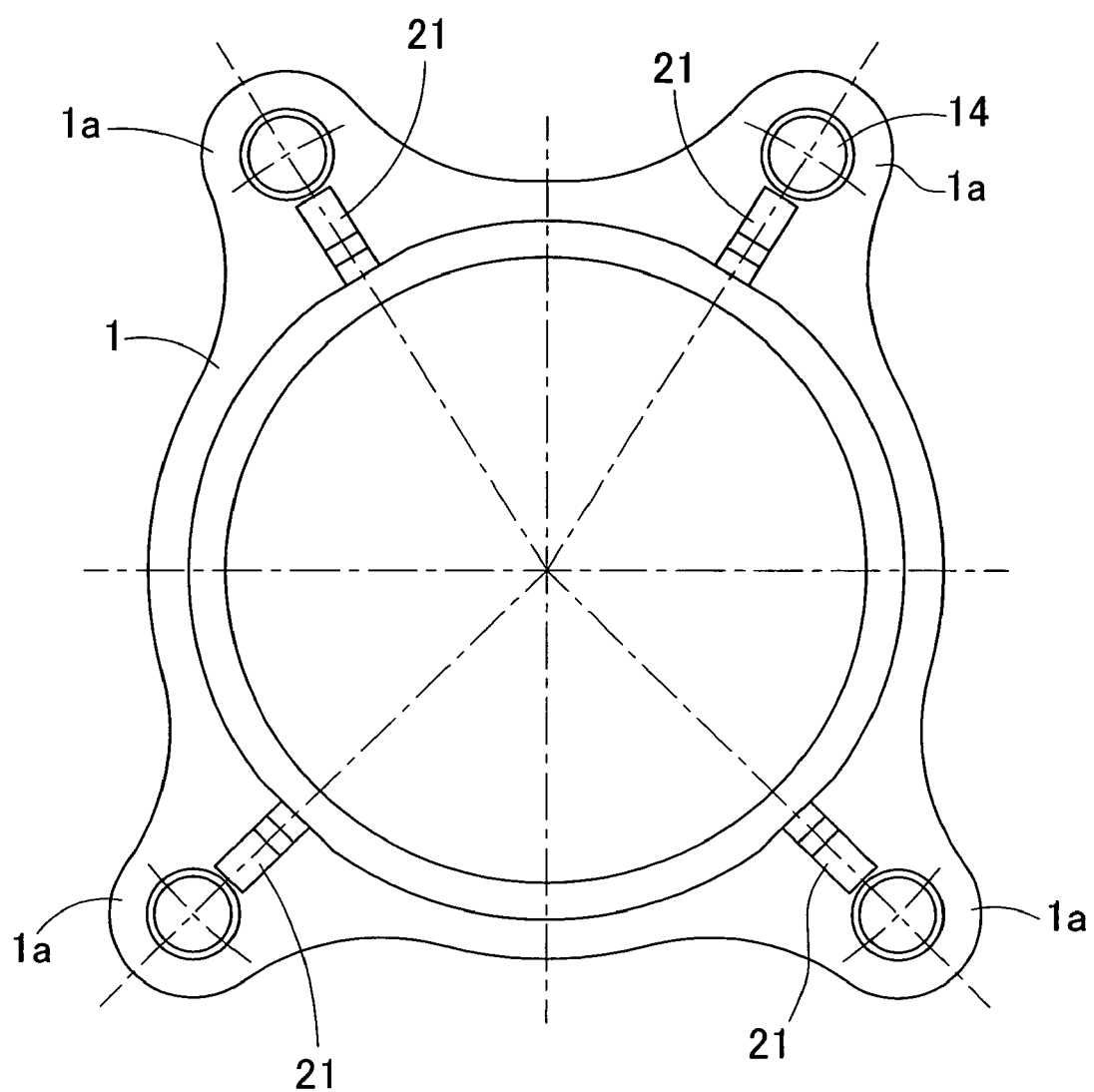
FIG. 4 is a front elevational view showing the outer member and the sensor unit both employed in a different sensor incorporated wheel support bearing assembly.

Also, although in this embodiment the sensor unit 21 has been shown and described as mounted on the outer member 1 at only one location thereof, two of more sensor units 21 may be mounted on the outer member 1 at respective locations thereof as shown in, for example, a modified example of this embodiment shown in FIG. 4. When the sensor unit 21 is mounted on the outer member 1 at the two or more locations thereof, the load can be detected with a further high accuracy.

Figure 5:
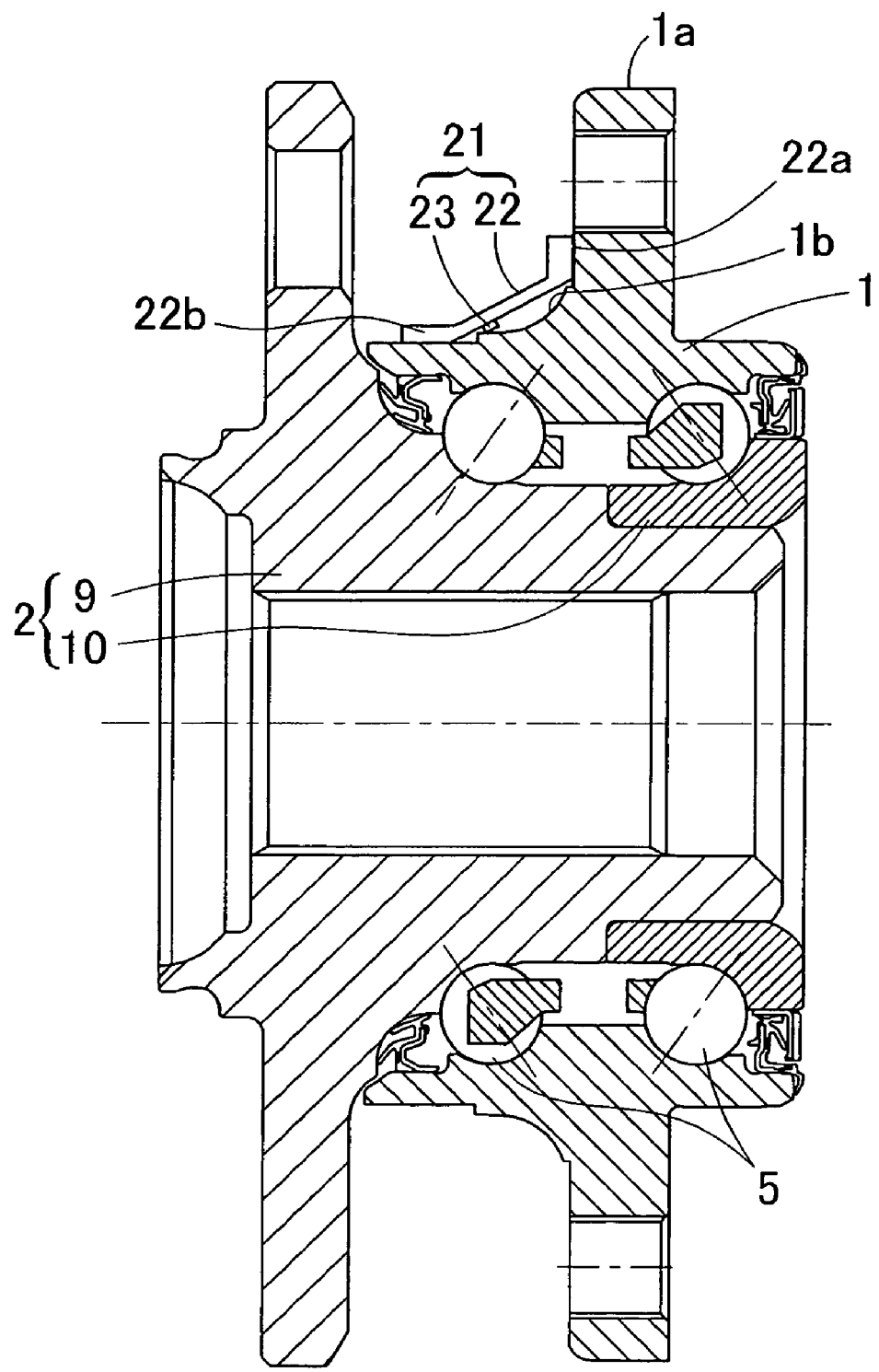
FIG. 5 is a sectional view showing the sensor incorporated wheel support bearing assembly according to a second preferred embodiment of the present invention.
Figure 6A:
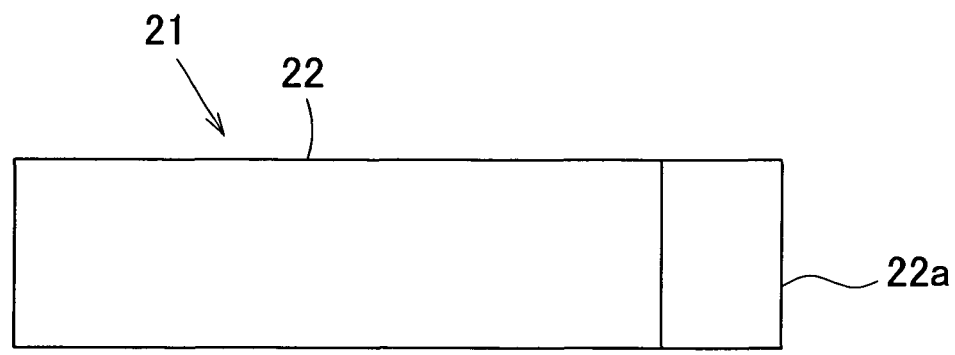
FIG. 6A is a plan view of the sensor unit employed in the sensor incorporated wheel support bearing assembly shown in FIG. 5.
Figure 6B:
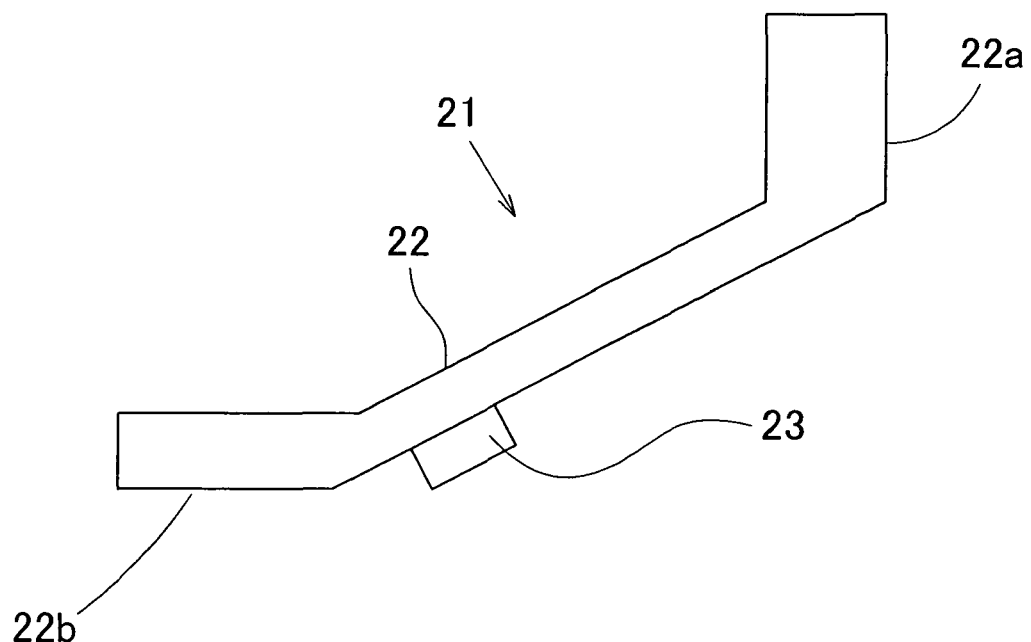
FIG. 6B is a side view of the sensor unit shown in FIG. 6A.

FIG. 5 and FIGS. 6A and 6B illustrate a second preferred embodiment of the present invention, in which the wheel support bearing assembly makes use of the sensor mounting member 22 of the sensor unit 21, which is of a generally linear shape. Even in this case, the sensor mounting member 22 has two contact fixing portions 22a and 22b which contact respectively the outer member 1, and the first contact fixing portion 22a is directly fixed to that portion of the outer member 1 adjacent one of the mounting holes 14 while the second contact fixing portion 22b is held in contact with and fixed to the outer peripheral surface of the outer member 1. Accordingly, the strain occurring in the sensor mounting member 22 corresponds to the strain in that R portion 1b at the base of the flange 1a, which has been transferred to and then arouse having been amplified and, therefore, the strain occurring in the outer member 1 can be detected with high sensitivity and, therefore, the measurement of the strain takes place highly accurately.

Figure 7:
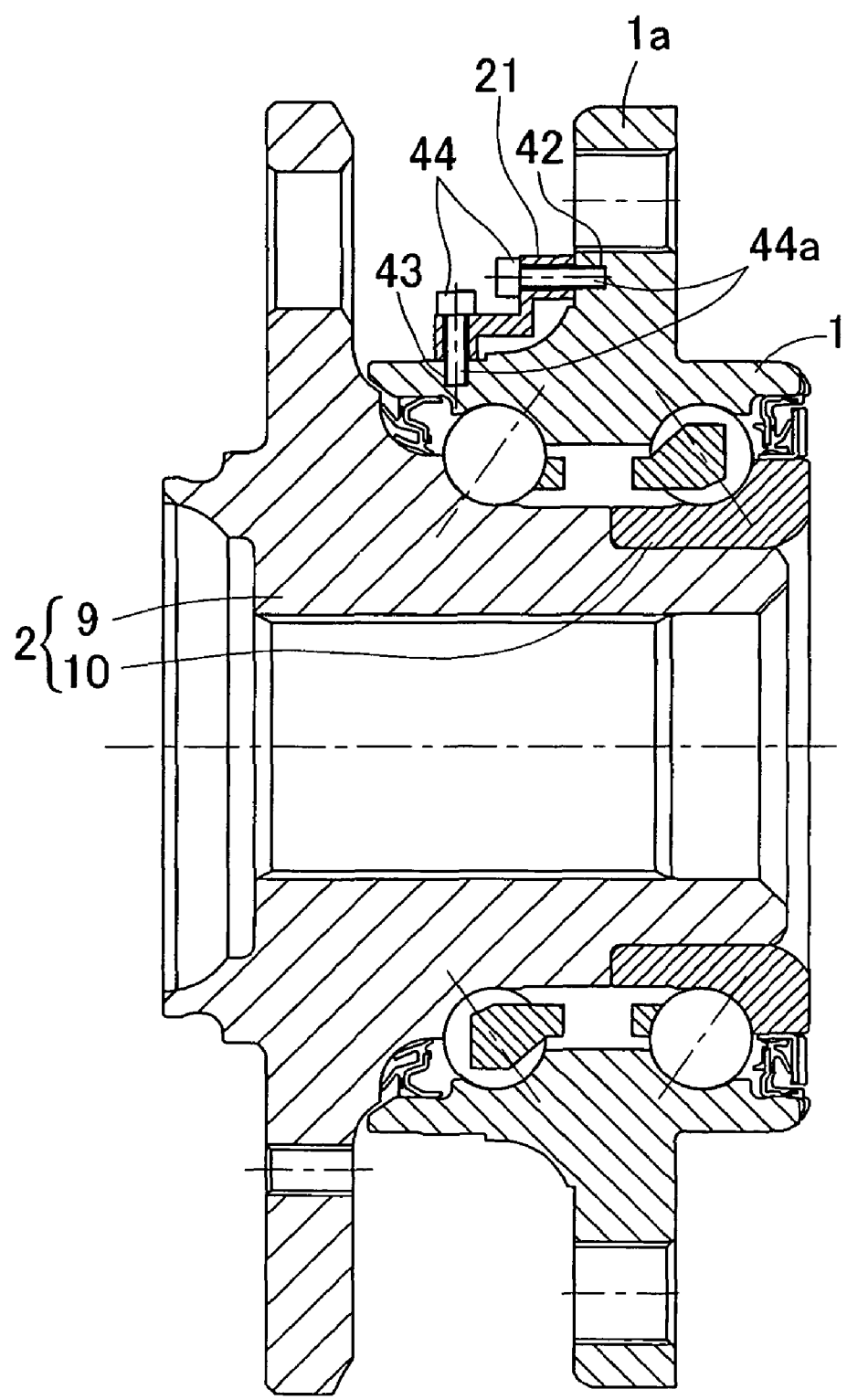
FIG. 7 is a sectional view of the sensor incorporated wheel support bearing assembly according to a third preferred embodiment of the present invention.
Figure 8A:
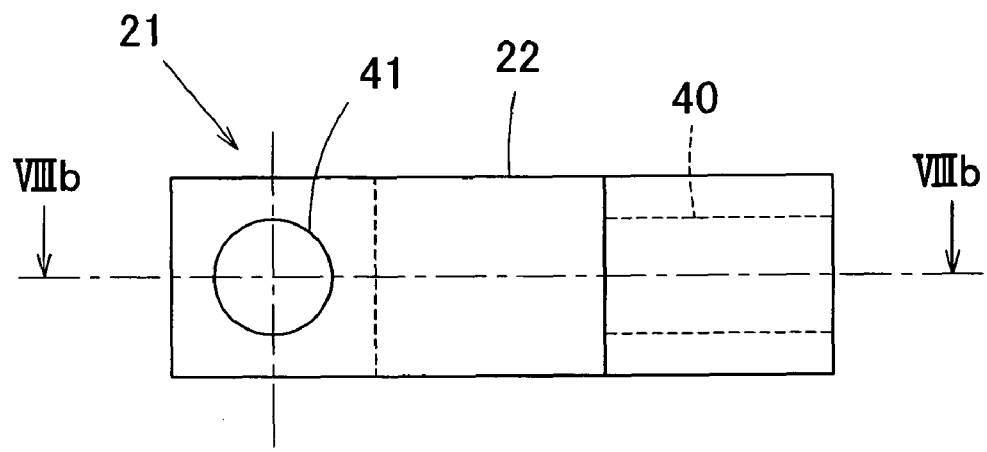
FIG. 8A is a plan view showing a first example of the sensor unit employed in the sensor incorporated wheel support bearing assembly shown in FIG. 7.
Figure 8B:
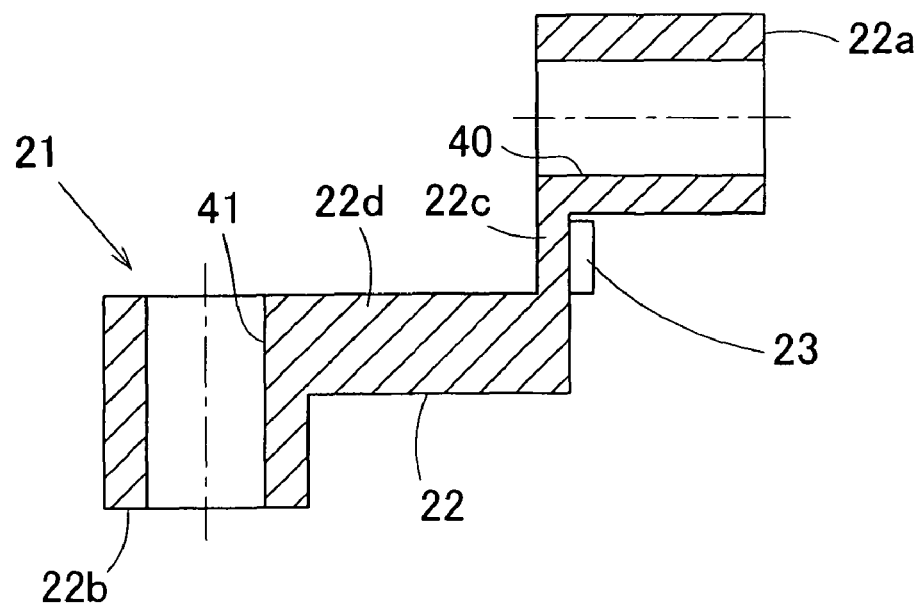
FIG. 8B is a cross-sectional view taken along the line VIIIb-VIIIb in FIG. 8A.

FIG. 7 and FIGS. 8A and 8B illustrate a third preferred embodiment of the present invention. The wheel support bearing assembly according to this embodiment is of a type, in which the sensor mounting member 22 is fixed to the outer member 1 by means of bolts. As best shown in FIGS. 8A and 8B, this sensor mounting member 22 has a shape substantially identical with the sensor mounting member 22 shown in and described with particular reference to FIG. 3, but has the first contact fixing portion 22a formed with an axially extending bolt insertion hole 40 and the second contact fixing portion 22b formed with a radially extending bolt insertion hole 41. The outer member 1 is formed with bolt threading holes 42 and 43, each having a threaded inner peripheral surface thereof at respective locations alignable with the bolt insertion holes 40 and 41. As shown in FIG. 7, the sensor unit 21 is fixed to the outer member 1 with respective bolts 44 inserted from an outer peripheral side into the bolt insertion holes 40 and 41 (precisely speaking, as far as the bolt insertion hole 40 is concerned, the corresponding bolt 44 is inserted from an outboard side) and then threaded into the bolt threading holes 42 and 43 through corresponding male threaded portions 44a thereof.

For fixing the sensor mounting member 22 to the outer member 1 in the manner described above, either a bonding agent or the bolts may be employed. Alternatively, the both may be employed. In addition, without any of the bonding agent and the bolts used, the sensor mounting member 22 and the outer member 1 may be fixed together by means of welding.

Whichever the fixing structure is employed, the sensor mounting member 22 and the outer member 1 can be fixed together firmly. For this reason, the sensor mounting member 22 will not displace in position relative to the outer member 1 and the deformation of the outer member 1 can be accurately transmitted to the sensor mounting member 22.

Figure 9A:
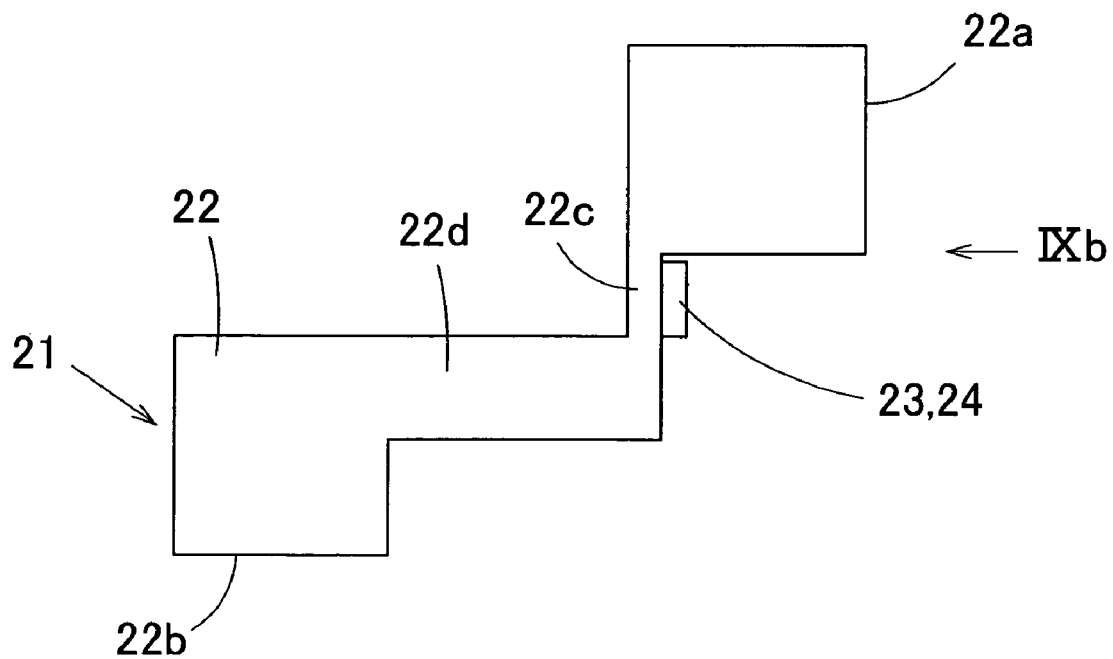
FIG. 9A is a side view showing a second example of the sensor unit employed in the practice of the third embodiment.
Figure 9B:
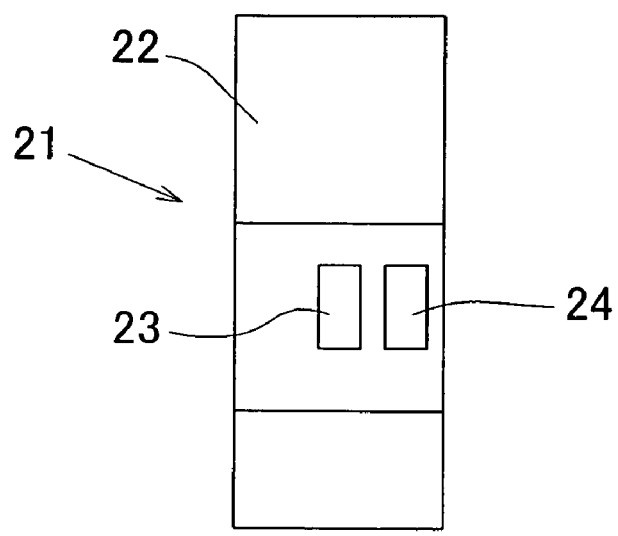
FIG. 9B is a perspective view of the second example of the sensor unit as viewed from an arrow headed direction IXb.

FIGS. 9A and 9B illustrate a second example of the sensor unit. This sensor unit 21 is provided, in addition to the strain sensor 23, with a temperature sensor 24. It is to be noted that the sensor mounting member 22 used therein is of the same shape as that shown in and described with particular reference to FIG. 3, and the strain sensor 23 and the temperature sensor 24 are fitted to the radial portion 22c of the sensor mounting member 22. For the temperature sensor 24, a platinum temperature measuring resistance, a thermocouple or a thermister may be employed. In addition, any other sensor capable of detecting a temperature other than those described above can also be employed.

Even the constant velocity universal joint provided with this sensor unit 21 is so designed that the strain sensor 23 detect the strain occurring in the sensor mounting member 22 and the load imposed on the vehicle wheel measures in reference to such strain. In the meanwhile, the wheel support bearing assembly is susceptible to change in temperature and the change in temperature affects the strain in the sensor mounting member 22 and/or the operation of the strain sensor 23. In view of this, by detecting the temperature of the sensor mounting member 22 by means of the temperature sensor 24 arranged on the sensor mounting member 22 to correct an output from the strain sensor 23 with the temperature so detected, influence tending to be brought about by the temperature of the strain sensor 23 can be eliminated. Accordingly, the detection of the load with high accuracy can be achieved.

Figure 10A:
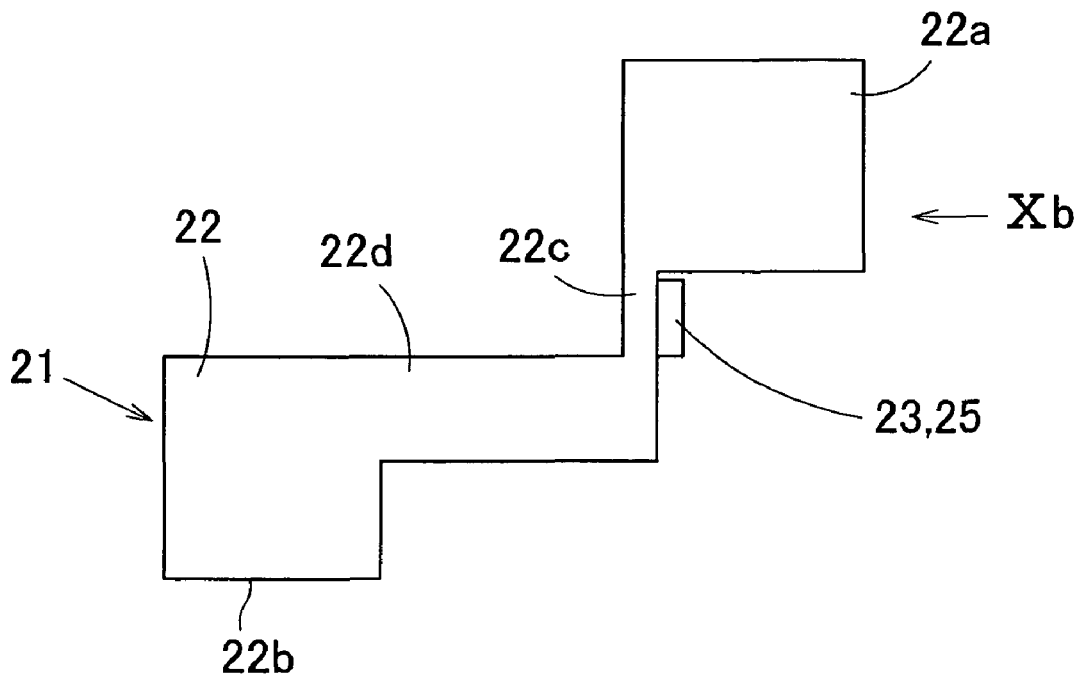
FIG. 10A is a side view showing a third example of the sensor unit employed in the practice of the third embodiment.
Figure 10B:
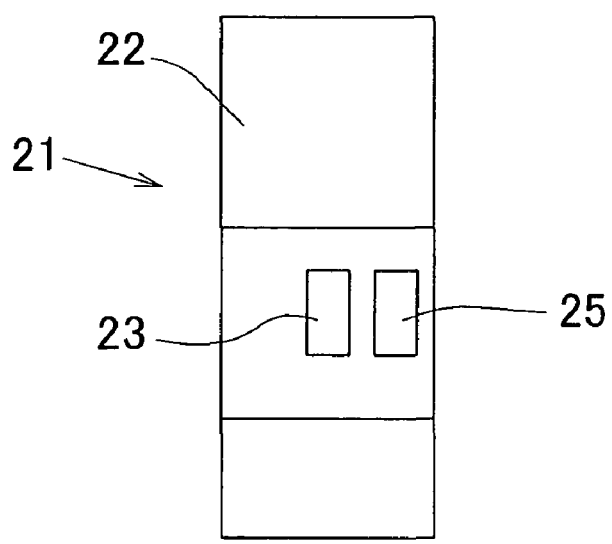
FIG. 10B is a perspective view of the second example of the sensor unit as viewed from an arrow headed direction Xb.

FIGS. 10A and 10B illustrate a third example of the sensor unit. This sensor unit 21 is provided with an additional sensor 25, in addition to the strain sensor 23. The additional sensor 25 is in the form of at least one of an acceleration sensor and a vibration sensor. It is to be noted that the sensor mounting member 22 has the same shape as that shown in and described with particular reference to FIG. 3, and the strain sensor 23 and the additional sensor 25 are fitted to the radial portion 22c of the sensor mounting member 22.

As hereinabove described, by fitting the strain sensor 23 and the additional sensor 25 to the sensor mounting member 22, the load and the status of the wheel support bearing assembly can be measured at one site and the wiring or the like can be simplified.

Figure 11:
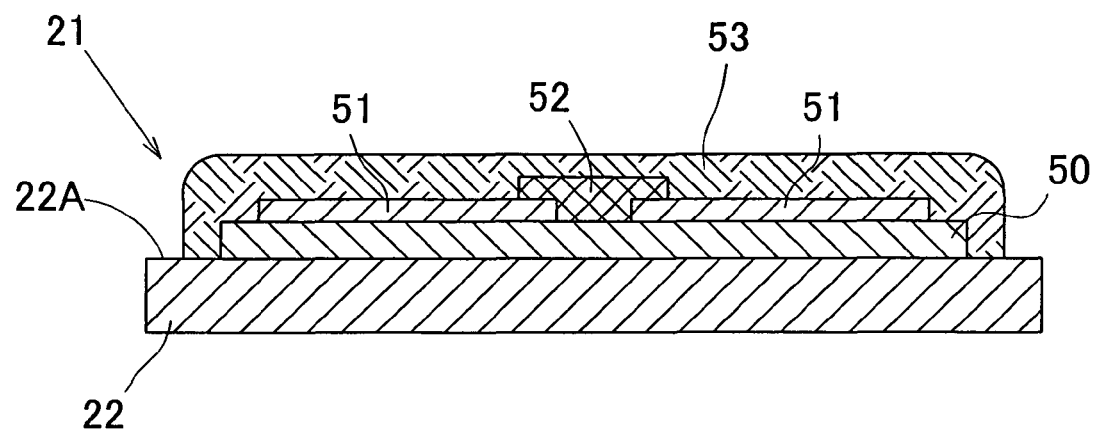
FIG. 11 is a diagram showing a sectional structure of a third example of the sensor unit employed in the practice of the third embodiment.

FIG. 11 illustrates the structure of a sensor unit (a fourth example) formed with a strain sensor in a manner different from that according to any one of the foregoing embodiments. The sensor unit 21 shown therein is of a structure including an insulating layer 50 formed on the sensor mounting member 22, a pair of electrodes 51 and 51 formed on a surface of the insulating layer 50, a strain measuring resistance element 53, which eventually forms the strain sensor, formed over the insulating layer 50 and between the pair of the electrodes 51 and 51, and a protective film 53 formed over the electrodes 51 and 51 and the strain measuring resistance element 52.

A method of making such sensor unit 21 will be described hereinafter. At the outset, on a surface of the sensor mounting member 22 made of a metallic material such as a stainless steel or the like, an insulating material such as glass is printed and then baked to form the insulating layer 50. Subsequently, on a surface of the insulating layer 50 so formed, an electro-conductive material is printed and then based to form the electrodes 51 and 51. Thereafter, between the electrodes 51 and 51 so formed, a material, which eventually form a resistance element, is printed and then baked to form the strain measuring resistance element 52. Finally, for protecting the electrodes 51 and 51 and the strain measuring resistance element 52, the protective film 53 is formed.

The strain sensor is generally fixed to the sensor mounting member 22 by means of bonding, but such a fixture may adversely affect the detection performed by the strain sensor when the bonding strength is lowered as a result of aging, and constitutes an increase of the cost. In contrast thereto, where the sensor unit 21 is of a structure in which the insulating layer 50 is formed by printing and baking on the surface of the sensor mounting member 22 and the electrodes 51 and 51 and the strain measuring resistance element 52, which forms the strain sensor, are formed by printing and baking, the reliability can be increased and the cost can be reduced.

Figure 12:
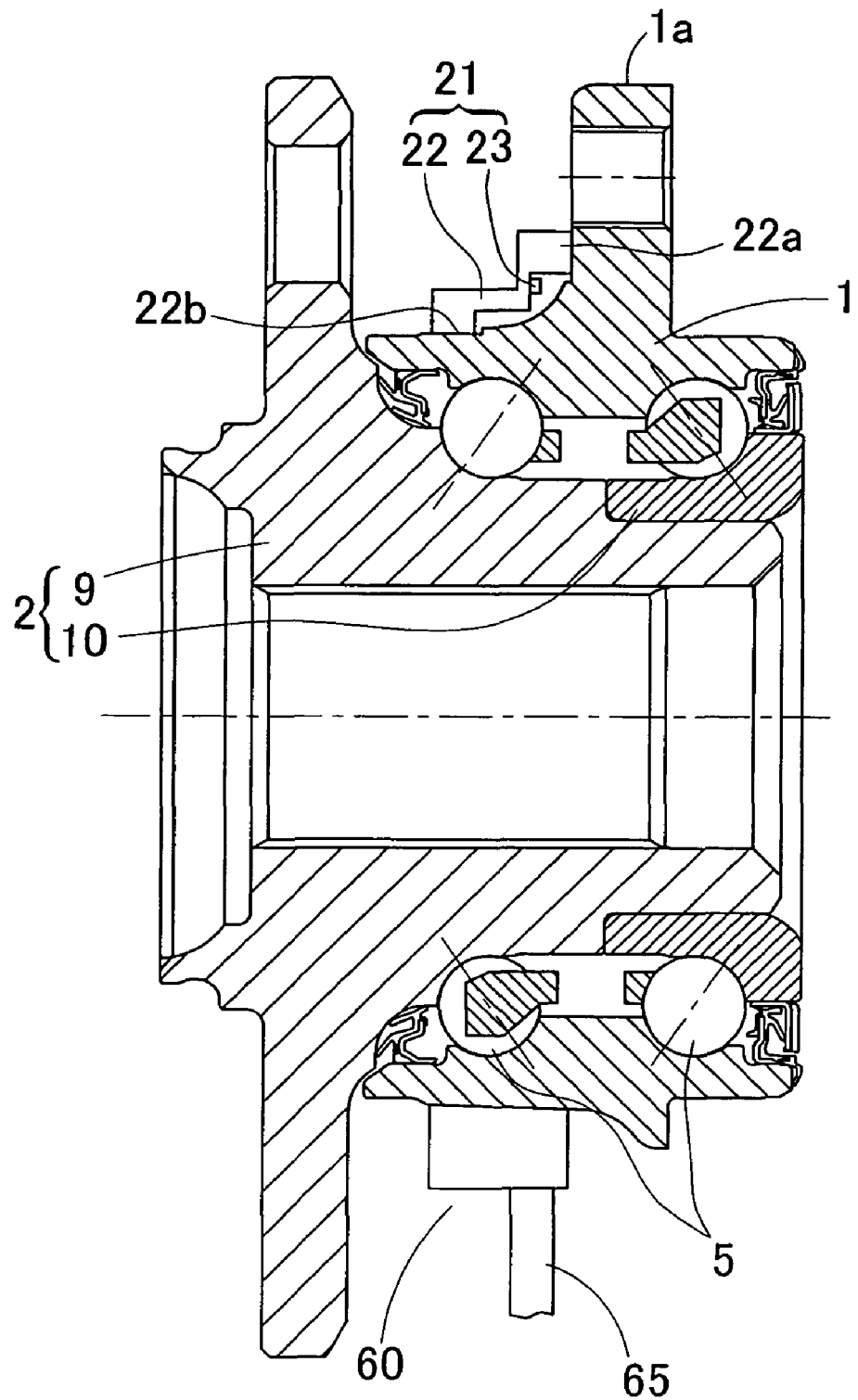
FIG. 12 is a sectional view of the sensor incorporated wheel support bearing assembly according to a fourth preferred embodiment of the present invention.
Figure 13:
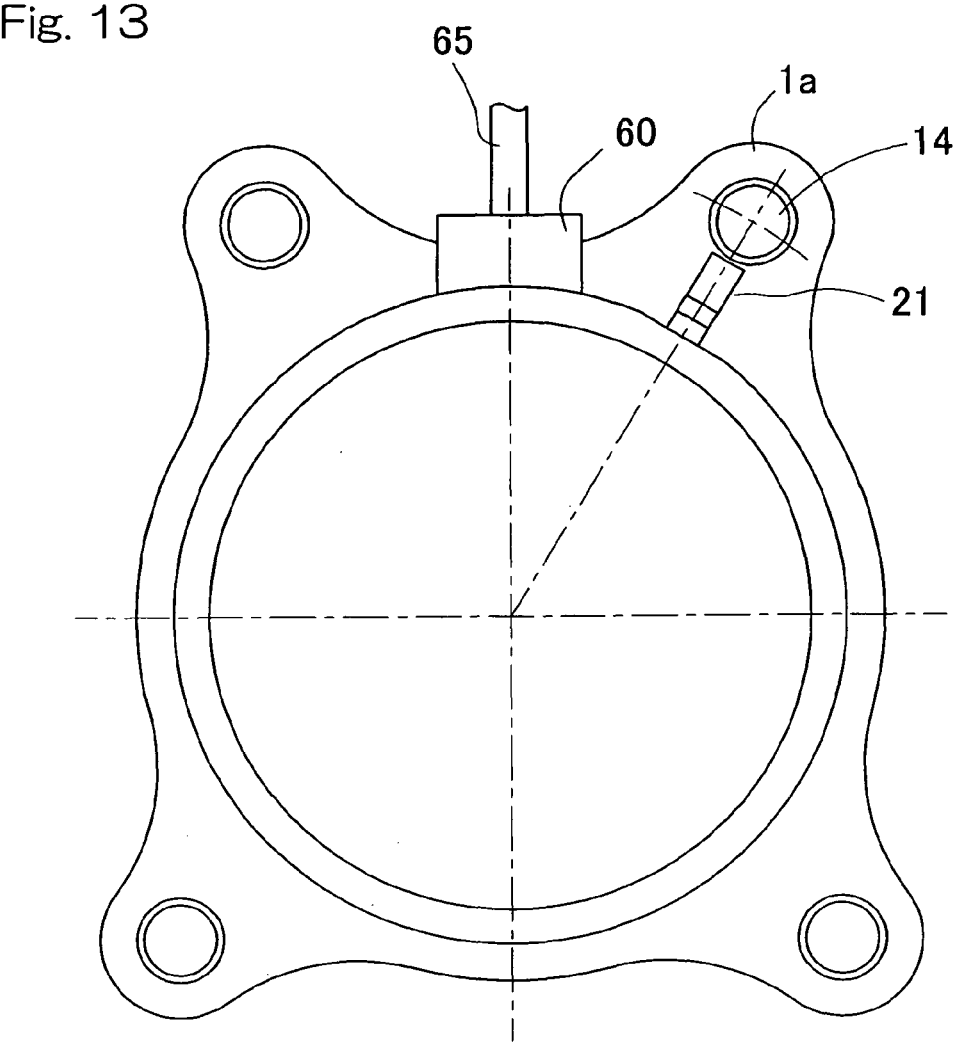
FIG. 13 is a front elevational view showing the outer member and the sensor unit both employed in the sensor incorporated wheel support bearing assembly shown in FIG. 12.
Figure 14:
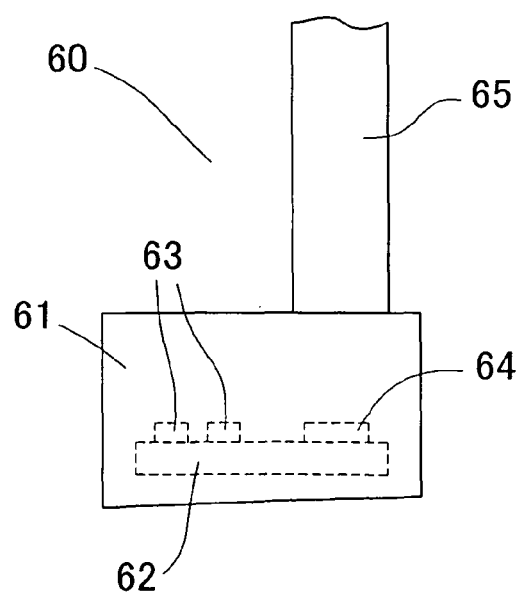
FIG. 14 is a side view showing a sensor signal processing circuit unit.

FIGS. 12 to 14 illustrate a fourth preferred embodiment of the present invention. The wheel support bearing assembly shown therein has a sensor signal processing circuit unit 60 incorporated therein for processing respective outputs of the strain sensor and the various types of sensors (temperature sensor, acceleration sensor and vibration sensor), all provided on the sensor unit 21. This sensor signal processing circuit unit 60 is mounted on the outer peripheral surface of the outer member 1.

The sensor signal processing circuit unit 60 includes a circuit substrate 62 made of, for example, a glass epoxy or the like and accommodated within a housing 61 made of a resinous material or the like, and electric and electronic component parts 63 in the form of an operational amplifier, a resistor, and a microcomputer or the like for processing an output signal of the strain sensor 23, and a power supply for driving the strain sensor 23, are arranged on the circuit substrate 62. Also, the sensor signal processing circuit unit 60 has a connector 64 for connecting a wiring of the strain sensor 23 with the circuit substrate 62. In addition, it includes a cable 65 for the electric power supply from the outside and outputting therethrough to the outside output signals processed by the sensor signal processing circuit. Where the sensor unit 21 is provided with the previously described various sensors (temperature sensor, acceleration sensor and vibration sensor) such as in this embodiment, the sensor signal processing circuit unit 60 is provided with the circuit substrates 62, the electric and electronic component parts 63, the connectors 64, the cables 65 and so on (not shown), which are respectively associated with those sensors.

Figure 16:
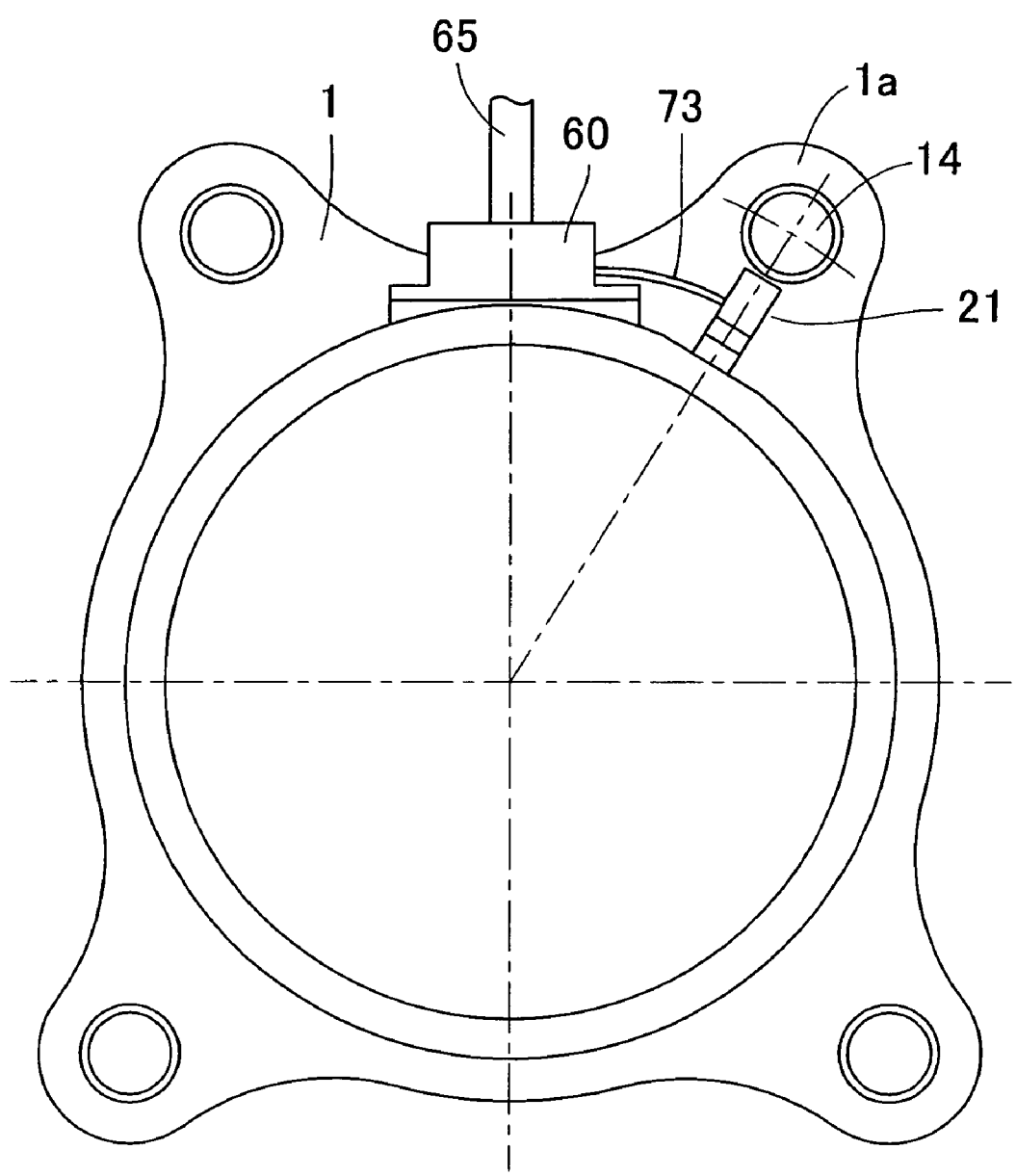
FIG. 16 is an explanatory diagram showing a manner of installation of a cable in the embodiment shown in FIGS. 12 to 14.

In general, the sensor signal processing circuit unit for processing the respective outputs of the sensors provided in the wheel support bearing assembly is provided in an electric control unit (ECU) of the automotive vehicle, but the provision of the sensor signal processing circuit unit 60 in the vicinity of the sensor unit 21 in the wheel support bearing assembly such as in this embodiment is effective to simplify the labor incurred in connecting the sensor unit 21 with the sensor signal processing circuit unit 60 by means of wiring, and the sensor signal processing circuit unit 60 can be more compactly installed than to provide the sensor signal processing circuit unit 60 at a location other than the wheel support bearing assembly.

Where the sensor signal processing circuit unit 60 is employed as hereinabove described, the sensor unit 21 and the sensor signal processing circuit unit 60 can be connected with each other with a short cable 73 as shown in FIG. 16. For this reason, an external force and/or vibration which would act on the cable 65 used to connect the sensor signal processing circuit unit 60 with the outside of the wheel support bearing assembly, will not be extended to the sensor unit 21. Also, since the cable 65 for external connection is fixed to a casing of the sensor signal processing circuit unit 60 fixed to the outer member 1, the cable 65 for external connection itself can have an increased durability against the external force and/or vibration.

A fifth preferred embodiment of the present invention will now be described with particular reference to FIGS. 17 to 19A and 19B. The basic structure of this embodiment is substantially similar to that according to the previously described first embodiment except for the following points.

Figure 19A:
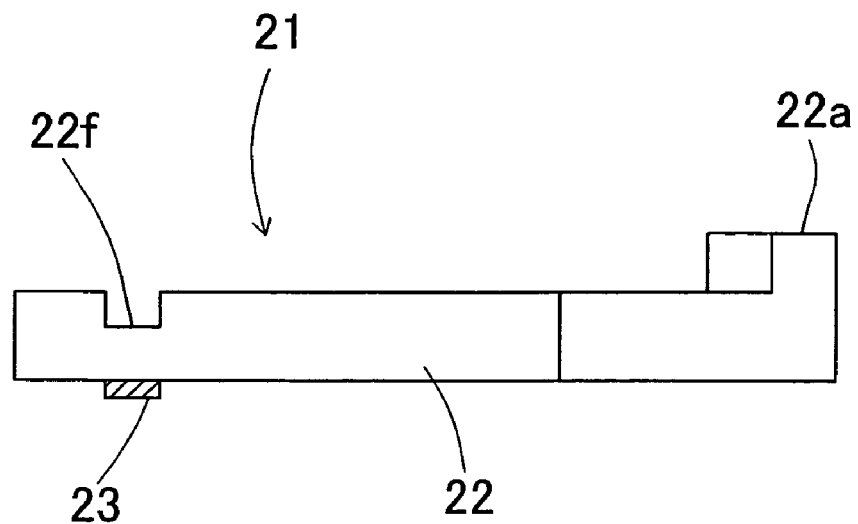
FIG. 19A is a top plan view of the sensor unit employed in the sensor incorporated wheel support bearing assembly shown in FIG. 17.
Figure 19B:
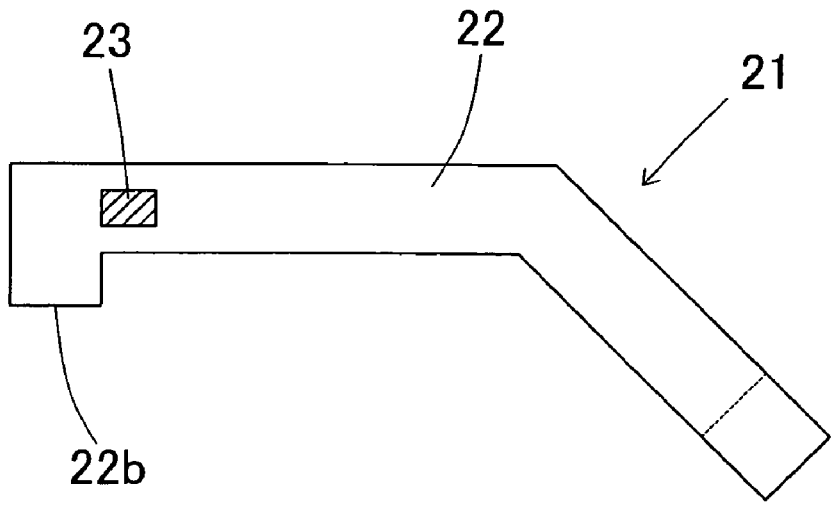
FIG. 19B is a front elevational view of the sensor unit shown in FIG. 19A.

The outer member 1 has the outer periphery provided with a sensor unit 21 such as shown in FIGS. 19A and 19B. This sensor unit 21 includes a sensor mounting member 22 fitted with a strain sensor 23 for measuring the strain occurring in the sensor mounting member 22. The sensor mounting member 22 in this embodiment is in the form of a generally elongated member bent at an intermediate portion thereof and has its opposite ends formed with first and second contact fixing portions 22a and 22b. The sensor mounting member 22 has a cutout portion 22f formed at a location thereof in the vicinity of the second contact fixing portion 22b, which cutout portion 22f has considerably reduced rigidity compared with that of any other portions thereof. The strain sensor 23 is fitted at a location where the cutout portion 22f is so formed.

Figure 17:
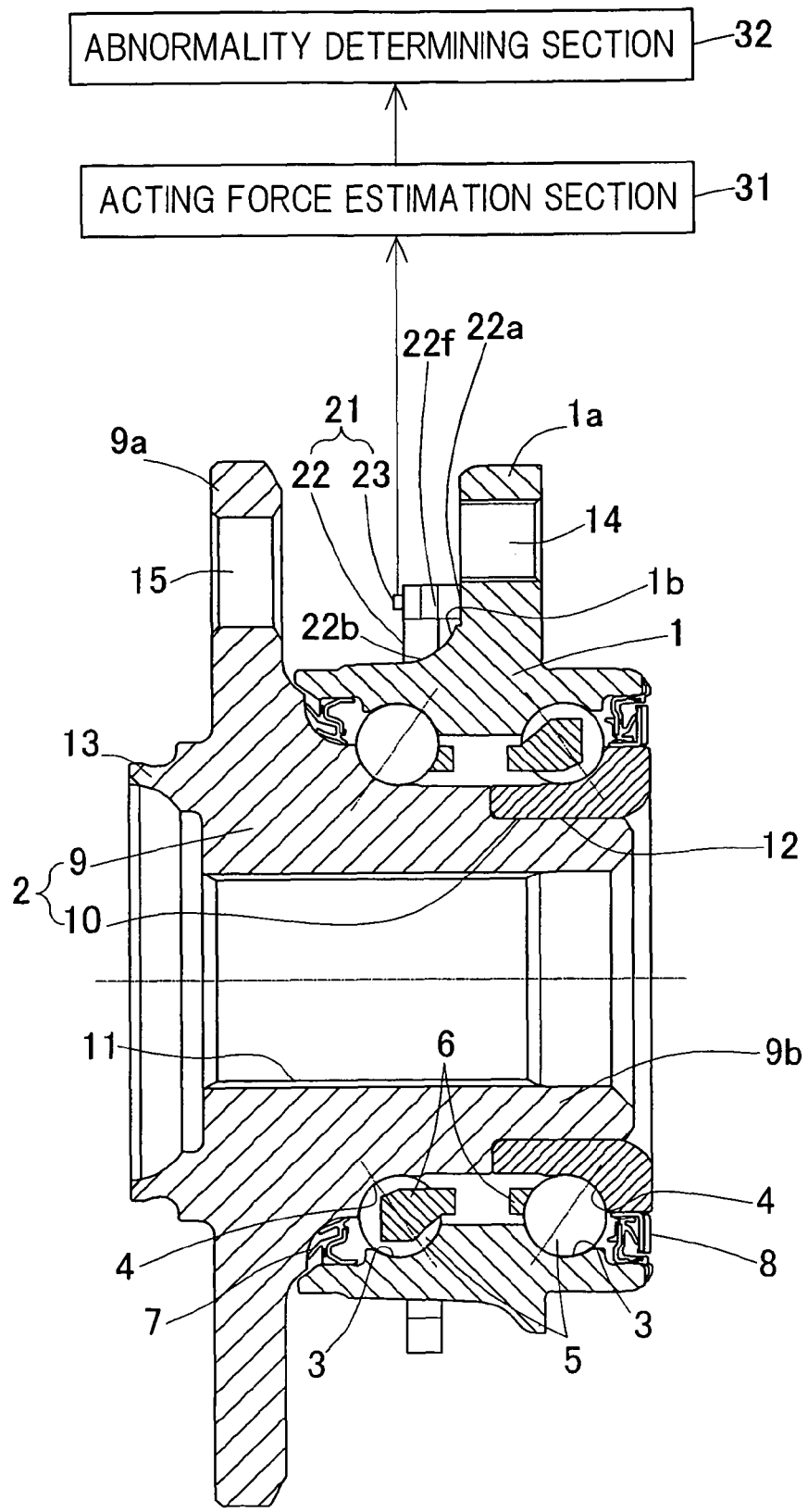
FIG. 17 is a sectional view showing the sensor incorporated wheel support bearing assembly according to a fifth preferred embodiment of the present invention together with a block diagram showing a conceptual construction of the detecting system therefor.
Figure 18:
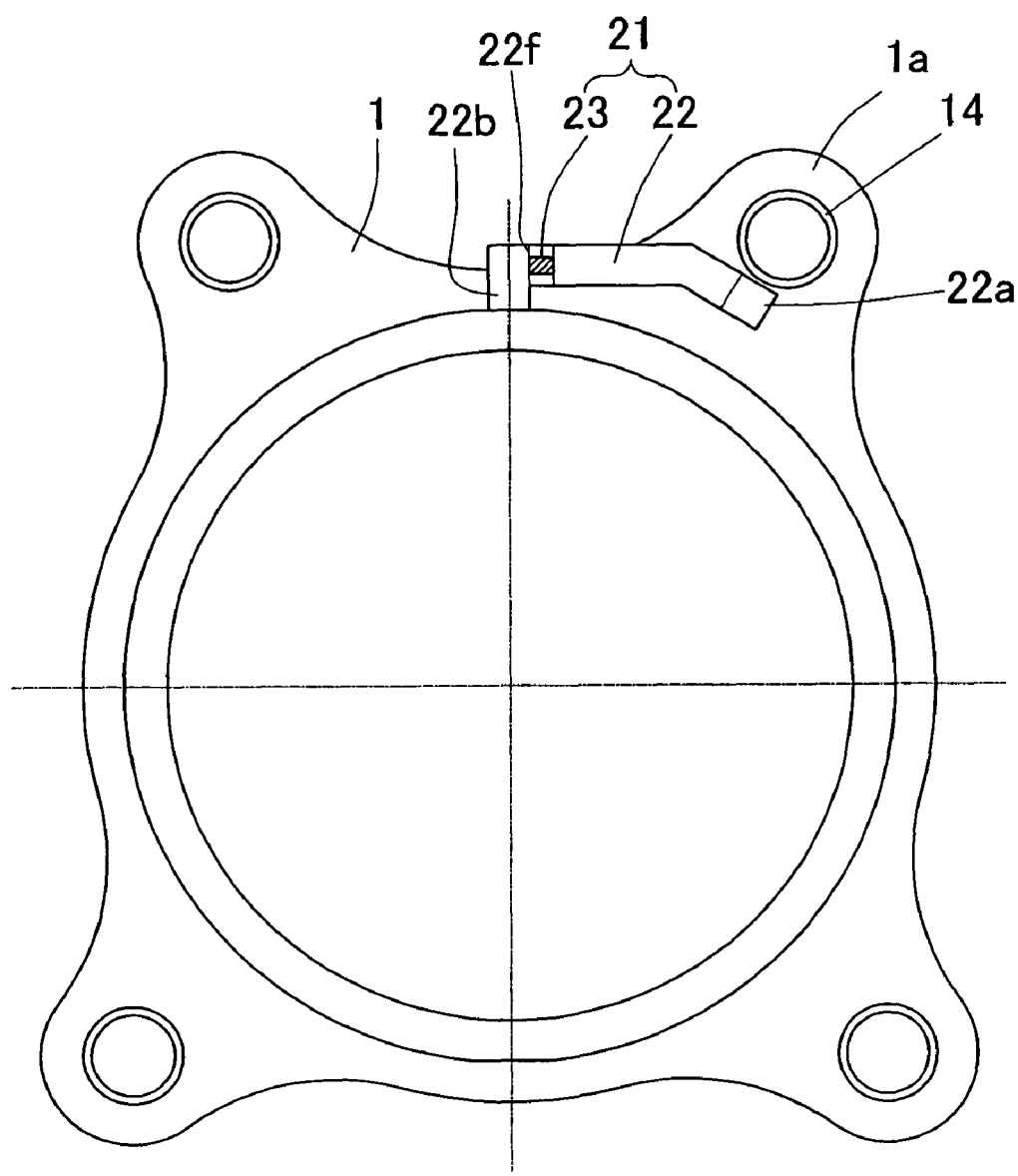
FIG. 18 is a front elevational view showing the outer member and the sensor unit both employed in the sensor incorporated wheel support bearing assembly shown in FIG. 17.

The sensor unit 21 referred to above is, as best shown in FIGS. 17 and 18, fixed to the outer periphery of the outer member 1 with the first contact fixing portion 22a of such sensor mounting member 22 held in contact with and fixed to a portion of a side surface of the flange 1a adjacent one of the vehicle body mounting holes 14 and with the second contact fixing portion 22b held in contact with and fixed to the outer peripheral surface of the outer member 1. The second contact fixing portion 22b is positioned on a portion of the peripheral surface that is different in phase in the circumferential direction of the outer member 1, from that of the first contact fixing portion 22a and fixed to a portion of the peripheral surface of the outer member 1 at a circumferential position where the flange 1a does not exist on the outer periphery. An axial position of the outer member 1 to which the second contact fixing portion 22b is fixed is chosen to be, for example, in the vicinity of the outboard raceway surface 3 or a portion on the outboard side of the raceway surface 3.

The operation of the sensor incorporated wheel support bearing assembly of the construction described above will now be described. When the load is imposed on the hub unit 9, the outer member 1 is deformed through the rolling elements 5 and such deformation is transmitted to the sensor mounting member 22 that fitted to the outer member 1, resulting in a corresponding deformation of the sensor mounting member 22. The strain then occurring in the sensor mounting member 22 is measured by the strain sensor 23. At this time, the sensor mounting member 22 undergoes deformation as the flange 1a of the outer member 1 and the outer peripheral surface deform, but in view of the presence of the cutout portion 22f where the rigidity of the sensor mounting member 22 is considerably lower than that at any other portion thereof, the strain is concentrated on that portion and arises as a strain larger than that in the outer member 1. This large strain is measured by the strain sensor 23 and, therefore, the strain occurring in the outer member 1 can be detected with high sensitivity and the strain measuring accuracy can be increased.

Also, in the case of this embodiment, the first contact fixing portion 22a is fixed to a side face of the flange 1a, while the second contact fixing portion 22b is fixed to that portion of the peripheral surface of the outer member 1 where the flange 1a does not exist circumferentially in the outer periphery. Since the flange 1a is susceptible to a considerable force from the automotive suspension system, the magnitude of the strain occurring in the flange portion 1a and that occurring in a portion other than that flange portion 1a are different from each other even though the both occur in the outer member 1. In such case, when the first contact fixing portion 22a lies in the vicinity of one of the vehicle body mounting holes 14 in the flange 1a, an influence brought about by the force from the suspension system is so strong that the strain will arise largely. For this reason, the provision of the sensor mounting member 22 between the above described portions is effective to allow the strain to arise further largely in the sensor mounting member 22 and, therefore, the strain measuring accuracy can be increased.

Figure 20:
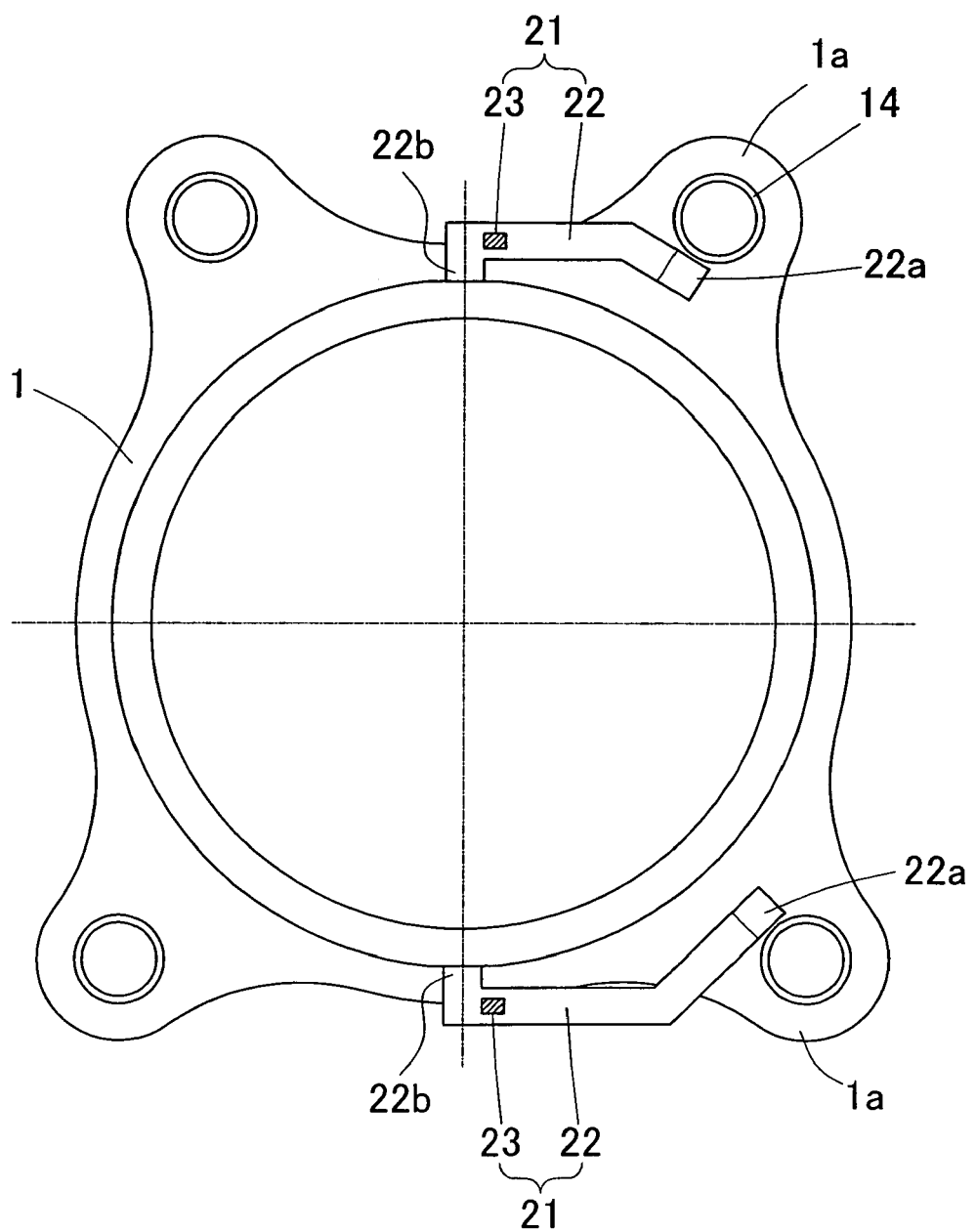
FIG. 20 is a front elevational view showing the outer member and the sensor unit both employed in a modified example of the sensor incorporated wheel support bearing assembly according to the fifth preferred embodiment.
Figure 21:
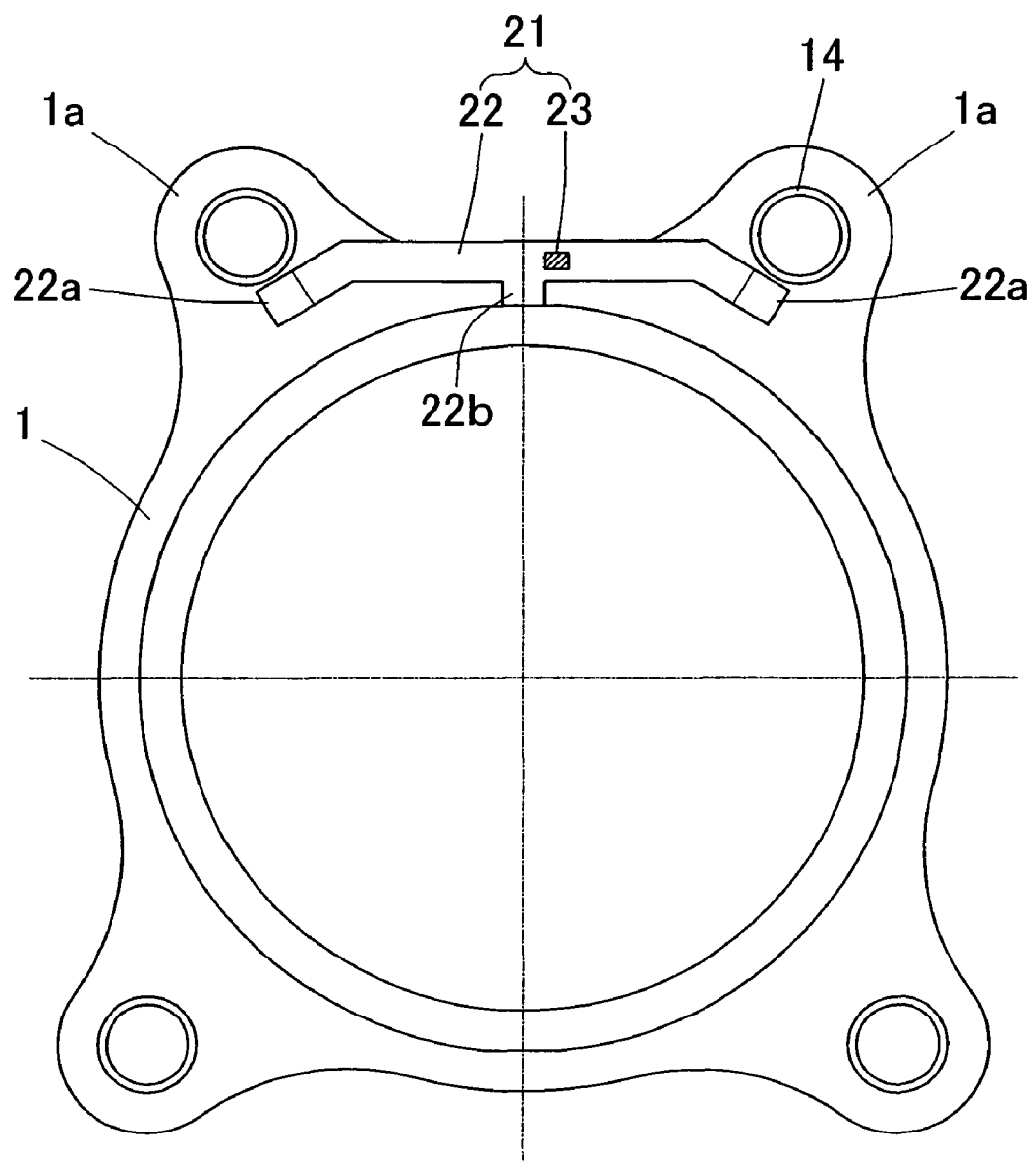
FIG. 21 is a front elevational view showing the outer member and the sensor unit both employed in another modified example of the sensor incorporated wheel support bearing assembly according to the fifth preferred embodiment.

Also, although in this embodiment the sensor unit 21 has been shown and described as provided at only one location, two or more sensor units 21 may be provided at respective two or more locations as shown in, for example, a modification shown in FIG. 20. By providing the sensor units 21 at two or more locations, the load can be detected with further high accuracy.

At this time, where it is difficult to employ a plurality of sensor units 21 for reason of the available space or the like, a plurality of first contact fixing portions 22a that are held in contact with and fixed to the flange 1a of the outer member 1 may be provided at respective locations so that the first contact fixing portions 22a can be directly fixed to respective portions of different flanges 1a adjacent the associated vehicle body mounting holes 14. Also in such case, the cutout portion 22f for reducing the rigidity more considerably than that at any other portions is formed in the vicinity of the second contact fixing portion 22b that is held in contact with the fixed to the outer peripheral surface of the outer member 1, and the strain sensor 23 is fitted to that portion where the cutout portion 22f is defined. Even when the construction is employed, a highly accurate load detection can be accomplished.

Figure 22:
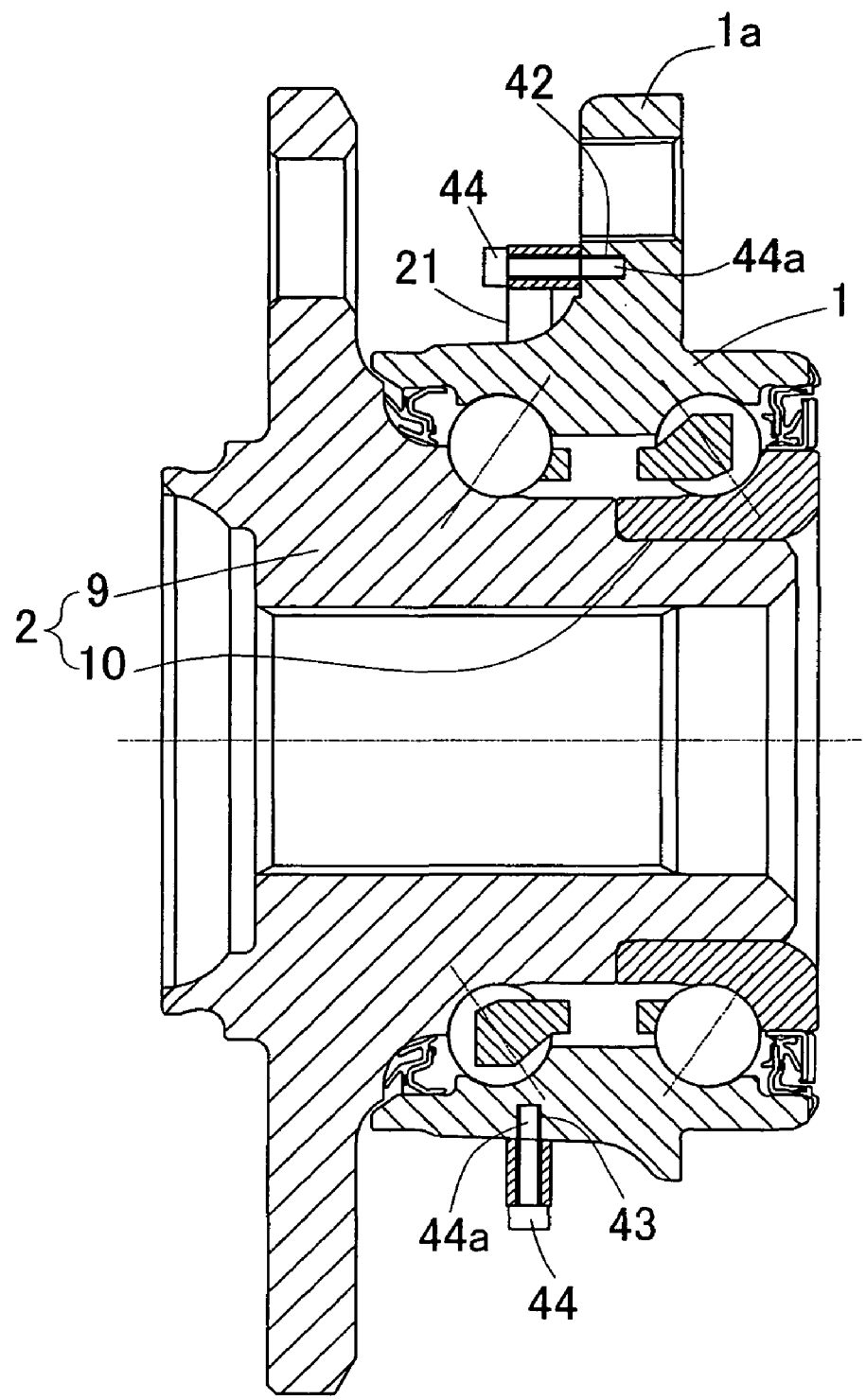
FIG. 22 is a sectional view showing the sensor incorporated wheel support bearing assembly according to a sixth preferred embodiment of the present invention.
Figure 23:
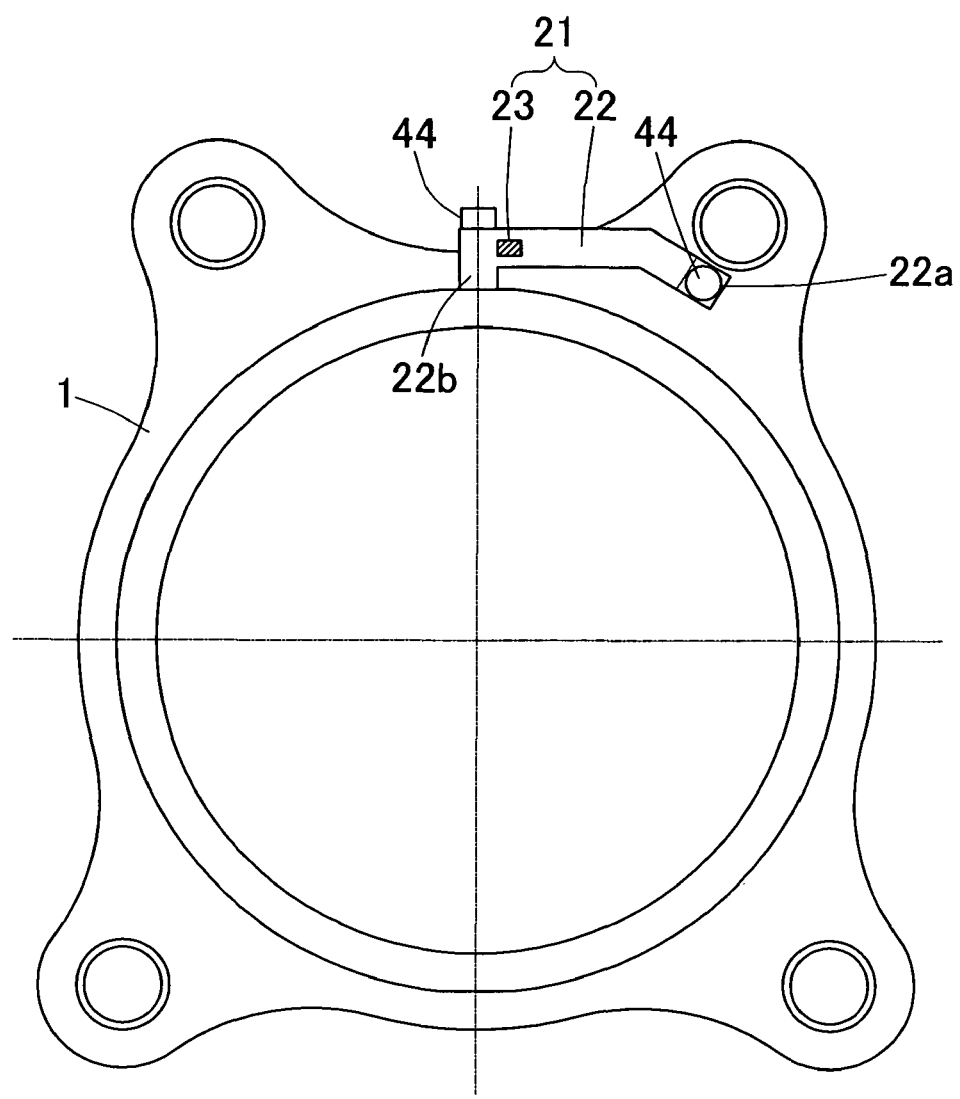
FIG. 23 is a front elevational view showing the outer member and the sensor unit both employed in the sensor incorporated wheel support bearing assembly shown in FIG. 22.
Figure 24A:
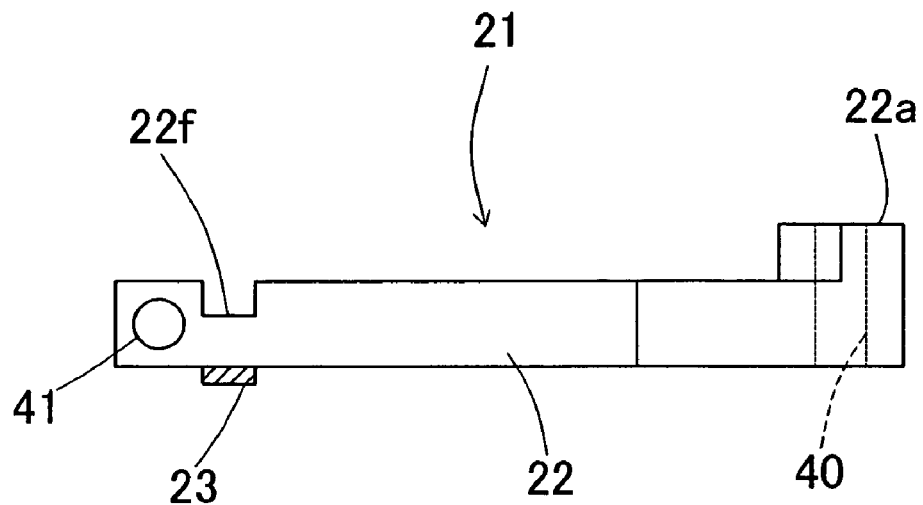
FIG. 24A is a to plan view of the sensor unit in the sensor incorporated wheel support bearing assembly shown in FIG. 22.
Figure 24B:
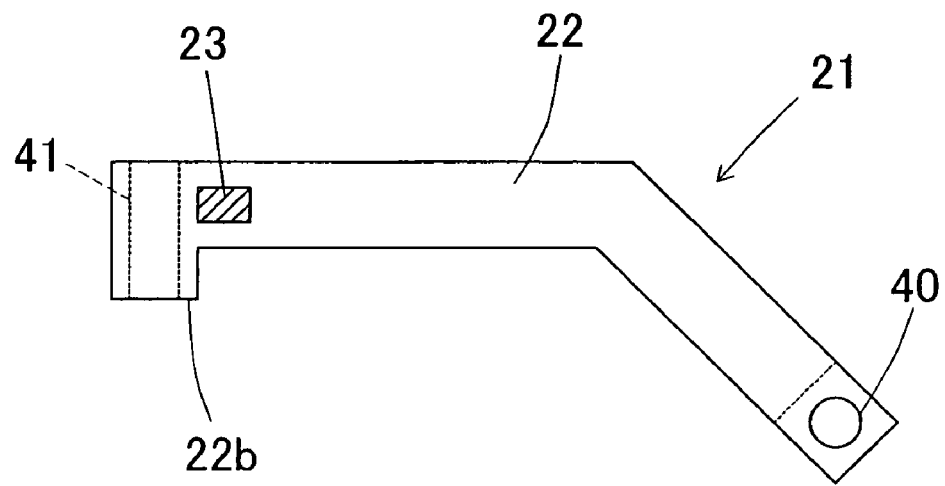
FIG. 24B is a front elevational view of the sensor unit in the sensor incorporated wheel support bearing assembly shown in FIG. 24A.

FIGS. 22 to 24A and 24B illustrate a sixth preferred embodiment of the present invention. The wheel support bearing assembly according to this embodiment is of a type, in which the sensor mounting member 22 is fixed to the outer member 1 by means of bolts. As best shown in FIGS. 24A and 24B, this sensor mounting member 22 has a shape substantially identical with the sensor mounting member 22 shown in and described with particular reference to FIG. 3, but has the first contact fixing portion 22a formed with an axially extending bolt insertion hole 40 and the second contact fixing portion 22b formed with a radially extending bolt insertion hole 41. The outer member 1 is formed with bolt threading holes 42 and 43, each having a threaded inner peripheral surface thereof at respective locations alignable with the bolt insertion holes 40 and 41. As shown in FIGS. 22 and 23, the sensor unit 21 is fixed to the outer member 1 with respective bolts 44 inserted from an outer peripheral side into the bolt insertion holes 40 and 41 (precisely speaking, as far as the bolt insertion hole 40 is concerned, the corresponding bolt 44 is inserted from an outboard side) and then threaded into the bolt threading holes 42 and 43 through corresponding male threaded portions 44a thereof.

For fixing the sensor mounting member 22 to the outer member 1 in the manner described above, either a bonding agent or the bolts may be employed. Alternatively, the both may be employed. In addition, without any of the bonding agent and the bolts used, the sensor mounting member 22 and the outer member 1 may be fixed together by means of welding.

Whichever the fixing structure is employed, the sensor mounting member 22 and the outer member 1 can be fixed together firmly. For this reason, the sensor mounting member 22 will not displace in position relative to the outer member 1 and the deformation of the outer member 1 can be accurately transmitted to the sensor mounting member 22.

Figure 25A:
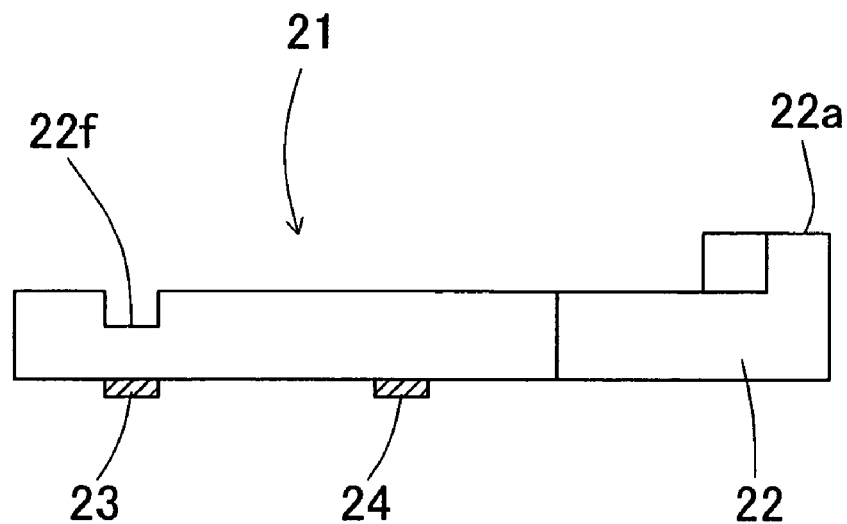
FIG. 25A is a top plan view of a second example of the sensor unit employed in the practice of the sixth embodiment.
Figure 25B:
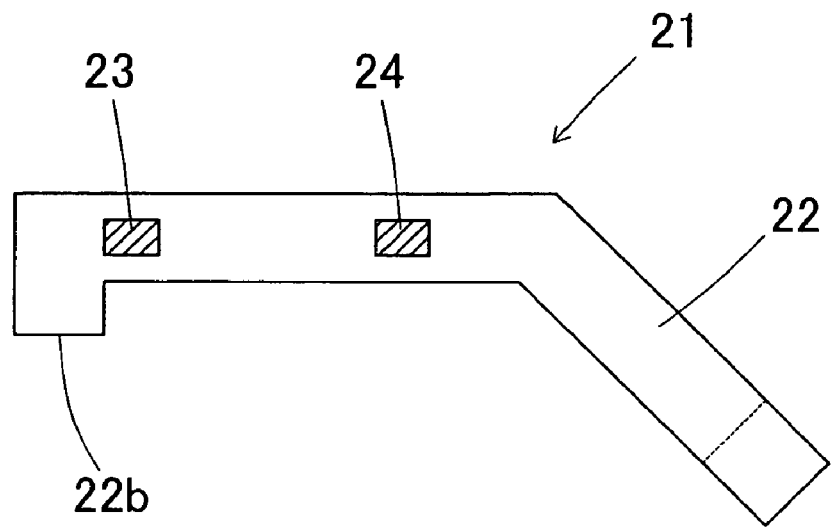
FIG. 25B is a front elevational view of the second example of the sensor unit employed in the practice of the sixth embodiment.

FIGS. 25A and 25B illustrate a second example of the sensor unit that is employed in the previously described embodiment. This sensor unit 21 is provided, in addition to the strain sensor 23, with a temperature sensor 24. It is to be noted that the sensor mounting member 22 used therein is of the same shape as that shown in and described with particular reference to FIG. 19, and the strain sensor 23 and the temperature sensor 24 are fitted to the radial portion 22f of the sensor mounting member 22. For the temperature sensor 24, a platinum temperature measuring resistance, a thermocouple or a thermister may be employed. In addition, any other sensor capable of detecting a temperature other than those described above may also be employed.

Even the constant velocity universal joint provided with this sensor unit 21 is so designed that the strain sensor 23 detect the strain occurring in the sensor mounting member 22 and the load imposed on the vehicle wheel measures in reference to such strain. In the meanwhile, the wheel support bearing assembly is susceptible to change in temperature and the change in temperature affects the strain in the sensor mounting member 22 and/or the operation of the strain sensor 23. In view of this, by detecting the temperature of the sensor mounting member 22 by means of the temperature sensor 24 arranged on the sensor mounting member 22 to correct an output from the strain sensor 23 with the temperature so detected, influence tending to be brought about by the temperature of the strain sensor 23 can be eliminated. Accordingly, the detection of the load with high accuracy can be achieved.

Figure 26A:
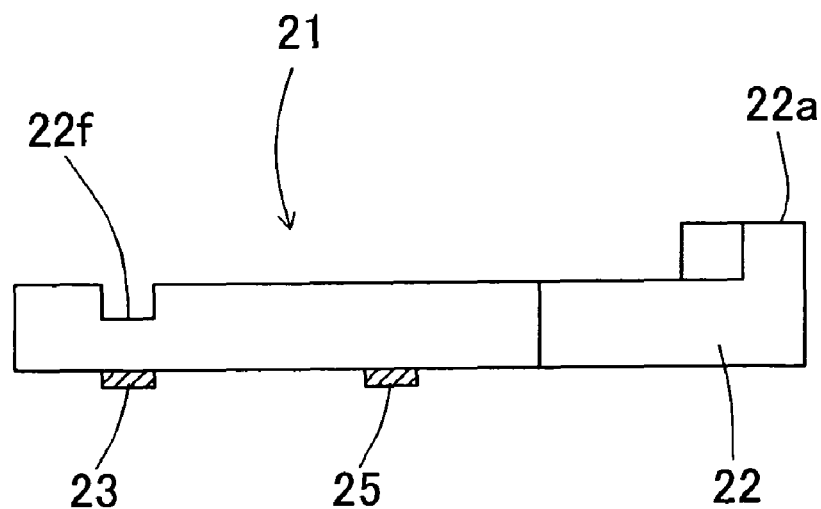
FIG. 26A is a top plan view of a third example of the sensor unit employed in the practice of the sixth embodiment.
Figure 26B:
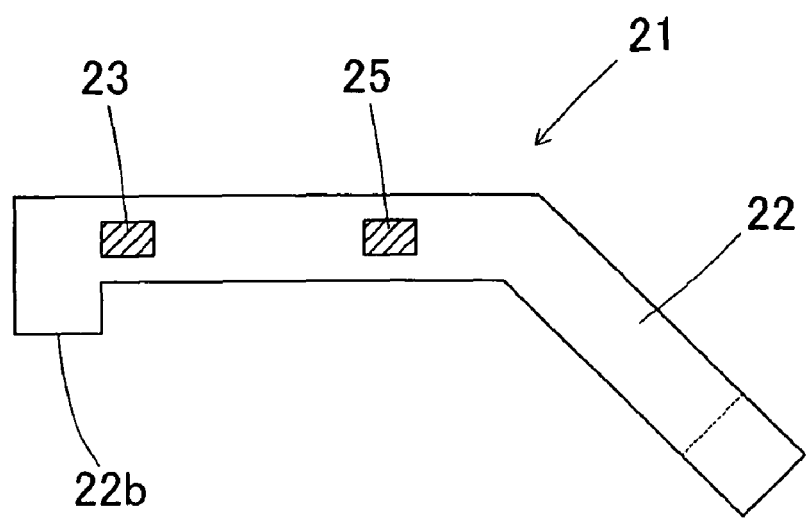
FIG. 26B is a front elevational view of the example of the sensor unit employed in the practice of the sixth embodiment.

FIGS. 26A and 26B illustrate a third example of the sensor unit. This sensor unit 21 is provided with an additional sensor 25, in addition to the strain sensor 23. The additional sensor 25 is in the form of at least one of an acceleration sensor and a vibration sensor. It is to be noted that the sensor mounting member 22 has the same shape as that shown in and described with particular reference to FIG. 19, and the strain sensor 23 and the additional sensor 25 are fitted to the radial portion 22f of the sensor mounting member 22.

As hereinabove described, by fitting the strain sensor 23 and the additional sensor 25 to the sensor mounting member 22, the load and the status of the wheel support bearing assembly can be measured at one site and the wiring or the like can be simplified.

Figure 27:
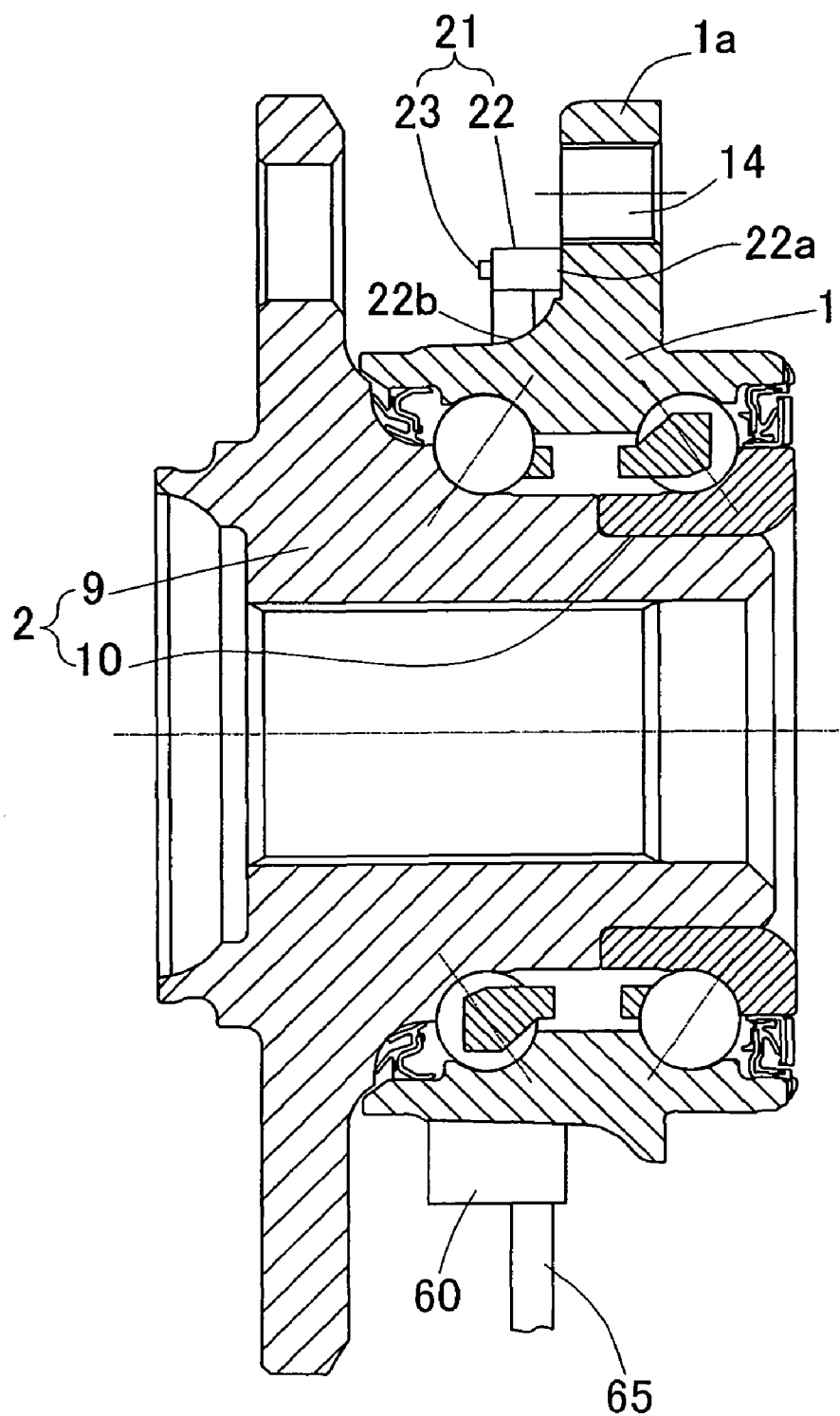
FIG. 27 is a sectional view showing the sensor incorporated wheel support bearing assembly according to a seventh preferred embodiment of the present invention.
Figure 28:
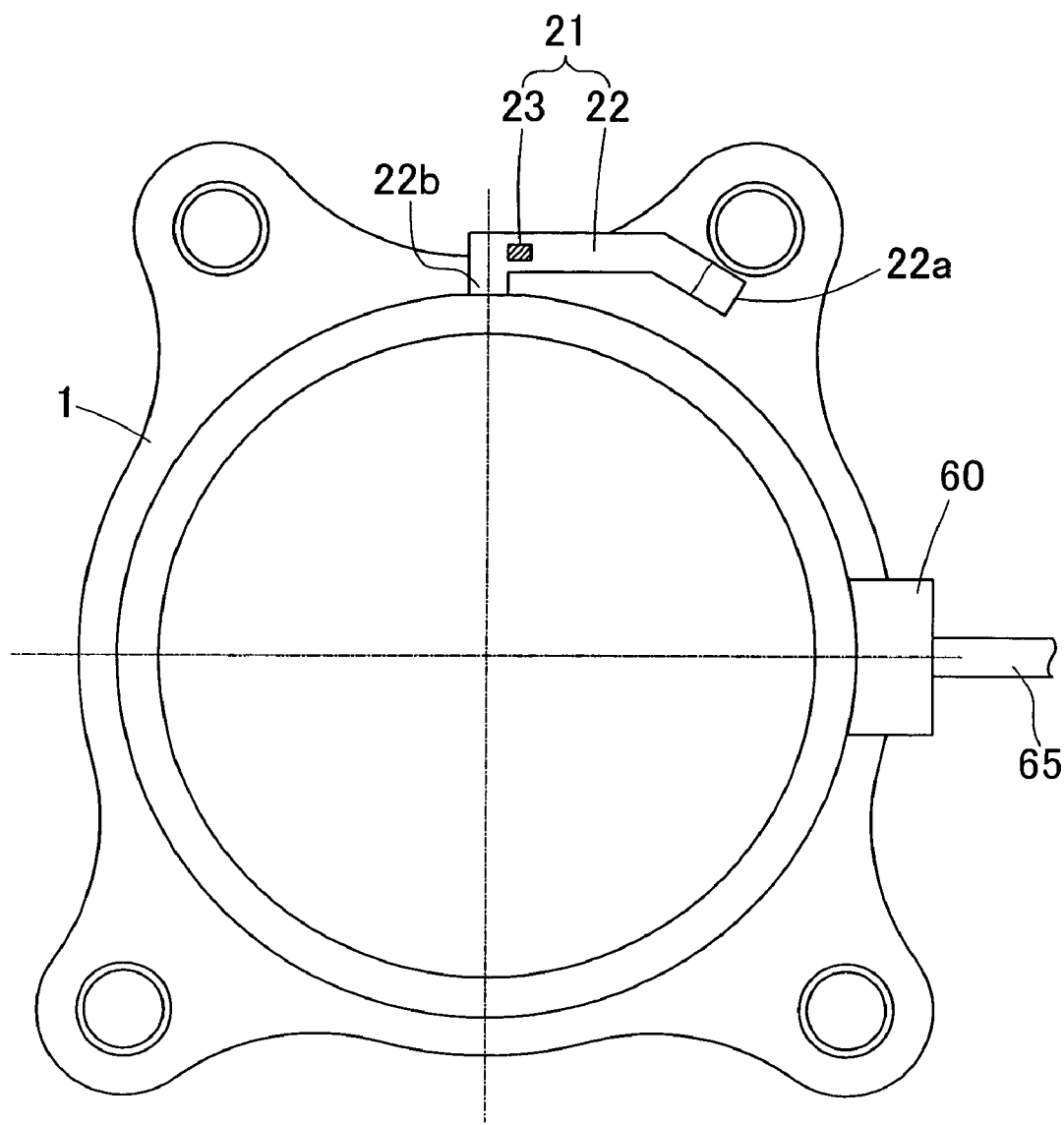
FIG. 28 is a front elevational view showing the outer member, the sensor unit and the sensor signal processing circuit unit all employed in the sensor incorporated wheel support bearing assembly shown in FIG. 27.

FIGS. 27 to 28 illustrate a seventh preferred embodiment of the present invention. The wheel support bearing assembly shown therein has a sensor signal processing circuit unit 60 incorporated therein for processing respective outputs of the strain sensor and the various types of sensors (temperature sensor, acceleration sensor and vibration sensor), all provided on the sensor unit 21. This sensor signal processing circuit unit 60 is mounted on the outer peripheral surface of the outer member 1.

The sensor signal processing circuit unit 60 includes a circuit substrate 62 made of, for example, a glass epoxy or the like and accommodated within a housing 61 made of a resinous material or the like, and electric and electronic component parts 63 in the form of an operational amplifier, a resistor, and a microcomputer or the like for processing an output signal of the strain sensor 23, and a power supply for driving the strain sensor 23, are arranged on the circuit substrate 62. Also, the sensor signal processing circuit unit 60 has a connector 64 for connecting a wiring of the strain sensor 23 with the circuit substrate 62. In addition, it includes a cable 65 for the electric power supply from the outside and outputting therethrough to the outside output signals processed by the sensor signal processing circuit. Where the sensor unit 21 is provided with the previously described various sensors (temperature sensor, acceleration sensor and vibration sensor) such as in this embodiment, the sensor signal processing circuit unit 60 is provided with the circuit substrates 62, the electric and electronic component parts 63, the connectors 64, the cables 65 and so on (not shown), which are respectively associated with those sensors.

In general, the sensor signal processing circuit unit for processing the respective outputs of the sensors provided in the wheel support bearing assembly is provided in an electric control unit (ECU) of the automotive vehicle, but the provision of the sensor signal processing circuit unit 60 in the vicinity of the sensor unit 21 in the wheel support bearing assembly such as in this embodiment is effective to simplify the labor incurred in connecting the sensor unit 21 with the sensor signal processing circuit unit 60 by means of wiring, and the sensor signal processing circuit unit 60 can be more compactly installed than to provide the sensor signal processing circuit unit 60 at a location other than the wheel support bearing assembly.

An eighth preferred embodiment of the present invention will be described hereinafter with particular reference to FIGS. 3, 29 and 30. The basic structure of this embodiment is substantially similar to that according to the previously described first embodiment except for the following points.

The flanges 1a of the outer member 1 have respective vehicle body mounting holes 14 defined therein. As best shown in FIG. 30, in this embodiment, the vehicle body mounting holes 14 are arranged equidistantly in the peripheral direction and one of them lies immediately above the longitudinal axis O of the wheel support bearing assembly.

A sensor unit 21 shown in FIGS. 3A and 3B is mounted on an outer periphery of the outer member 1. This sensor unit 21 is of a type including a sensor mounting member 22 on which a strain sensor 23 for measuring a strain occurring in the sensor mounting member 22 is mounted. The sensor mounting member 22 has a first contact fixing portion 22a, which is held in contact with and fixed to an outboard surface of the flange 1a, and a second contact fixing portion 22b which is held in contact with and fixed to the outer peripheral surface of the outer member 1. Also, the sensor mounting member 22 is of a generally L-shaped configuration including a radial portion 22c extending in a radial direction and having the first contact fixing portion 22a defined therein, and an axial portion 22d extending in an axial direction and having the second contact fixing portion 22b defined therein. The radial portion 22c has a wall thickness smaller than that of the axial portion 22d and, hence, has a lower rigidity as compared with that of the axial portion 22d. The strain sensor 23 is fitted to the radial portion 22c which has a relatively low rigidity.

Figure 29:
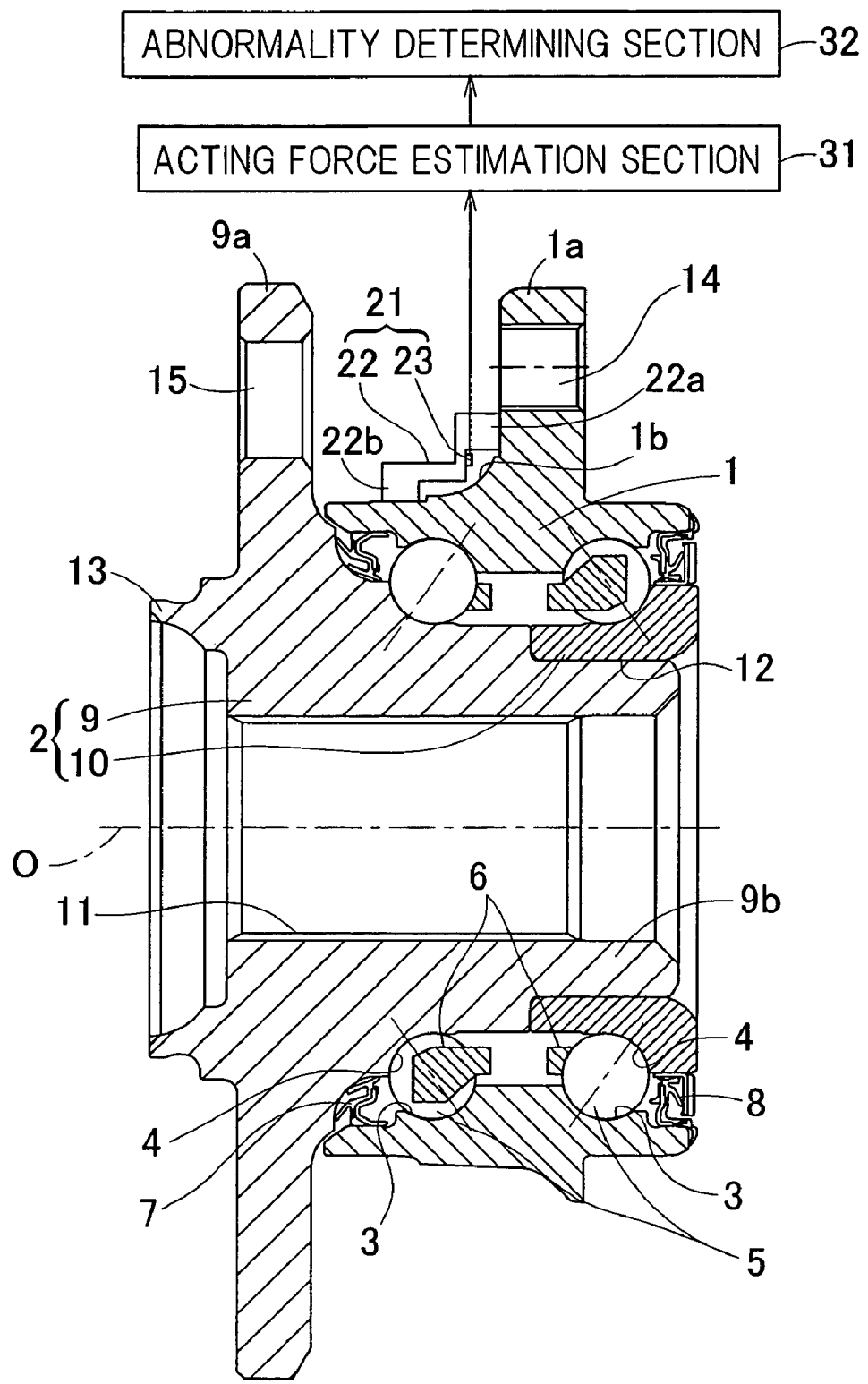
FIG. 29 is a diagram showing a sectional view of the sensor incorporated wheel support bearing assembly according to an eighth preferred embodiment of the present invention together with a block diagram of a conceptual construction of the detecting system therefor.
Figure 30:
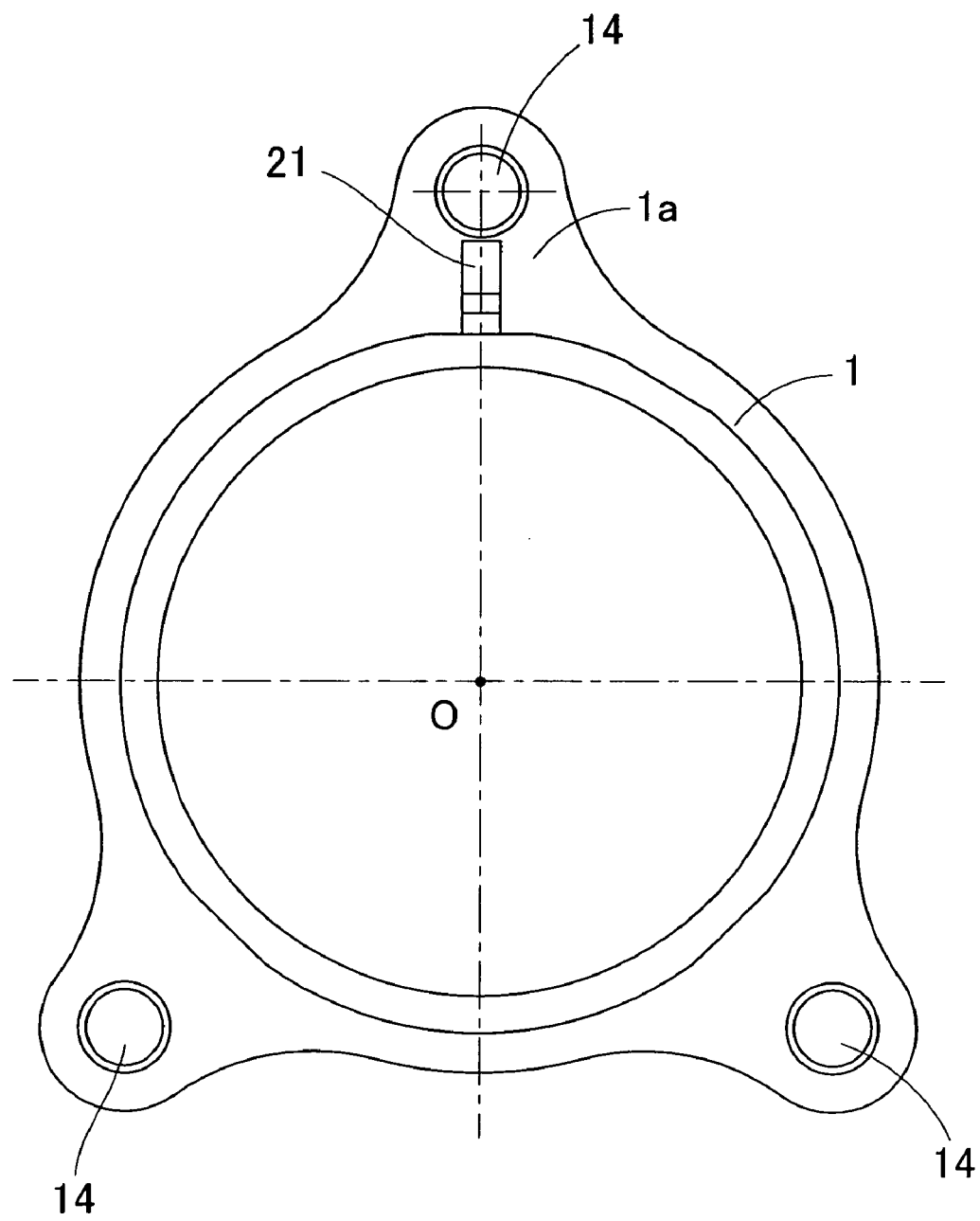
FIG. 30 is a front elevational view showing the outer member and the sensor unit both employed in the sensor incorporated wheel support bearing assembly shown in FIG. 29.

The sensor unit 21 referred to above is, as best shown in FIGS. 29 and 30, fixed to an outer peripheral upper portion of the outer member 1 through the first contact fixing portion 22a and the second contact fixing portion 22b. The position as which the first contact fixing portion 22a is fixed lies at a portion of the outboard surface of the flange 1a in the vicinity of one of the vehicle body mounting holes 14 which is positioned immediately radially above the longitudinal axis O referred to above. The top and bottom positions on the circumference of the outer member 1 are where the outer member 1 can be most deformed in the radial direction by the effect of the load acting on the outer member 1. The circumferential position at which the second contact fixing portion 22b is fixed lies in a portion of the outer peripheral surface of the outer member 1 which is in phase with the first contact fixing portion 22a with respect to the circumferential direction. When as described above the first and second contact fixing portions 22a and 22b lie in the same phase with respect to the circumferential direction, the sensor mounting member 22 can have a short length and the radial distance between the first and second contact fixing portions 22a and 22b can be increased. In the case of this embodiment, the strain sensor 23 is fixed to the sensor mounting member 22 by the use of a bonding agent.

The operation of the sensor incorporated wheel support bearing assembly of the construction described hereinabove will now be described. When the load is imposed on the hub unit 9, the outer member 1 is deformed through the rolling elements 5 and such deformation is transmitted to the sensor mounting member 22 that is fitted to the outer member 1, resulting in a corresponding deformation of the sensor mounting member 22. The strain then occurring in the sensor mounting member 22 is measured by the strain sensor 23. At this time, the radial portion 22c of the sensor mounting member 22 is deformed in accordance with deformation of the flange 1a of the outer member 1. In the case of this embodiment, since the rigidity of the radial portion 22c is low as compared with that of the outer member 1 and the sensor mounting member 22 represents a generally L-shaped configuration including the radial portion 22c having a relatively low rigidity and an axial portion 22d having a relatively high rigidity, a strain concentration occurs in the vicinity of a corner portion 22e of the sensor mounting member 22 situated generally intermediate between the radial portion 22c and the axial portion 22d and on one side adjacent the radial portion 22c, resulting in indication of a strain larger than that occurring in the outer member 1. In other words, the strain generated intermediate between the radial portion 22c and the axial portion 22d corresponds to the strain occurring at an R portion 1b at the base of the flange 1a which has been transferred to and then arouse having been amplified. Also, since the first and second contact fixing portions 22a and 22b differ in position in the radial direction, the strain in the outer member 1 is apt to be transferred amplified further. Since this strain is measured by the strain sensor 23, the strain occurring in the outer member 1 can be detected with high sensitivity and, therefore, the measurement of the strain takes place highly accurately.

Also, the side surface of the flange 1a to which the first contact fixing portion 22a is fixed is apt to deform considerably since a considerable force from the suspension system acts thereon. In particular, portions of the flanges 1a in the vicinity of the associated vehicle body mounting holes 14 tend to be largely affected by the force from the suspension system and, accordingly, the strain tends to arise largely. In contrast thereto, that portion of the peripheral surface of the outer member 1 to which the second contact fixing portion 22a is fixed does not accompany the strain so much as that on the side faces of the flanges 1a. Accordingly, when the sensor mounting member 22 is provided between the respective two locations on which strains of different magnitudes arise, the enhanced strain is indicated in the sensor mounting members 22, allowing the strain measuring accuracy to be increased. In addition, the fact that the position immediately above the longitudinal axis O, where the sensor unit 21 is provided, is the site at which the outer member 1 is most deformed in the radial direction by the effect of the load acting on the outer member 1, affects advantageously in increasing the strain measuring accuracy.

Although the sensor unit 21 according to this embodiment employs only one strain sensor 23 fitted to the sensor mounting member 22, a plurality of strain sensors 23 may be fitted to the sensor mounting member 22 at respective locations thereof. By fitting the strain sensor 23 to the sensor mounting member 22 at the plural locations thereof, the load can be detected with a further high accuracy.

Figure 31:
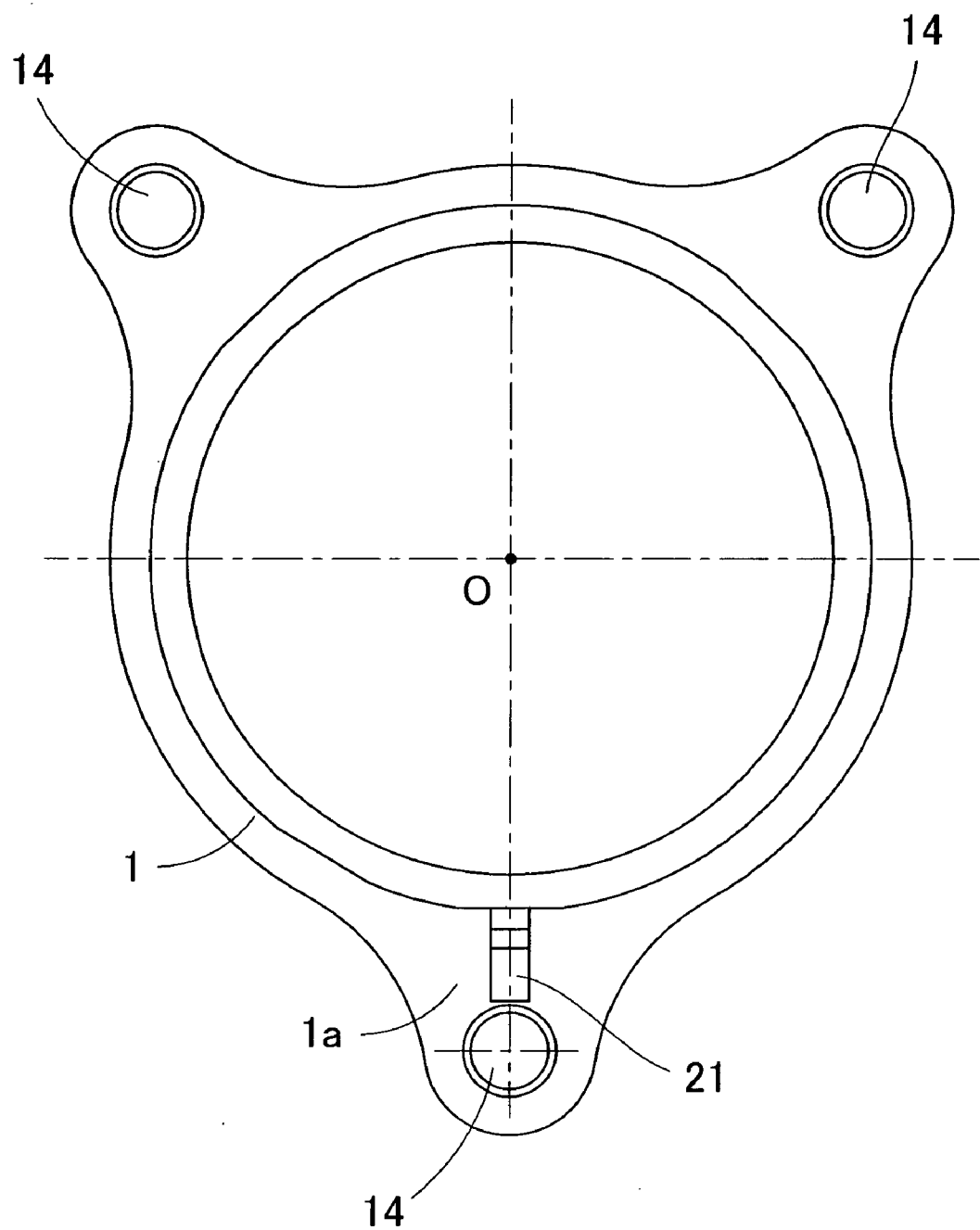
FIG. 31 is a front elevational view showing respective modified forms of the outer member and the sensor unit both employed in the sensor incorporated wheel support bearing assembly according to the eighth preferred embodiment of the present invention.

Also, although in this embodiment one of the vehicle body mounting holes 14 defined in the outer member 1 at respective three locations lies immediately above the longitudinal axis O of the wheel support bearing assembly, the sensor unit 21 is provided so that the first contact fixing portion 22a of the sensor mounting member 22 can be fixed to a portion adjacent the vehicle body mounting hole 14 immediately above the longitudinal axis O. However, as shown in FIG. 31, where one of the three vehicle body mounting holes 14 lies immediately below the longitudinal axis O of the wheel support bearing assembly, the sensor unit 21 may be conveniently provided so that the first contact fixing portion 22a of the sensor mounting member 22 may be fixed to a portion in the vicinity of the vehicle body mounting hole 14 immediately below the longitudinal axis O of the wheel support bearing assembly. In other words, the sensor unit 21 is preferably provided so that the first contact fixing portion 22a of the sensor mounting member 22 can be fixed at a position as near as possible to the top or bottom position on the circumference of the outer member 1 are where the outer member 1 can be most deformed in the radial direction by the effect of the load acting on the outer member 1. By so doing, the load can be detected with high accuracy.

Figure 32:
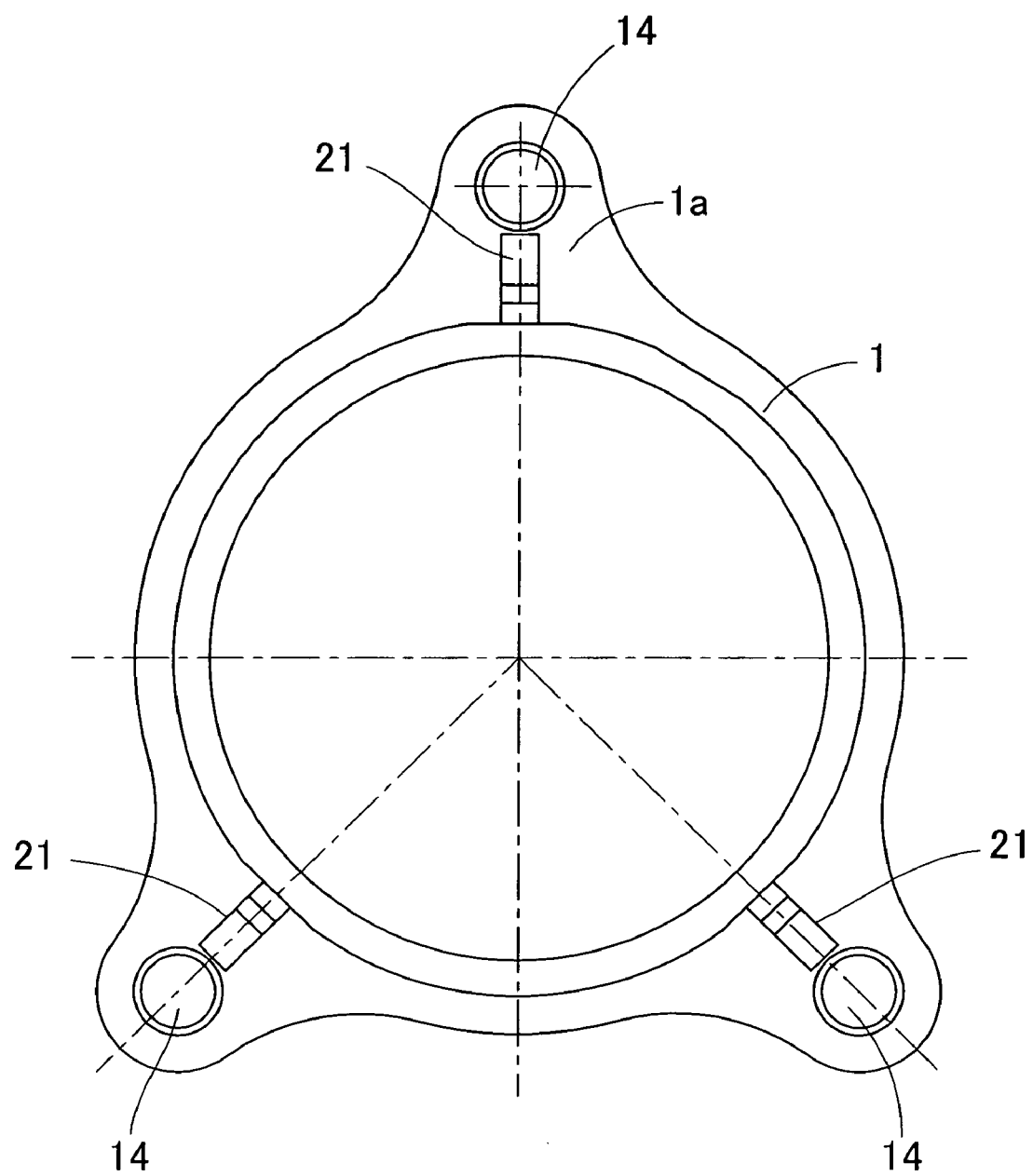
FIG. 32 is a front elevational view showing respective further modified forms of the outer member and the sensor unit both employed in the sensor incorporated wheel support bearing assembly according to the eighth preferred embodiment of the present invention.

Also, although this embodiment is such that the sensor unit 21 has been shown and described as provided at one location of the outer member 1, two or more sensor units 21 may be provided at respective locations as shown in FIG. 32. By providing two or more sensor units 21 at respective locations, the load can be detected further highly accurately.

At points of contact between the road surface and the vehicle wheel, which is mounted on the inner member 2 which serves as a rotatable member of the wheel support bearing assembly, the load acts in three-axis directions including a up and down direction, a left and right direction and a forward and rearward direction, all of which are perpendicular to each other. While this load acts on the outer member 1, which serves as a stationary member, through the inner member 2 with the strain consequently occurring in the outer member 1, influences brought about by the load in the three-axis directions are different depending on the circumferential position of the vehicle body mounting hole 14 that is formed in the flange 1a of the outer member 1. For this reason, when the plural sensor units 21 are fitted with the respective first contact fixing portions 22a positioned in the vicinity of each of the respective vehicle body mounting holes 14, with respect to the relation between the load and the strain in the three-axis directions, the load can be determined by each of the sensor units 21 from the relation of the strain and the load having a tendency different from that described above and, therefore, a highly accurate load detection can be achieved.

Where three vehicle body mounting holes 4 are formed in the flange 1a at respective three locations, for example, one of the vehicle body mounting holes 14 will be arranged in an upper portion and the remaining two vehicle body mounting holes 14 will be arranged at diagonally downwardly forward and rearward location, respectively. Because of this, depending on the position of each of the wheel mounting holes 14, the relations between the strain and the load in the three-axis directions differ considerably from each other and a highly accurate load detection can be achieved.

Figure 33:
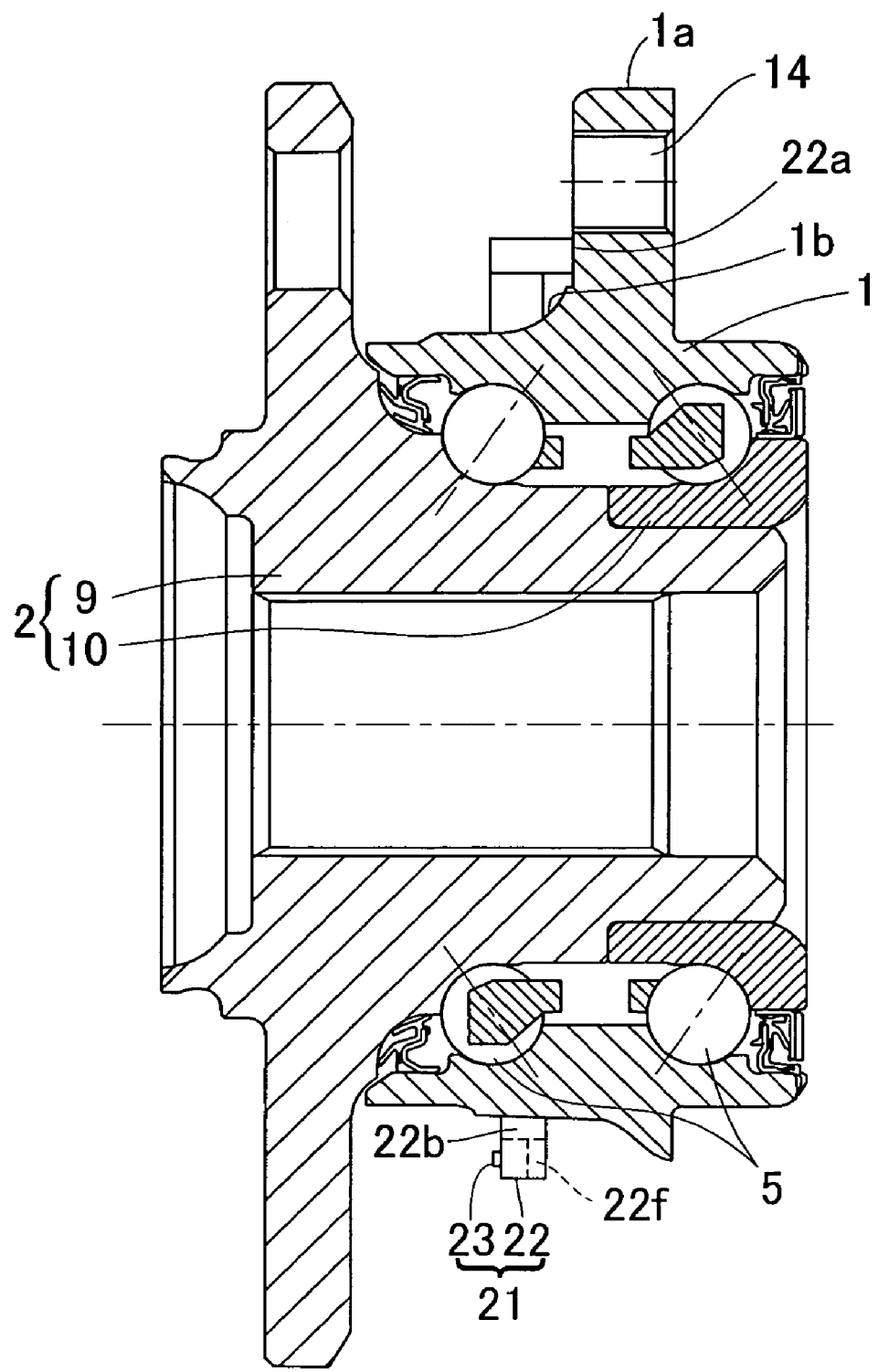
FIG. 33 is a sectional view showing the sensor incorporated wheel support bearing assembly according to a ninth preferred embodiment of the present invention.
Figure 34:
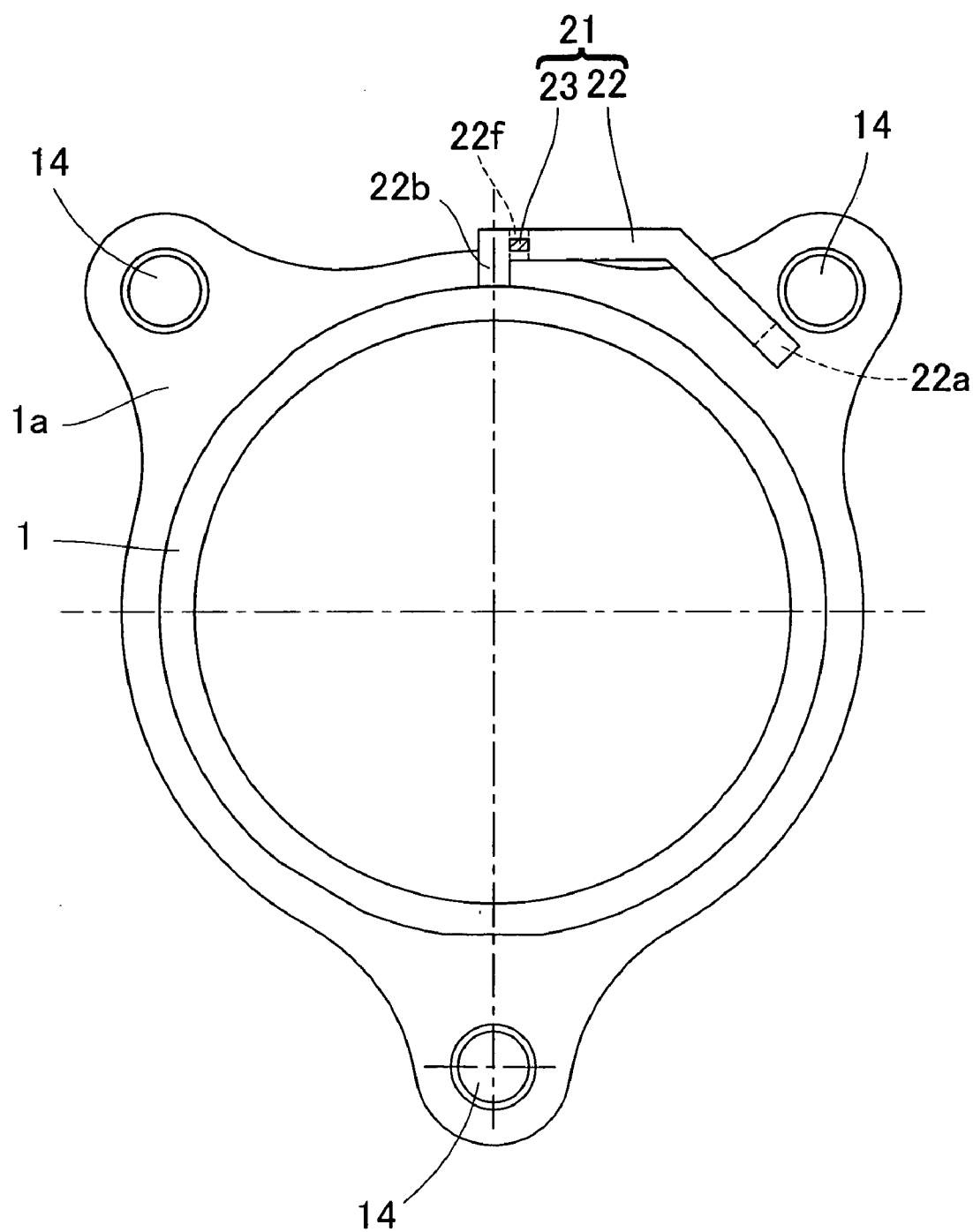
FIG. 34 is a front elevational view showing the outer member and the sensor unit both employed in the sensor incorporated wheel support bearing assembly shown in FIG. 33.

FIGS. 33 and 34 illustrate a ninth preferred embodiment of the present invention. This wheel support bearing assembly is of a type, in which the sensor mounting member 22 is of a shape generally elongated in the circumferential direction and the first and second contact fixing portions 22a and 22b defined at the opposite ends of the sensor mounting member 22 are fixed at respective positions that are displaced in phase in the circumferential direction of the outer member 1. Even in this case, the first contact fixing portion 22a of the sensor mounting member 22 is fixed to a portion of the side surface of the flange 1a in the vicinity of the vehicle body mounting hole 14 and the second contact fixing portion 22b thereof is fixed to the outer peripheral surface of the outer member 1. In the vicinity of the second contact fixing portion 22b of the sensor mounting member 22, a cutout portion 22f having a reduced rigidity as compared with that of any other portion is formed, and the strain sensor 23 is fitted at a location where this cutout portion 22f is formed. When the cutout portion 22f is formed in the sensor mounting member 22, the strain concentrates on this portion and arises as an amplified strain as compared with that arising in the outer member 1. Since the strain sensor 23 measures such an amplified strain, the strain in the outer member 1 can be detected with high sensitivity and the strain measuring accuracy can be increased.

Figure 35:
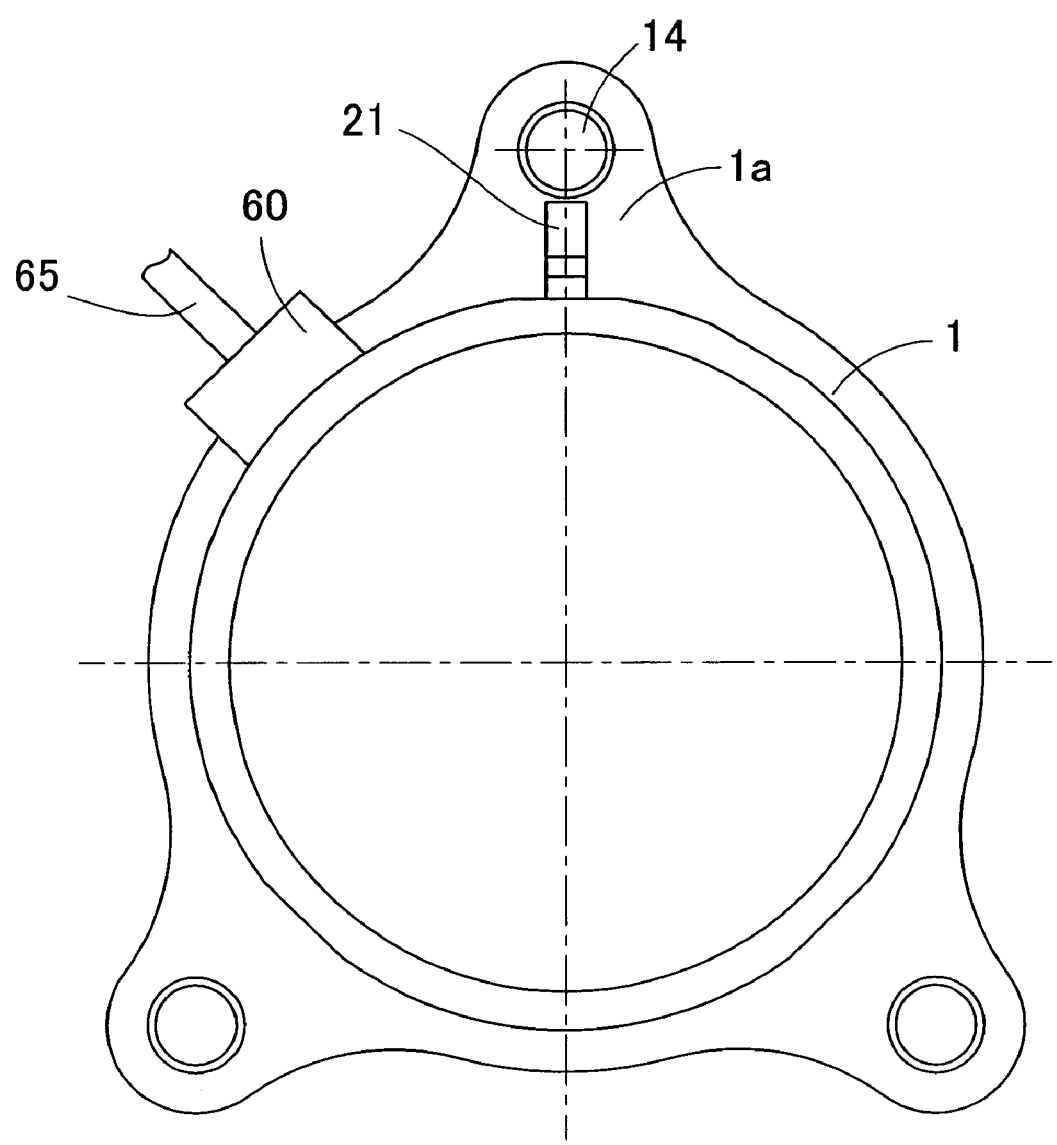
FIG. 35 is a front elevational view showing the outer member and the sensor unit both employed in the sensor incorporated wheel support bearing assembly according to the tenth preferred embodiment of the present invention.

FIG. 35 illustrates a tenth preferred embodiment of the present invention. The wheel support bearing assembly shown therein has a sensor signal processing circuit unit 60 incorporated therein for processing respective outputs of the strain sensor and the various sensors (temperature sensor, acceleration sensor and vibration sensor), all provided on the sensor unit 21. This sensor signal processing circuit unit 60 is mounted on the outer peripheral surface of the outer member 1.

The sensor signal processing circuit unit 60 includes a circuit substrate 62 made of, for example, a glass epoxy or the like and accommodated within a housing 61 made of a resinous material or the like, and electric and electronic component parts 63 in the form of an operational amplifier, a resistor, and a microcomputer or the like for processing an output signal of the strain sensor 23, and a power supply for driving the strain sensor 23, are arranged on the circuit substrate 62. Also, the sensor signal processing circuit unit 60 has a connector 64 for connecting a wiring of the strain sensor 23 with the circuit substrate 62. In addition, it includes a cable 65 for the electric power supply from the outside and outputting therethrough to the outside output signals processed by the sensor signal processing circuit. Where the sensor unit 21 is provided with the previously described various sensors (temperature sensor, acceleration sensor and vibration sensor) such as in this embodiment, the sensor signal processing circuit unit 60 is provided with the circuit substrates 62, the electric and electronic component parts 63, the connectors 64, the cables 65 and so on (not shown), which are respectively associated with those sensors.

In general, the sensor signal processing circuit unit for processing the respective outputs of the sensors provided in the wheel support bearing assembly is provided in an electric control unit (ECU) of the automotive vehicle, but the provision of the sensor signal processing circuit unit 60 in the vicinity of the sensor unit 21 in the wheel support bearing assembly such as in this embodiment is effective to simplify the labor incurred in connecting the sensor unit 21 with the sensor signal processing circuit unit 60 by means of wiring, and the sensor signal processing circuit unit 60 can be more compactly installed than to provide the sensor signal processing circuit unit 60 at a location other than the wheel support bearing assembly.

An eleventh preferred embodiment of the present invention will be described with particular reference to FIGS. 36 to 38A and 38B. The basic structure of this embodiment is substantially similar to that according to the previously described first embodiment except for the following points.

The outer member 1 serves as the stationary member and is of one-piece construction having its outer periphery formed with a plurality of flanges 1a for securement to a knuckle forming a part of the automotive suspension system (not shown) in the automotive body structure. The flanges 1a has vehicle body mounting holes 14 formed therein that are spaced from each other in a direction circumferentially of the outer member 1.

The inner member 2 serves as the rotatable member and is made up of a hub unit 9, having a wheel mounting hub flange 9a, and an inner ring 10 mounted on an inboard end of an hub axle 9b of the hub unit 9. The raceway surfaces 4 are formed respectively in the hub unit 9 and the inner ring 10. The inboard end of the hub unit 9 has an outer periphery radially inwardly stepped to define an inner ring mounting area 12 of a reduced diameter, with the inner ring 10 fixedly mounted thereon. The hub unit 9 has a center bore 11 defined therein so as to extend completely through the length of the hub unit 9. The hub flange 9a has a plurality of press-fitting holes 15 defined in respective circumferential locations thereof for receiving corresponding hub bolts (not shown) press-fitted therein. The hub unit 9 has, in the proximity of a root portion of the hub flange 9a, a cylindrical pilot portion 13 so as to protrude in an outboard direction, which pilot portion 13 serves to guide the vehicle wheel and a brake components.

Figure 38A:
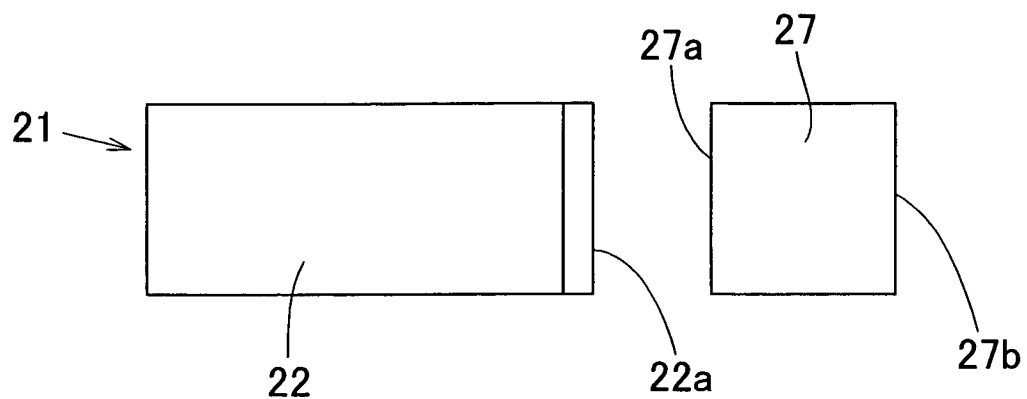
FIG. 38A is a top plan view showing the sensor unit and first and second carrier members.
Figure 38B:
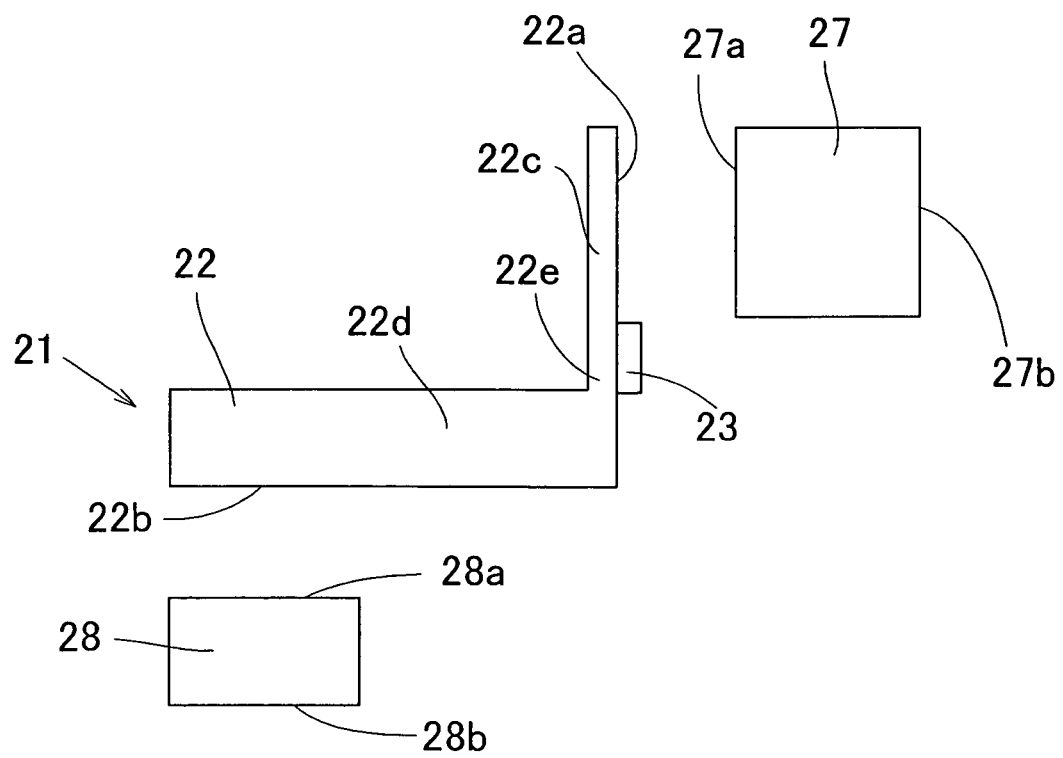
FIG. 38B is a side sectional view of the sensor unit and the first and second carrier members.

A sensor unit 21 is mounted on an outer periphery of the outer member 1 as best shown in FIGS. 38A and 38B. This sensor unit 21 is of a type including a sensor mounting member 22 on which a strain sensor 23 for measuring a strain occurring in the sensor mounting member 22 is mounted. The sensor unit 21 is fitted to the outer member 1 through first and second fitting members 27 and 28.

The sensor mounting member 22 has a first contact fixing portion 22a, which is held in contact with and fixed to the first fitting member 27, and a second contact fixing portion 22b which is held in contact with and fixed to the second fitting member 28. Also, the sensor mounting member 22 is of a generally L-shaped configuration including a radial portion 22c extending in a radial direction and having the first contact fixing portion 22a defined therein, and an axial portion 22d extending in an axial direction and having the second contact fixing portion 22b defined therein. The radial portion 22c has a free end rendered to be the first contact fixing portion 22a and the axial portion 22d has a free end rendered to be the second contact fixing portion 22b. The radial portion 22c has a wall thickness smaller than that of the axial portion 22d so that it can have a lower rigidity as compared with that of the axial portion 22d. The strain sensor 23 is fitted to the radial portion 22c which has a relatively low rigidity.

The first fitting member 27 has a sensor unit side contact fixing portion 27a, which is held in contact with and fixed to the first contact fixing portion 22a of the sensor mounting member 22, and an outer member side contact fixing portion 27b which is held in contact with and fixed to a portion of the outer member 1 in the vicinity of the vehicle body mounting hole 14. Also, the second fitting member 28 has a sensor unit side contact fixing portion 28a, which is held in contact with and fixed to the second contact fixing portion 22b of the sensor mounting member 22, and an outer member side contact fixing portion 28b which is held in contact with and fixed to the outer peripheral surface of the outer member 1.

Figure 36:
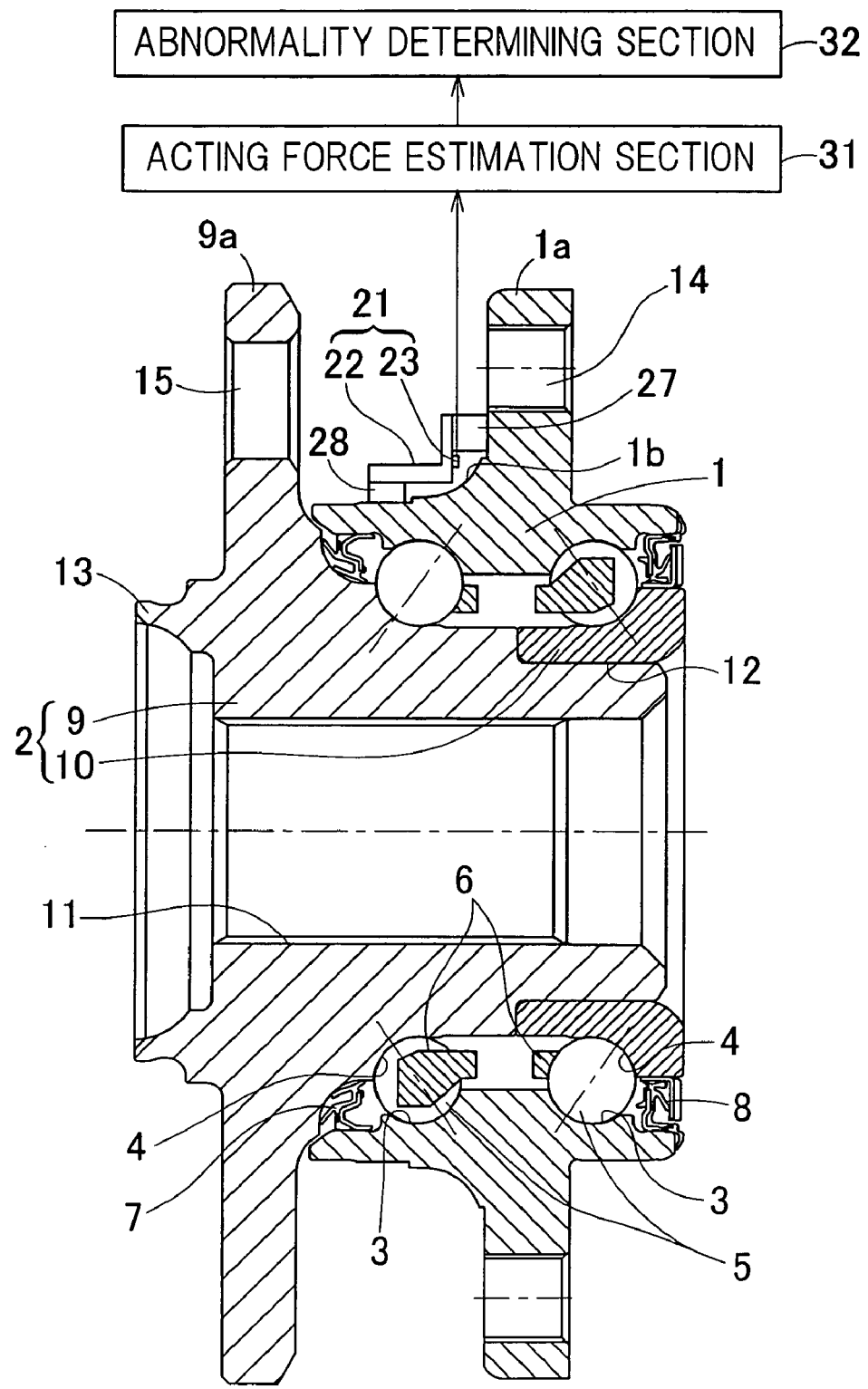
FIG. 36 is a diagram showing a sectional view of the sensor incorporated wheel support bearing assembly according tot an eleventh preferred embodiment of the present invention together with a block diagram of a conceptual construction of the detecting system therefor.
Figure 37:
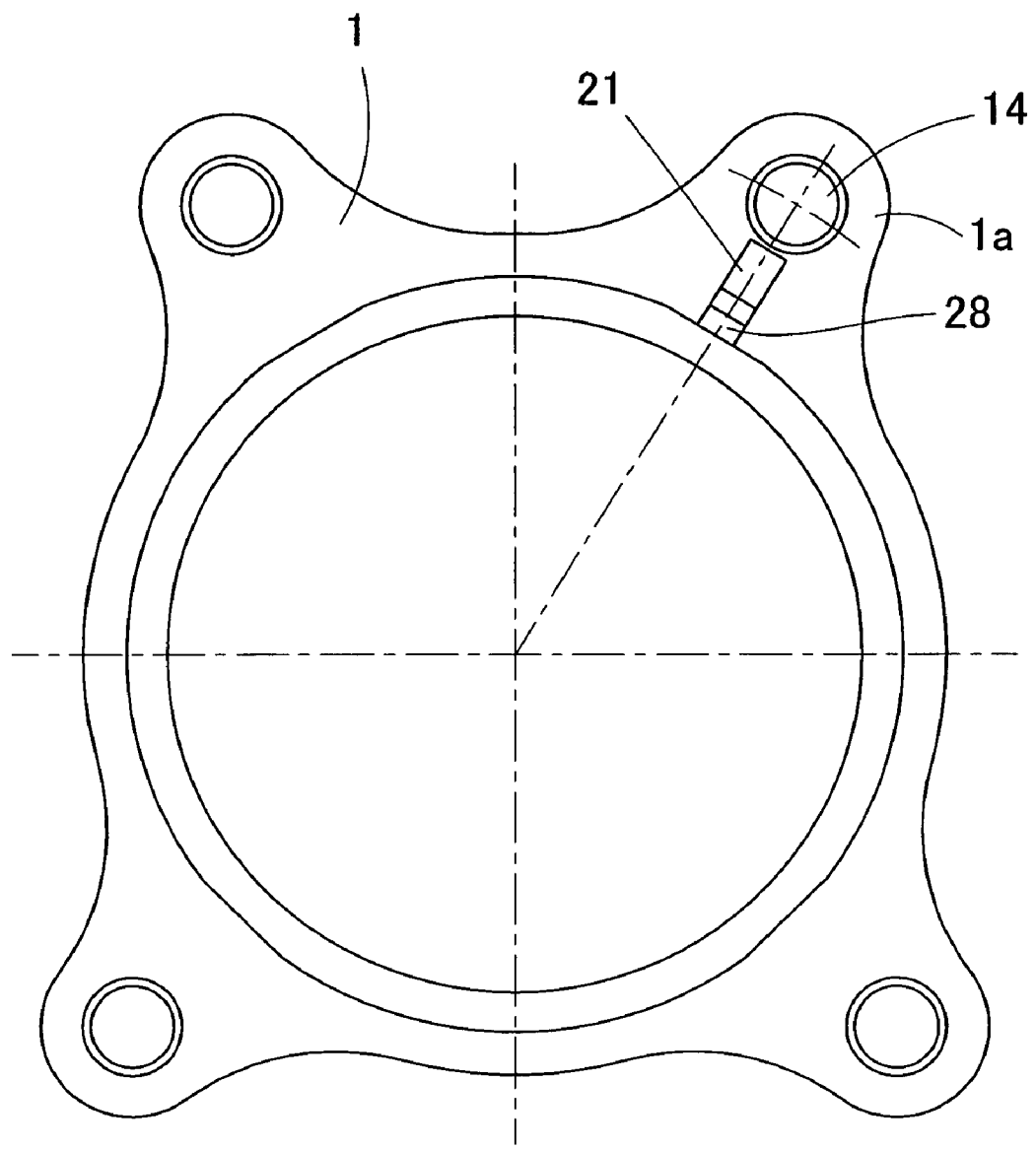
FIG. 37 is a front elevational view showing the outer member and the sensor unit both employed in the sensor incorporated wheel support bearing assembly shown in FIG. 36.

The sensor unit 21 is fixed to the outer periphery of the outer member 1 through the first and second fitting members 27 and 28 so that, as best shown in FIGS. 36 and 37, the first and second contact fixing portions 22a and 22b of the sensor mounting member 22 can be held in the same phase with respect to the circumferential direction of the outer member 1. When the first and second contact fixing portions 22a and 22b are held in the same phase in the circumferential direction, the sensor mounting member 22 can have a reduced length and, therefore, the sensor unit 21 can easily be installed.

For the strain sensor 23, any of various sensors may be employed. For example, the strain sensor 23 may be in the form of, for example, a metallic foil strain gauge. In such case, fixture by means of bonding is generally carried out.

Also, the strain sensor 23 can be formed on the sensor mounting member 22 in the form of a thick film resistance element. The structure of the sensor unit 21 in such case is shown in FIG. 11. This sensor unit 21 is of a structure including an insulating layer 50 formed on the sensor mounting member 22, a pair of electrodes 51 and 51 formed on side portions of the surface of the insulating layer 50, a strain measuring resistance element 52, which eventually forms the strain sensor, formed over the insulating layer 50 and between the pair of the electrodes 51 and 51, and a protective film 53 formed over the electrodes 51 and 51 and the strain measuring resistance element 52.

The operation of the sensor incorporated wheel support bearing assembly of the construction described hereinabove will now be described. When the load is imposed on the hub unit 9, the outer member 1 is deformed through the rolling elements 5 and such deformation is transmitted to the sensor mounting member 22 through the first and second fitting members 27 and 28, resulting in a corresponding deformation of the sensor mounting member 22. The strain then occurring in the sensor mounting member 22 is measured by the strain sensor 23. At this time, the radial portion 22c of the sensor mounting member 22 is deformed in accordance with deformation of the flange 1a of the outer member 1. In the case of this embodiment, since the rigidity of the radial portion 22c is low as compared with that of the outer member 1 and the sensor mounting member 22 represents a generally L-shaped configuration including the radial portion 22c having a relatively low rigidity and an axial portion 22d having a relatively high rigidity, a strain concentration occurs in the vicinity of a corner portion 22e of the sensor mounting member 22 situated generally intermediate between the radial portion 22c and the axial portion 22d and on one side adjacent the radial portion 22c, resulting in indication of a strain larger than that occurring in the outer member 1. In other words, the strain generated intermediate between the radial portion 22c and the axial portion 22d corresponds to the strain occurring at an R portion 1b at the base of the flange 1a which has been transferred to and then arouse having been amplified. Since this strain is measured by the strain sensor 23, the strain occurring in the outer member 1 can be detected with high sensitivity and, therefore, the measurement of the strain takes place highly accurately.

Since the wheel support bearing assembly according to this embodiment is so designed that the sensor unit 21 including the sensor mounting member 22 and the strain sensor 23 mounted on such sensor mounting member 22 is fitted to the outer member 1, the sensor for use in detecting the load can be compactly installed in the automotive vehicle. Also, since the sensor unit 21 is fitted to the outer member 1 through the first and second fitting members 27 and 28, but not fitted directly to the outer member 1, the sensor mounting member 22 can have a simplified, L-shaped configuration. Where the sensor mounting 22 has a simplified shape such as in this embodiment, the processing of the sensor mounting member 22 can be facilitated and the cost thereof can be reduced. Also, where the sensor mounting member 22 has such a simplified shape, the position at which the strain sensor is fixed can be positioned with high accuracy. In the case of this embodiment, since the surface of the sensor mounting member 22, where the strain sensor is provided, is a flat or plane surface, fitting of the strain sensor 23 onto the sensor mounting member 22 can be facilitated. By way of example, formation of the strain sensor 23 in the form of a pressure film resistance element can be accomplished relatively easily.

Where the strain sensor 23 is in the form of, for example, a metallic foil strain gauge, fixture thereof to the sensor mounting member 22 is generally carried out by means of bonding. However, the fixture by bonding may adversely affect the detection performed by the strain sensor when the bonding strength is lowered as a result of aging, and constitutes an increase of the cost. Also, in such case, since the bonding work requires a substantial amount of time, it may constitute a cause of increase of the cost. In contrast thereto, where the sensor unit 21 is so designed and so configured that the strain sensor 23 is employed in the form of a thick film resistance element formed on a sensor mounting surface 22A of the sensor mounting member 22, reduction in bonding strength resulting from ageing will hardly take place and, therefore, the reliability can be increased. Also, since no bonding work is required in fitting the strain sensor 23, the assemblability can be increased to reduce the cost.

Figure 39:
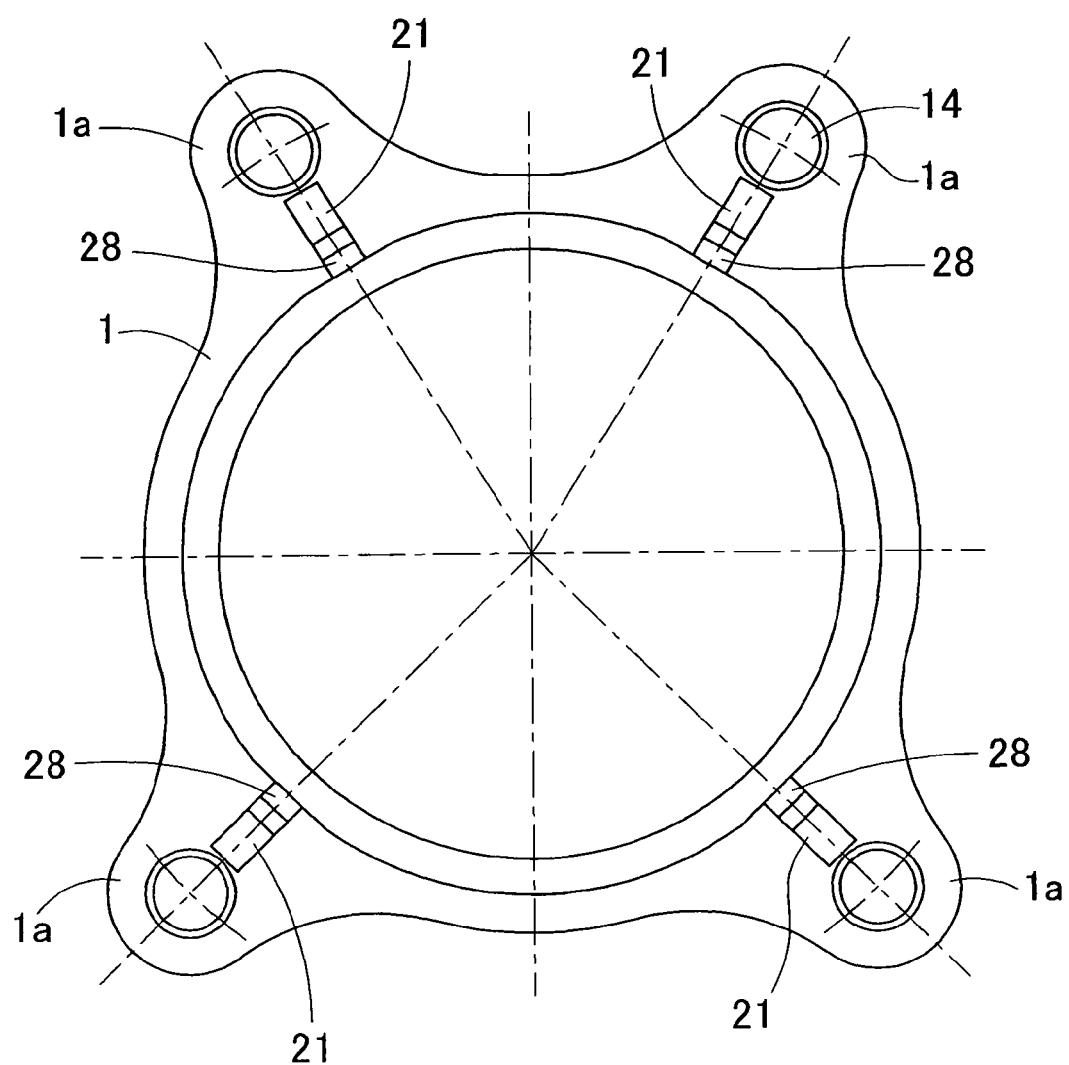
FIG. 39 is a front elevational view showing the outer member and the sensor unit both employed in the different sensor incorporated wheel support bearing assembly.

Although in this embodiment the sensor unit 21 has been shown and described as provided at only one location, two or more sensor units 21 may be provided at respective locations as shown in, for example, FIG. 39. By providing the sensor units 21 at two or more locations, a further highly accurate load detection can be achieved.

Figure 40:
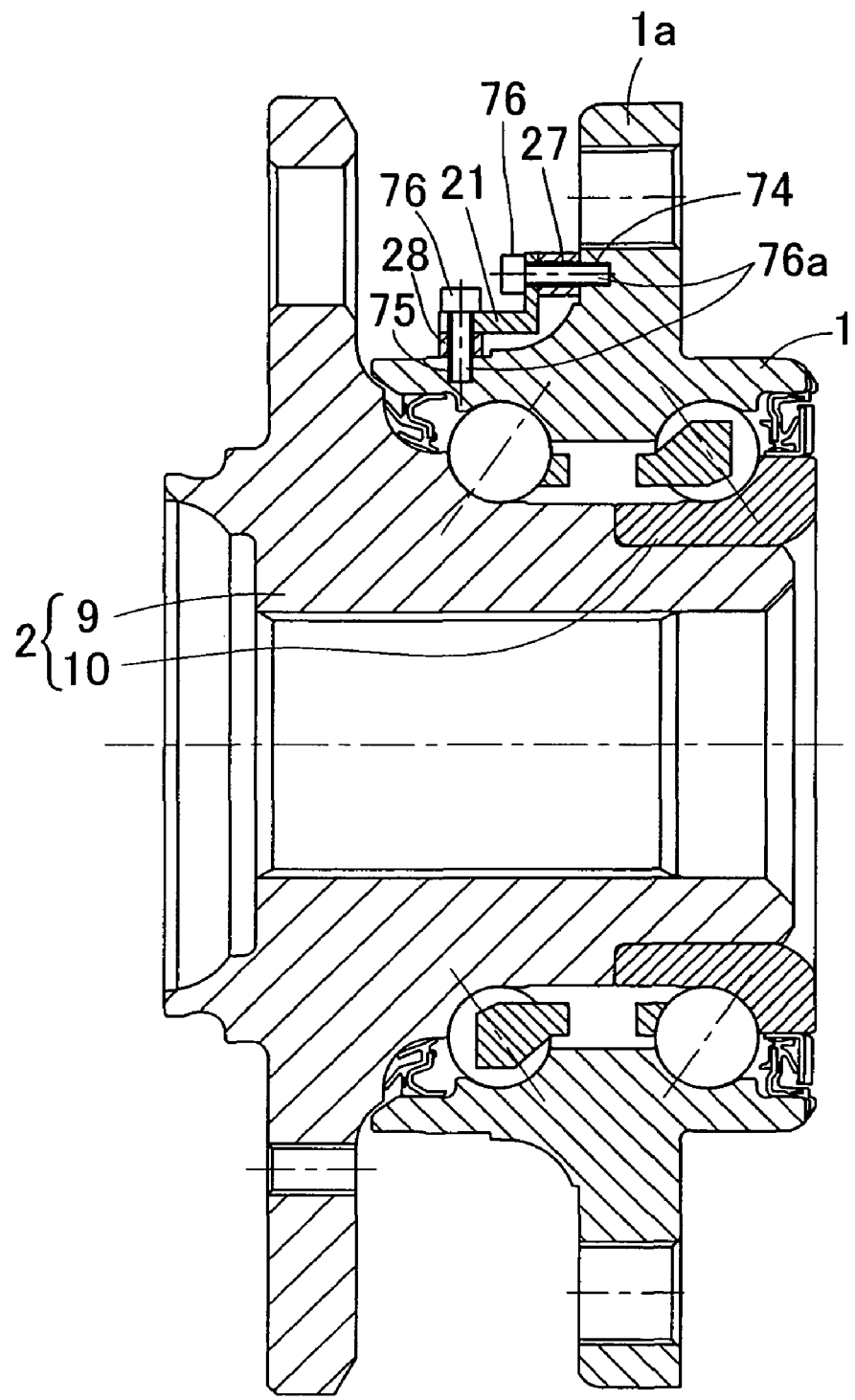
FIG. 40 is a sectional view showing the sensor incorporated wheel support bearing assembly according to a twelfth preferred embodiment of the present invention.
Figure 41A:
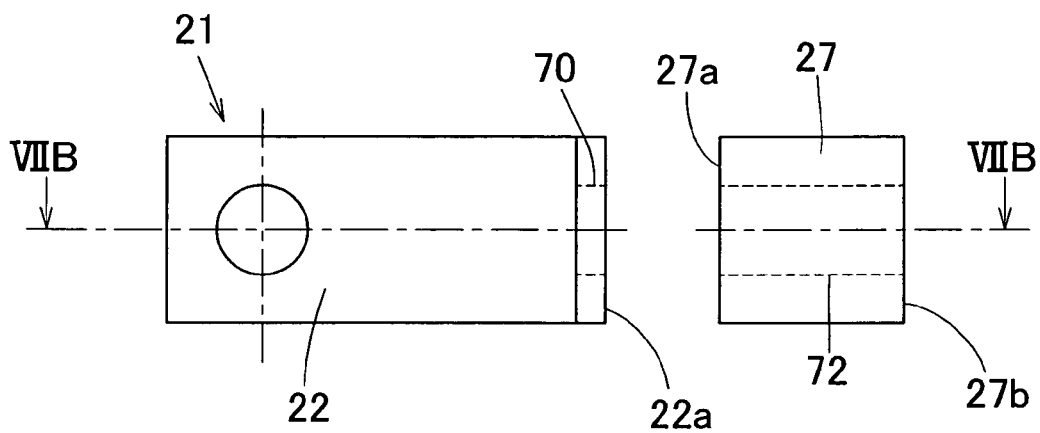
FIG. 41A is a top plan view showing the sensor unit and the first and second carrier member both employed in the sensor incorporated wheel support bearing assembly shown in FIG. 40.
Figure 41B:
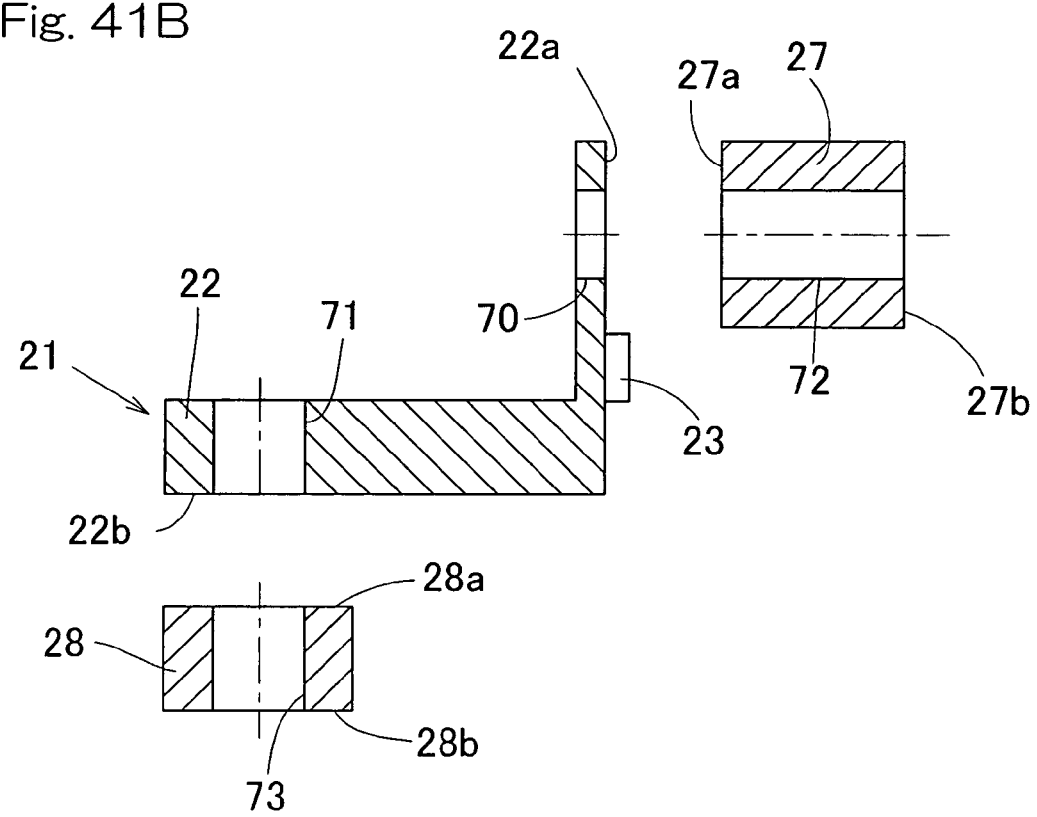
FIG. 41B is a cross-sectional view taken along the line VIIB-VIIB in FIG. 41A.

FIGS. 40, 41A and 41B illustrate a twelfth preferred embodiment of the present invention. The wheel support bearing assembly according to this embodiment is of a design in which fitting of the first and second fitting members 27 and 28 to the outer member 1 is carried out by the use of bolts. As best shown in FIGS. 41A and 41B, the sensor mounting member 22 employed therein has the same shape as that in the sensor mounting member 22 shown in FIGS. 38A and 38B, but has an axially extending bolt insertion hole 70 defined in the first contact fixing portion 22a and a radially extending bolt insertion hole 71 defined in the second contact fixing portion 22b. Also, the first fitting member 27 is formed with a bolt insertion hole 72 alignable with the bolt insertion hole 70 and, on the other hand, the second fitting member 28 is formed with a bolt insertion hole 73 alignable with the bolt insertion hole 71. In addition, the outer member 1 is formed with bolt threading holes 74 and 75 having respective threaded inner peripheral surfaces at respective locations alignable with the bolt insertion holes 70 and 72 and the bolt insertion holes 71 and 73, respectively.

As shown in FIG. 40, the sensor unit 21 is fixed to the outer member 1, with a bolt 76 inserted through the bolt insertion hole 70 in the sensor mounting member 22 and the bolt insertion hole 72 in the first fitting member 27 from the outboard side so that a male threaded portion 76a of such bolt 76 may be firmly threaded into the bolt threading hole 74 in the outer member 1 and, on the other hand, with another bolt 76 inserted through the bolt insertion hole 71 in the sensor mounting member 22 and the bolt insertion hole 73 in the second fitting member 28 from an outer peripheral side so that a male threaded portion 76a of such bolt 76 may be firmly threaded into the bolt threading hole 75 in the outer member 1.

For fixing the sensor mounting member 22 and the first and second fitting members 27 and 28 to the outer member 1 in the manner described above, either a bonding agent or the bolts may be employed. Alternatively, the both may be employed. In addition, without any of the bonding agent and the bolts used, the sensor mounting member 22 and the outer member 1 may be fixed together by means of welding. Whichever the fixing structure is employed, the sensor mounting member 22, the first and second fitting members 27 and 28 and the outer member 1 can be fixed together firmly. For this reason, the sensor mounting member 22 will not displace in position relative to the outer member 1 and the deformation of the outer member 1 can be accurately transmitted to the sensor mounting member 22.

It is to be noted that although in describing any one of the foregoing various embodiments of the present invention, the outer member 1 has been shown and described as serving the stationary member, the present invention can be equally applied to the wheel support bearing assembly of a type in which the inner member serves as the stationary member and, in such case, the sensor unit 21 is provided on a peripheral surface which defines the inner periphery of the inner member.

Also, although any one of the foregoing embodiments of the present invention has been shown and described as applied to the wheel support bearing assembly of the three generation type, the present invention may be applied to the wheel support bearing assembly of the first or second generation type, in which the bearing unit and the hub unit are members separate from each other, and also to the wheel support bearing assembly of the fourth generation type in which a part of the inner member is constituted by an outer ring of the constant velocity universal joint. In addition, the sensor incorporated wheel support bearing assembly may be applied to a wheel support bearing assembly for the support of a vehicle driven wheel and also to the wheel support bearing assembly of any generation type utilizing tapered rollers.

The present invention encompasses other preferred embodiments which can be practiced in any one of the following modes:

[Mode 1]

In the sensor incorporated wheel support bearing assembly of the present invention, the sensor mounting member is required to have such a shape that it will not undergo any plastic deformation even when a maximum expected load acts on the wheel support bearing assembly. The maximum expected force referred to above is a maximum force that can be expected during the travel of the automotive vehicle that does not lead to a trouble in such automotive vehicle.

That is because once the sensor mounting member is plastically deformed, deformation occurring in the outer member will not be transmitted to the sensor mounting member accurately, thus adversely affecting the measurement of the strain.

[Mode 2]

The sensor mounting member employed in the sensor incorporated wheel support bearing assembly of the present invention may be manufactured by means of a press work.

Where the sensor mounting member is a product prepared by the use of a press work, the cost can be reduced.

[Mode 3]

The sensor carrier member employed in the sensor incorporated wheel support bearing assembly of the present invention may be a product of a sintered metal that is formed by molding a powdery metal with the use of a metal injection molding technique.

If the sensor mounting member is prepared by the use of the powdery metal injection molding technique, the sensor mounting member having a dimensional accuracy can be obtained.

[Mode 4]

In the sensor incorporated wheel support bearing assembly of the present invention, fixing of the sensor mounting member and the stationary member together may be carried out by the use of either a bonding agent or the bolts or the both or welding.

Where the sensor mounting member and the stationary member are fixed together by the use of any one of the above described fixing methods is employed, the sensor mounting member and the stationary member can be fixed together firmly. For this reason, the sensor mounting member will not displace in position relative to the stationary member and the deformation of the outer member 1 can be accurately transmitted to the sensor mounting member.

In the sensor incorporated wheel support bearing assembly of the present invention, in which the two fixing members are employed, although the contact fixing portions in those two fixing members have been limited to the flange surface and the peripheral surface of the stationary member, respectively, the following mode is available, in which the two contact fixing portions are not limited to the flange surface and the peripheral surface of the stationary member.

[Mode 5]

The sensor incorporated wheel support bearing assembly according to this mode is a wheel support bearing assembly for rotatably supporting a vehicle wheel relative to an automotive body structure and includes an outer member having an inner periphery formed with a plurality of rows of raceway surfaces defined therein, an inner member formed with raceway surfaces in face-to-face relation with the raceway surfaces in the outer member, a plurality of rows of rolling elements interposed between those raceway surfaces, a sealing device for sealing ends delimited between the outer member and the inner member; and a sensor unit, in which the sensor unit includes a sensor mounting member and at least one or more strain sensors fitted to this sensor mounting member and is mounted on one of the outer member and the inner member, which is a stationary member; in which fixing members are interposed between the sensor mounting member and the stationary member.

In the event that a load acts on the rotatable member as the automotive vehicle starts traveling, the stationary member undergoes deformation through the rolling elements and such deformation brings about a strain in the sensor unit. The strain sensor provided in the sensor unit detects the strain occurring in the sensor unit. If the relation between the strain and the load is determined beforehand by means of a series of experiments and/or simulations, the load imposed on the vehicle wheel can be detected from an output of the strain sensor. Also, the load so detected can be utilized the vehicle control of an automotive vehicle.

Since the wheel support bearing assembly of the present invention is of a design, in which the sensor unit including the sensor mounting member and the strain sensor fitted to the sensor mounting member is mounted on the stationary member through the fitting members, the sensor for the detection of the load can be snugly and neatly installed in the automotive vehicle. When the fitting members are interposed between the sensor mounting member and the stationary member, the sensor mounting member can have a simplified shape. If the strain sensor is fitted to the sensor mounting having such a simplified shape, it can be excellent in mass production and the cost can be reduced. Also, since the sensor mounting member is of a simplified shape, the strain sensor in the form of a pressure film resistance element can be easily formed on the surface of the sensor mounting member. The use of the strain sensor in the form of the pressure film resistance element is effective to increase the reliability of the sensor unit.

What is claimed is:

1. A wheel support bearing assembly for rotatably supporting a vehicle wheel relative to an automotive body structure, comprising:
   an outer member having an inner periphery formed with a plurality of raceway surfaces defined therein;
   an inner member formed with raceway surfaces in face-to-face relation with the raceway surfaces in the outer member;
   a plurality of rows of rolling elements interposed between the raceway surfaces of the outer member and the inner member;
   a sealing device for sealing ends delimited between the outer member and the inner member; and
   a sensor unit,
   wherein the sensor unit includes a sensor mounting member and at least one or more strain sensors fitted to the sensor mounting member and is mounted on one of the outer member and the inner member, that serves as a stationary member, and
   wherein the sensor mounting member has two contact fixing portions through which the sensor mounting member is fixed to the stationary member, and a first contact fixing portion, which is one of the contact fixing portions, is fixed to a surface of a flange protruding radially outwardly from the stationary member and a second contact fixing portion, which is the other of the contact fixing portions, is fixed to a peripheral surface of the stationary member.

2. The sensor incorporated wheel support bearing assembly as claimed in claim 1, wherein the first contact fixing portion of the sensor mounting member is positioned in proximity to a vehicle body mounting hole in the flange surface provided in the stationary member, and the second contact fixing portion is positioned circumferentially on a peripheral surface of the stationary member in the same phase as the first contact fixing portion.

3. The sensor incorporated wheel support bearing assembly as claimed in claim 1, wherein the sensor mounting member has at least one cutout portion formed at a location between the first contact fixing portion and the second contact fixing portion, and wherein the strain sensor is arranged at the cutout portion.

4. The sensor incorporated wheel support bearing assembly as claimed in claim 3, wherein the first contact fixing portion of the sensor unit is fixed to a portion of the flange in proximity to a vehicle body mounting hole defined in such flange and the second contact fixing portion is fixed to a peripheral surface at a phase circumferentially different form that of the first contact fixing portion.

5. The sensor incorporated wheel support bearing assembly as claimed in claim 1, wherein a side surface of the flange, provided on one of the outer member and the inner member, which serves as a stationary member, is formed with a vehicle body mounting holes defined at three locations, and
   wherein the first contact fixing portion is fixed to a portion of the side surface of the flange in proximity of one of the vehicle body mounting holes.

6. The sensor incorporated wheel support bearing assembly as claimed in claim 5, wherein a plurality of sensor units are provided and the respective first contact fixing portions of those sensor units are positioned in proximity of the different vehicle body mounting holes to be fixed to respective portions of the stationary member.

7. The sensor incorporated wheel support bearing assembly as claimed in claim 1, further comprising a fitting member interposed between the sensor mounting member and the stationary member.

8. The sensor incorporated wheel support bearing assembly as claimed in claim 1, wherein the stationary member is the outer member.

9. The sensor incorporated wheel support bearing assembly as claimed in claim 1, further comprising an acting force estimation section to estimate, in reference to an output of the strain sensor, an external force acting on the wheel support bearing assembly or an acting force between a vehicle tire and a road surface.

10. The sensor incorporated wheel support bearing assembly as claimed in claim 1, further comprising a temperature sensor mounted on the sensor mounting member.

11. The sensor incorporated wheel support bearing assembly as claimed in claim 1, wherein the sensor mounting member is provided with at least one of an acceleration sensor and a vibration sensor.

12. The sensor incorporated wheel support bearing assembly as claimed in claim 1, wherein the strain sensor includes an insulating layer formed on a surface of the sensor mounting member by means of printing and baking and an electrode and a strain measuring resistance element both formed on the insulating layer by means of printing and baking.

13. The sensor incorporated wheel support bearing assembly as claimed in claim 1, further comprising a sensor signal processing circuit unit fitted to the stationary member in proximity of the sensor unit, said sensor signal processing circuit unit including a sensor signal processing circuit for processing an output of the strain sensor.

* * * * *